(12) United States Patent
Mao et al.

(10) Patent No.: US 12,272,963 B2
(45) Date of Patent: Apr. 8, 2025

(54) WIRELESS CHARGING TRANSMITTING APPARATUS AND METHOD AND WIRELESS CHARGING SYSTEM

(71) Applicant: HUAWEI TECHNOLOGIES CO., LTD., Shenzhen (CN)

(72) Inventors: Yunhe Mao, Shenzhen (CN); Yanding Liu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 675 days.

(21) Appl. No.: 17/669,718

(22) Filed: Feb. 11, 2022

(65) Prior Publication Data

US 2022/0166257 A1  May 26, 2022

Related U.S. Application Data

(63) Continuation of application No. PCT/CN2020/108554, filed on Aug. 12, 2020.

(30) Foreign Application Priority Data

Aug. 12, 2019 (CN) .......................... 201910741781.2

(51) Int. Cl.
*H02J 50/12* (2016.01)
*H02J 50/80* (2016.01)
*B60L 53/12* (2019.01)

(52) U.S. Cl.
CPC .............. *H02J 50/12* (2016.02); *H02J 50/80* (2016.02); *B60L 53/12* (2019.02)

(58) Field of Classification Search
CPC ........ H02J 50/12; H02J 50/80; H02J 2207/20; H02J 7/02; H02J 2310/48; H02J 50/20;
(Continued)

(56) References Cited

U.S. PATENT DOCUMENTS 6,462,962 B1 * 10/2002 Cuk ........................ H02M 1/34
                                                            363/16
11,190,042 B2 * 11/2021 Mao ........................ B60L 53/22
(Continued)

FOREIGN PATENT DOCUMENTS

CN    103390938 A    11/2013
CN    103580301 A    2/2014
(Continued)

OTHER PUBLICATIONS

Sivambika.K et al., "WiTricity—Wireless Power Transfer by Non radiative Method", 2015 IJEDR | vol. 3, Issue 4 | ISSN: 2321-993, total: 4 pages.

*Primary Examiner* — Jared Fureman
*Assistant Examiner* — Michael J Warmflash
(74) *Attorney, Agent, or Firm* — Maier & Maier, PLLC

(57) ABSTRACT

A wireless charging transmitting apparatus and method and a wireless charging system are provided. The transmitting apparatus includes a compensation circuit, an inverter circuit, a transmitting coil, an impedance adjustment circuit, and a controller. The impedance adjustment circuit includes a leading-bridge-arm impedance adjustment circuit and a lagging-bridge-arm impedance adjustment circuit, and the leading-bridge-arm impedance adjustment circuit and the lagging-bridge-arm impedance adjustment circuit each include an inductive branch, where the inductive branch includes at least one controllable inductive branch, and each controllable inductive branch includes at least one inductor and at least one switch. The controller controls the switches in the controllable inductive branches to be turned on or off, to adjust values of inductive currents injected into a leading bridge arm and a lagging bridge arm through the impedance adjustment circuit.

20 Claims, 26 Drawing Sheets

(58) Field of Classification Search
CPC ...... B60L 53/12; B60L 2210/10; B60L 53/66; B60L 53/122; H02M 1/0058; H02M 7/219; H02M 7/5387; Y02T 10/70; Y02T 10/7072; Y02T 90/14
See application file for complete search history.

(56) References Cited

U.S. PATENT DOCUMENTS

| | | | |
|---|---|---|---|
| 2003/0107354 A1* | 6/2003 | Lin | G05F 1/70 323/222 |
| 2003/0168997 A1* | 9/2003 | Nishimoto | H05B 41/2855 315/308 |
| 2006/0152085 A1* | 7/2006 | Flett | H02M 7/003 307/75 |
| 2010/0097031 A1* | 4/2010 | King | B60L 53/14 320/109 |
| 2013/0063185 A1 | 3/2013 | Ye et al. | |
| 2014/0111005 A1* | 4/2014 | Liu | H02J 9/062 307/20 |
| 2015/0295491 A1* | 10/2015 | Lenz | H02M 3/04 323/234 |
| 2017/0099008 A1* | 4/2017 | Keister | H02M 5/4585 |
| 2017/0222484 A1* | 8/2017 | DeBaun | H02J 50/12 |
| 2018/0194236 A1* | 7/2018 | Elshaer | B60L 53/12 |
| 2021/0152013 A1* | 5/2021 | Mao | H02J 50/10 |

FOREIGN PATENT DOCUMENTS

| | | |
|---|---|---|
| CN | 104578345 A | 4/2015 |
| CN | 104702113 A | 6/2015 |
| CN | 105186705 A | 12/2015 |
| CN | 109742863 A | 5/2019 |
| CN | 110816321 A | 2/2020 |
| EP | 2966749 A2 | 1/2016 |
| WO | 2017136491 A1 | 8/2017 |
| WO | 2018222758 A1 | 12/2018 |

\* cited by examiner

WIRELESS CHARGING TRANSMITTING APPARATUS AND METHOD AND WIRELESS CHARGING SYSTEM

CROSS-REFERENCE TO RELATED APPLICATIONS

This application is a continuation of International Application No. PCT/CN2020/108554, filed on Aug. 12, 2020, which claims priority to Chinese Patent Application No. 201910741781.2, filed on Aug. 12, 2019. The disclosures of the aforementioned applications are hereby incorporated by reference in their entireties.

TECHNICAL FIELD

The embodiments are related to the field of power electronics technologies, a wireless charging transmitting apparatus and method, and a wireless charging system.

BACKGROUND

Due to energy shortages and environmental pollution in modern society, electric vehicles have received widespread attention. An electric vehicle drives by using a vehicle-mounted power battery pack as energy. However, limited by capacities of power battery packs, driving mileage of most existing electric vehicles is relatively short. In addition, a charging time of the power battery pack of the electric vehicle is relatively long, and there is a relatively small quantity of charging stations. Therefore, the electric vehicles have not been widely applied and popularized.

Currently, charging modes of an electric vehicle include contact charging and wireless charging. Because of being easy to use, no spark, and no electric shock hazard, wireless charging becomes a development direction of electric vehicles in the future.

The following describes a working principle of a wireless charging system with reference to FIG. 1.

FIG. 1 is a schematic diagram of a wireless charging system.

The wireless charging system includes a wireless charging transmitting apparatus and a wireless charging receiving apparatus.

The wireless charging transmitting apparatus is located at a transmit end, and the wireless charging receiving apparatus is located at a receive end.

The transmit end includes an inverter H1, a transmit-end compensation circuit 100, and a transmitting coil Ct.

The inverter H1 includes controllable switching transistors S1 to S4, and the inverter H1 is configured to invert a direct current output by a direct current power supply into an alternating current. S1 and S2 form a lagging bridge arm, S3 and S4 form a leading bridge arm, and a voltage phase of the leading bridge arm is ahead of a voltage phase of the lagging bridge arm in a same period.

The transmitting coil Ct is configured to transmit, in a form of an alternating magnetic field, the alternating current output by the inverter H1.

The receive end includes a receiving coil Cr, a receive-end compensation circuit 200, and a rectifier H2.

The rectifier H2 includes controllable switching transistors Q1 to Q4.

The receiving coil Cr is configured to receive, in a form of an alternating magnetic field, electromagnetic energy emitted by the transmitting coil Ct.

The rectifier H2 is configured to rectify an alternating current output by the receiving coil Cr into a direct current and output the direct current to a load.

A controller 300 at the receive end wirelessly communicates with a controller 400 at the transmit end.

Due to different wireless charging standards, different vehicle models, and the like, a reflected impedance reflected from the receive end of the wireless charging system to the transmit end of the wireless charging system may be resistive and capacitive. Consequently, an equivalent output impedance at the transmit end of the wireless charging system is resistive and capacitive to some extent.

Currently, to improve interoperability and charging efficiency of the wireless charging system, the controllable switching transistors in H1 are expected to implement zero voltage switching (ZVS) to reduce power consumption caused when the controllable switching transistors work. An input voltage of H1 may be adjusted, so that H1 implements ZVS in all working conditions. However, to adjust the input voltage of H1, an additional direct current conversion circuit needs to be added at an input end of H1. This increases a size and costs of the wireless charging transmitting apparatus. In addition, an output voltage of H1 may also be adjusted by adjusting a phase shift of H1. Once a controllable switching transistor loses ZVS, a relatively large switching loss of H1 is caused, or even H1 is damaged.

SUMMARY

To resolve the foregoing problems, a wireless charging transmitting apparatus and method and a wireless charging system are provided. Switches in controllable inductive branches are controlled to be turned on or off by a controller, to adjust values of inductive currents flowing into a leading bridge arm and a lagging bridge arm through an impedance adjustment circuit, so that controllable switching transistors in the leading bridge arm and the lagging bridge arm implement zero voltage switching. This reduces a loss of the controllable switching transistors, improves efficiency of a wireless charging system, and also improves interoperability, namely compatibility, of the wireless charging system.

The following describes a plurality of aspects. It is easy to understand that implementations of the plurality of aspects may be mutually referenced.

According to a first aspect, an embodiment provides a wireless charging transmitting apparatus, including an inverter circuit, a compensation circuit, a transmitting coil, an impedance adjustment circuit, and a controller. The inverter circuit is configured to convert an input direct current into an alternating current. The inverter circuit includes a leading bridge arm and a lagging bridge arm, where a voltage phase of the leading bridge arm is ahead of a voltage phase of the lagging bridge arm in a same period, and the leading bridge arm and the lagging bridge arm each include controllable switching transistors. The compensation circuit is configured to compensate the alternating current and send a compensated alternating current to the transmitting coil. The transmitting coil is configured to transmit, in a form of an alternating magnetic field, the alternating current output by the compensation circuit. The impedance adjustment circuit includes a leading-bridge-arm impedance adjustment circuit and a lagging-bridge-arm impedance adjustment circuit. A first end of the leading-bridge-arm impedance adjustment circuit is connected to the controllable switching transistors in the leading bridge arm. A first end of the lagging-bridge-arm impedance adjustment circuit is connected to the controllable switching transistors in the lagging bridge arm. The leading-bridge-arm impedance adjustment circuit and the lagging-bridge-arm impedance adjustment circuit each include an inductive branch, where the inductive branch includes at least one controllable inductive branch, and each controllable inductive branch includes at least one inductor and at least one switch. The controller is configured to: control the switch in the controllable inductive branch in the leading-bridge-arm impedance adjustment circuit to be turned on or off, to adjust a value of an inductive current flowing into the leading bridge arm, so that the controllable switching transistors in the leading bridge arm implement zero voltage switching; and control the switch in the controllable inductive branch in the lagging-bridge-arm impedance adjustment circuit to be turned on or off, to adjust a value of an inductive current flowing into the lagging bridge arm, so that the controllable switching transistors in the lagging bridge arm implement zero voltage switching. It can be understood that the values of the currents in the inductive branches in the leading-bridge-arm impedance adjustment circuit and the lagging-bridge-arm impedance adjustment circuit are adjusted to ensure that the controllable switching transistors in the leading bridge arm and the lagging bridge arm can implement zero voltage switching. In this way, a loss of the controllable switching transistors is reduced, and charging efficiency and compatibility of the wireless charging transmitting apparatus are improved.

According to the first aspect, in a possible implementation, the inductive branches in the leading-bridge-arm impedance adjustment circuit and the lagging-bridge-arm impedance adjustment circuit each further includes at least one fixed inductive branch, and the fixed inductive branch includes at least one inductor. The fixed inductive branches are not controlled by switches and can directly inject inductive currents into the leading bridge arm and the lagging bridge arm. Therefore, through appropriate selection and matching of the controllable inductive branches and the fixed inductive branches, appropriate current gradients can be constructed for the inductive currents injected into the leading bridge arm and the lagging bridge arm while the controllable switching transistors implement zero voltage switching.

According to the first aspect, in a possible implementation, the controllable switching transistors in the leading bridge arm and the lagging bridge arm each include one upper switching transistor and one lower switching transistor; the first end of the leading-bridge-arm impedance adjustment circuit is connected to a middle point between the upper switching transistor and the lower switching transistor of the leading bridge arm; the first end of the lagging-bridge-arm impedance adjustment circuit is connected to a middle point between the upper switching transistor and the lower switching transistor of the lagging bridge arm; and both second ends of the leading-bridge-arm impedance adjustment circuit and the lagging-bridge-arm impedance adjustment circuit are connected to one of a positive bus, a negative bus, or a bus middle point of a power supply.

According to the first aspect, in a possible implementation, the impedance adjustment circuit further includes at least one direct current blocking capacitor; and both the second ends of the leading-bridge-arm impedance adjustment circuit and the lagging-bridge-arm impedance adjustment circuit are connected to one of the positive bus, the negative bus, or the bus middle point of the power supply through the direct current blocking capacitor. The direct current blocking capacitor can filter out a direct current component in the impedance adjustment circuit, to reduce increases in effective values of currents in the leading bridge arm and the lagging bridge arm, thereby reducing a conduction loss and a switching loss of the controllable switching transistors in the leading bridge arm and the lagging bridge arm.

According to the first aspect, in a possible implementation, the impedance adjustment circuit further includes at least one first direct current blocking capacitor and at least one second direct current blocking capacitor; and both the second ends of the leading-bridge-arm impedance adjustment circuit and the lagging-bridge-arm impedance adjustment circuit are connected to the positive bus of the power supply through the at least one first direct current blocking capacitor, and are connected to the negative bus of the power supply through the at least one second direct current blocking capacitor. The first direct current blocking capacitor and the second direct current blocking capacitor can filter out a direct current component in the impedance adjustment circuit, to reduce increases in effective values of currents in the leading bridge arm and the lagging bridge arm, thereby further reducing a conduction loss and a switching loss of the controllable switching transistors in the leading bridge arm and the lagging bridge arm.

According to the first aspect, in a possible implementation, the impedance adjustment circuit further includes at least one first direct current blocking capacitor, at least one second direct current blocking capacitor, and at least one third direct current blocking capacitor; both the second ends of the leading-bridge-arm impedance adjustment circuit and the lagging-bridge-arm impedance adjustment circuit are connected to a first end of the at least one first direct current blocking capacitor; a second end of the at least one first direct current blocking capacitor is connected to the positive bus of the power supply through the at least one second direct current blocking capacitor; and the second end of the at least one first direct current blocking capacitor is connected to the negative bus of the power supply through the at least one third direct current blocking capacitor. The first direct current blocking capacitor, the second direct current blocking capacitor, and the third direct current blocking capacitor can filter out a direct current component in the impedance adjustment circuit, to reduce increases in effective values of currents in the leading bridge arm and the lagging bridge arm, thereby further reducing a conduction loss and a switching loss of the controllable switching transistors in the leading bridge arm and the lagging bridge arm.

According to the first aspect, in a possible implementation, the leading-bridge-arm impedance adjustment circuit further includes at least one direct current blocking capacitor; and the inductive branch in the leading-bridge-arm impedance adjustment circuit is connected to one of the positive bus, the negative bus, or the bus middle point of the power supply through the at least one direct current blocking capacitor. The direct current blocking capacitor can filter out a direct current component in the impedance adjustment circuit, to reduce increases in effective values of currents in the leading bridge arm and the lagging bridge arm, thereby further reducing a conduction loss and a switching loss of the controllable switching transistors in the leading bridge arm.

According to the first aspect, in a possible implementation, the leading-bridge-arm impedance adjustment circuit further includes at least one first direct current blocking capacitor and at least one second direct current blocking capacitor; and the inductive branch in the leading-bridgearm impedance adjustment circuit is connected to the positive bus of the power supply through the at least one first direct current blocking capacitor, and is connected to the negative bus of the power supply through the at least one second direct current blocking capacitor. The first direct current blocking capacitor and the second direct current blocking capacitor can filter out a direct current component in the impedance adjustment circuit, to reduce increases in effective values of currents in the leading bridge arm and the lagging bridge arm, thereby further reducing a conduction loss and a switching loss of the controllable switching transistors in the leading bridge arm.

According to the first aspect, in a possible implementation, the leading-bridge-arm impedance adjustment circuit further includes at least one first direct current blocking capacitor, at least one second direct current blocking capacitor, and at least one third direct current blocking capacitor; the inductive branch in the leading-bridge-arm impedance adjustment circuit is connected to the positive bus of the power supply through the at least one first direct current blocking capacitor and the at least one second direct current blocking capacitor; and the inductive branch in the leading-bridge-arm impedance adjustment circuit is connected to the negative bus of the power supply through the at least one first direct current blocking capacitor and the at least one third direct current blocking capacitor. The first direct current blocking capacitor, the second direct current blocking capacitor, and the third direct current blocking capacitor can filter out a direct current component in the impedance adjustment circuit, to reduce an increase in an effective value of a current in the leading bridge arm, thereby further reducing a conduction loss and a switching loss of the controllable switching transistors in the leading bridge arm and the lagging bridge arm.

According to the first aspect, in a possible implementation, the compensation circuit includes an LCC or an LCL.

According to the first aspect, in a possible implementation, the leading-bridge-arm impedance adjustment circuit further includes at least one diode clamp circuit; the controllable inductive branch in the leading-bridge-arm impedance adjustment circuit is connected to the at least one diode clamp circuit in the leading-bridge-arm impedance adjustment circuit; the diode clamp circuit in the leading-bridge-arm impedance adjustment circuit includes a first diode and a second diode; and a connection point between the inductor and the switch in the controllable inductive branch in the leading-bridge-arm impedance adjustment circuit is connected to both an anode of the first diode and a cathode of the second diode. The diode clamp circuit is formed by two diodes. When a switch in the inductive branch in the leading-bridge-arm impedance adjustment circuit provided with the diode clamp circuit is turned off, a freewheeling path can be provided for an inductor in the inductive branch in the leading-bridge-arm impedance adjustment circuit, and a voltage at a common terminal of the inductor and the switch in the inductive branch in the leading-bridge-arm impedance adjustment circuit can be kept stable within a safe range. This implements circuit protection.

According to the first aspect, in a possible implementation, the lagging-bridge-arm impedance adjustment circuit further includes at least one diode clamp circuit; the controllable inductive branch in the lagging-bridge-arm impedance adjustment circuit is connected to the at least one diode clamp circuit in the lagging-bridge-arm impedance adjustment circuit; the diode clamp circuit in the lagging-bridge-arm impedance adjustment circuit includes a third diode and a fourth diode; and a connection point between the inductor and the switch in the controllable inductive branch in the lagging-bridge-arm impedance adjustment circuit is connected to both an anode of the third diode and a cathode of the fourth diode. The diode clamp circuit is formed by two diodes. When a switch in the inductive branch in the lagging-bridge-arm impedance adjustment circuit provided with the diode clamp circuit is turned off, a freewheeling path can be provided for an inductor in the inductive branch in the lagging-bridge-arm impedance adjustment circuit, and a voltage at a common terminal of the inductor and the switch in the inductive branch in the lagging-bridge-arm impedance adjustment circuit can be kept stable within a safe range. This implement circuit protection.

According to the first aspect, in a possible implementation, the controller is configured to: obtain a current flowing into the compensation circuit; and control, based on the current flowing into the compensation circuit, the switch in the controllable inductive branch in the leading-bridge-arm impedance adjustment circuit in the wireless charging transmitting apparatus to be turned on or off, to change a current flowing out of the leading bridge arm in the wireless charging transmitting apparatus, so that the controllable switching transistors in the leading bridge arm implement zero voltage switching. The foregoing describes the case in which the inductive branch is directly controlled, based on the current in the compensation circuit to be turned on or off. In this case, a pre-simulation process is omitted. In addition, the controller directly obtains the current in the compensation circuit obtained through current detection by using a current detection circuit. Accuracy of inductive branch switching better satisfies a requirement of an actual product and inductive branch switching has higher timeliness.

According to the first aspect, in a possible implementation, the controller is configured to obtain a difference between the current flowing into the compensation circuit and a preset current, and control, based on the difference, the switch in the inductive branch in the leading-bridge-arm impedance adjustment circuit to be turned on or off. Regardless of whether a closed inductive branch already exists, the current flowing into the compensation circuit may be obtained, the difference between the current flowing into the compensation circuit and the preset current may be obtained, and an on/off status of the inductive branch may be controlled based on the difference.

According to the first aspect, in a possible implementation, the controller is configured to obtain a current flowing into the compensation circuit from a middle point between the controllable switching transistors in the leading bridge arm in a period between a turn-off moment and a turn-on moment of the controllable switching transistor in the leading bridge arm.

According to the first aspect, in a possible implementation, the controller is configured to obtain a current flowing into the compensation circuit based on a current flowing out of the leading bridge arm in a period between a turn-off moment and an actual turn-on moment of the controllable switching transistor in the leading bridge arm and a current in the inductive branch in the leading-bridge-arm impedance adjustment circuit. When a closed inductive branch already exists, the current flowing into the compensation circuit may be indirectly obtained by using the current in the leading bridge arm and the current in the inductive branch in the leading-bridge-arm impedance adjustment circuit.

The turn-off moment is a corresponding moment at which the controllable switching transistor is switched from on to off; and the turn-on moment is a corresponding moment at which the controllable switching transistor is switched from off to on. In an actual operation, an actual turn-off moment and an actual turn-on moment of the switching transistor may respectively be a delay time later than the turn-off moment and the turn-on moment indicated by signals sent by the controller. Therefore, in this embodiment, the period from the turn-off moment to the turn-on moment is a longest period that is from the turn-off moment to the turn-on moment and that includes a signal delay time.

The implementation described above of directly controlling, based on the current in the compensation circuit, the inductive branch, in the leading-bridge-arm impedance adjustment circuit to be turned on or off is also applicable to controlling, based on the current in the compensation circuit, the inductive branch, in the lagging-bridge-arm impedance adjustment circuit to be turned on or off.

According to a second aspect, an embodiment provides a control method for a wireless charging transmitting apparatus, including: obtaining a current flowing into a compensation circuit of the wireless charging transmitting apparatus; and controlling, based on the current flowing into the compensation circuit, a switch in a controllable inductive branch in a leading-bridge-arm impedance adjustment circuit in the wireless charging transmitting apparatus to be turned on or off, to change a current flowing out of a leading bridge arm in the wireless charging transmitting apparatus, so that controllable switching transistors in the leading bridge arm implement zero voltage switching. In this embodiment, the inductive branch is added, and a controller may control a switch in each inductive branch to be turned on or off to adjust the impedance adjustment circuit to present different inductance values, to change a value of an inductive current injected into the leading bridge arm. In this way, the controllable switching transistors in the leading bridge arm implement ZVS. Because the controller may control the inductive branch to be connected or control the inductive branch to be disconnected, whether the inductive branch is connected is controlled according to an actual operation requirement of an inverter circuit. In some working conditions, the leading bridge arm in the inverter circuit can implement ZVS. Therefore, no inductive branch needs to be connected. In this case, the controller may control all inductive branches to be disconnected, to avoid extra power consumption caused by connection of the inductive branches. In some working conditions, to implement ZVS of the controllable switching transistors in the leading bridge arm in the inverter circuit while ensuring interoperability with various wireless charging receiving devices, a fixed inductive branch circuit may alternatively be connected in the leading-bridge-arm impedance adjustment circuit directly. Therefore, the control mode is flexible. In different working conditions, the controllable switching transistors in the leading bridge arm can implement ZVS when the inductive branch needs to be connected; and when no inductive branch needs to be connected in the leading bridge arm, the controllable inductive branch may be controlled to be disconnected, to reduce power consumption. In addition, a process in which the controller switches the inductive branch does not affect power transmission of the wireless charging transmitting apparatus, and stability and reliability of the wireless charging transmitting apparatus are improved.

According to the second aspect, in a possible implementation, the method includes: obtaining a difference between the current flowing into the compensation circuit and a preset current, and controlling, based on the difference, a switch in an inductive branch in the leading-bridge-arm impedance adjustment circuit to be turned on or off. Regardless of whether a closed inductive branch already exists, the current flowing into the compensation circuit may be directly obtained, the difference between the current flowing into the compensation circuit and the preset current may be obtained, and an on/off status of the inductive branch may be controlled based on the difference.

According to the second aspect, in a possible implementation, the method includes: obtaining a current flowing into the compensation circuit from a middle point between the controllable switching transistors in the leading bridge arm in a period between a turn-off moment and an actual turn-on moment of the controllable switching transistor in the leading bridge arm.

According to the second aspect, in a possible implementation, the method includes: obtaining a current flowing into the compensation circuit based on a current flowing out of the leading bridge arm in a period between a turn-off moment and a turn-on moment of the controllable switching transistor in the leading bridge arm and a current in the inductive branch in the leading-bridge-arm impedance adjustment circuit. When a closed inductive branch already exists, the current flowing into the compensation circuit may be indirectly obtained by using the current in the leading bridge arm and the current in the inductive branch in the leading-bridge-arm impedance adjustment circuit.

The turn-off moment is a corresponding moment at which the controllable switching transistor is switched from on to off; and a turn-on moment is a corresponding moment at which the controllable switching transistor is switched from off to on. In an actual operation, an actual turn-off moment and an actual turn-on moment of the switching transistor are respectively a delay time later than the turn-off moment and the turn-on moment indicated by signals sent by the controller. Therefore, in this embodiment, the period from the turn-off moment to the turn-on moment is a longest period that is from the turn-off moment to the turn-on moment and that includes a signal delay time.

The implementation described above of controlling, based on the current in the compensation circuit, the inductive branch, in the leading-bridge-arm impedance adjustment circuit to be turned on or off is also applicable to controlling, based on the current in the compensation circuit, the inductive branch, in the lagging-bridge-arm impedance adjustment circuit to be turned on or off.

According to a third aspect, an embodiment provides a wireless charging system, including a wireless charging receiving apparatus and the wireless charging transmitting apparatus provided in any implementation of the first aspect. The wireless charging receiving apparatus is configured to receive an alternating magnetic field transmitted by the wireless charging transmitting apparatus, convert the alternating magnetic field into a direct current, and provide the direct current to a current-using device. Because the wireless charging system includes the wireless charging transmitting apparatus described above, a switching loss of the wireless charging transmitting apparatus is reduced, wireless charging transmitting efficiency is improved, and stability and reliability of the wireless charging transmitting apparatus are improved.

According to a fourth aspect, an embodiment provides a current-using device, including a power consuming element, a battery, and a wireless charging receiving apparatus. The wireless charging receiving apparatus is configured to receive an alternating magnetic field transmitted by the wireless charging transmitting apparatus. The wireless charging receiving apparatus is configured to convert the alternating magnetic field into a direct current to charge the battery. The battery is configured to supply power to the power consuming element. The current-using device may be an electric vehicle. The wireless charging receiving apparatus may be located in the electric vehicle, and the wireless charging transmitting apparatus may be located on the ground.

Because the current-using device may be charged by using the wireless charging transmitting apparatus provided in any implementation of the first aspect described above, the current-using device has relatively high stability and safety in a wireless charging process.

BRIEF DESCRIPTION OF DRAWINGS

To describe the solutions in the embodiments or in the conventional technology more clearly, the following briefly describes the accompanying drawings for describing the embodiments or the conventional technology. Apparently, the accompanying drawings in the following descriptions show merely some embodiments, and a person of ordinary skill in the art may still derive other drawings from these accompanying drawings without creative efforts.

FIG. 2b is a schematic diagram of a structure of the wireless electric-vehicle charging system provided in FIG. 2a;

DETAILED DESCRIPTION OF THE EMBODIMENTS

To make a person skilled in the art better understand the solutions provided in the embodiments, the following first describes an application scenario of a wireless charging transmitting apparatus.

Figure 1:
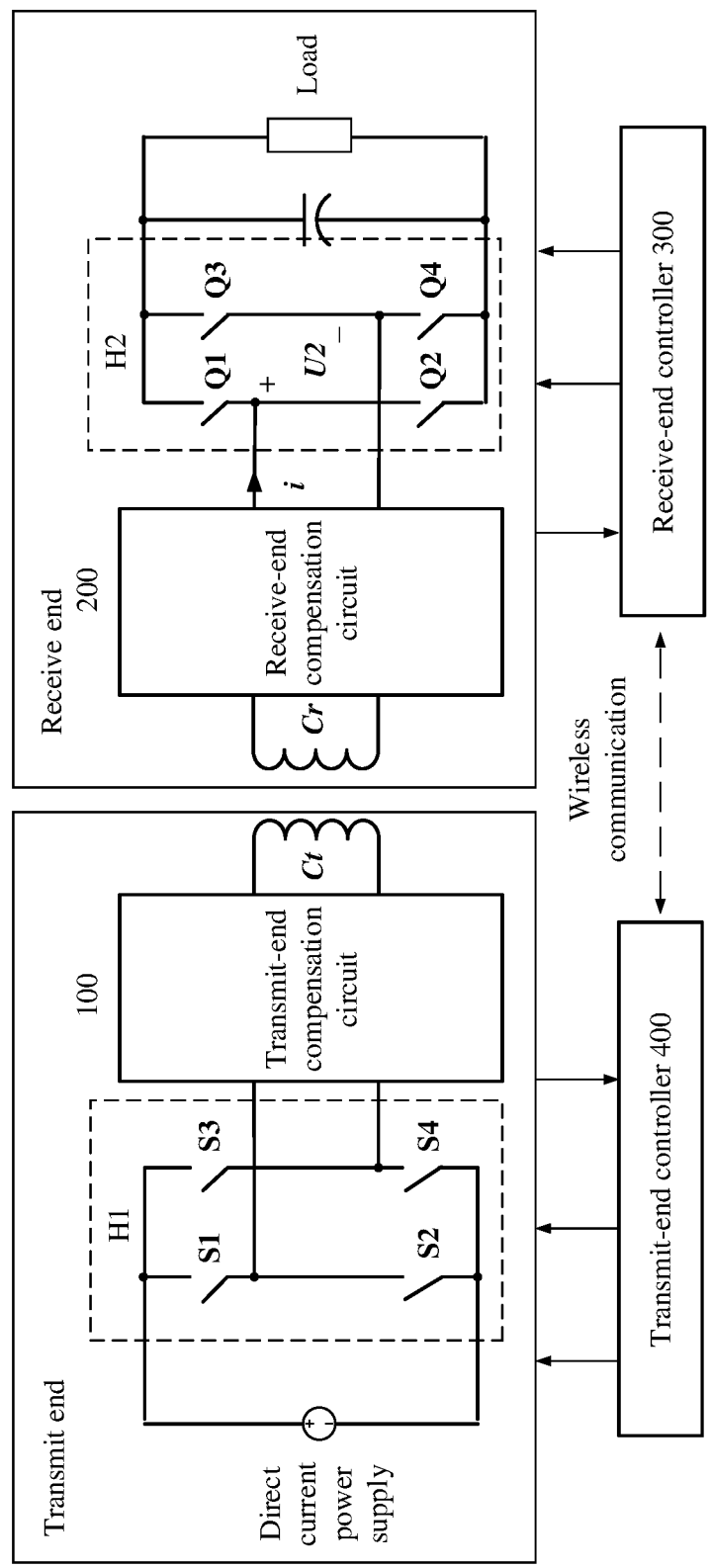
FIG. 1 is a schematic diagram of a wireless charging system according to the conventional technology.
Figure 2A:
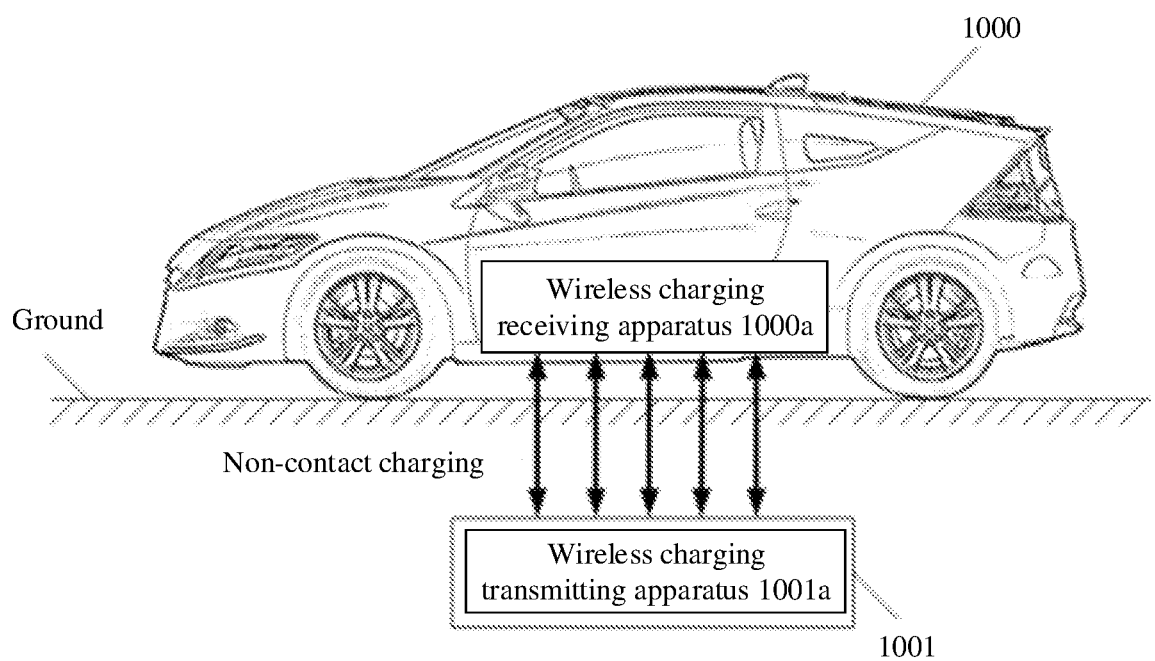
FIG. 2a is a schematic diagram of a wireless electric-vehicle charging system according to an embodiment.

FIG. 2a is a schematic diagram of a wireless electric-vehicle charging system according to an embodiment.

The wireless charging system may include at least an electric vehicle 1000 and a wireless charging station 1001. The electric vehicle 1000 may include a wireless charging receiving apparatus 1000a, and the wireless charging station 1001 may include a wireless charging transmitting apparatus 1001a.

Currently, in a charging process of the wireless charging system, the wireless charging receiving apparatus 1000a located in the electric vehicle 1000 and the wireless charging transmitting apparatus 1001a located in the wireless charging station 1001 cooperate with each other, to perform contactless charging.

The wireless charging station 1001 may be a fixed wireless charging station, a fixed wireless charging parking space, a wireless charging road, or the like. The wireless charging transmitting apparatus 1001a may be disposed on the ground or buried under the ground (where FIG. 2a shows a case in which the wireless charging transmitting apparatus 1001a is buried under the ground), and may wirelessly charge the electric vehicle 1000 located above the wireless charging transmitting apparatus 1001a.

The wireless charging receiving apparatus 1000a may be integrated into the bottom of the electric vehicle 1000. When the electric vehicle 1000 enters a wireless charging range of the wireless charging transmitting apparatus 1001a, the electric vehicle 1000 may be charged in a wireless charging manner. A power receive antenna and a rectifier circuit of the wireless charging receiving apparatus 1000a may be integrated together or separated. When the power receive antenna is separated from the rectifier circuit, a rectifier of the rectifier circuit is usually placed in the vehicle.

A power transmit antenna and an inverter of the wireless charging transmitting apparatus 1001a may be integrated together or separated. In addition, during the contactless charging, the wireless charging receiving apparatus 1000a and the wireless charging transmitting apparatus 1001a may perform wireless energy transmission through electric field coupling or magnetic field coupling. The coupling may be electric field induction, magnetic induction, magnetic resonance, or wireless radiation, and is not limited in this embodiment. Further, the electric vehicle 1000 and the wireless charging station 1001 may perform bidirectional charging. In other words, the wireless charging station 1001 may charge the electric vehicle 1000 by using a power supply, or the electric vehicle 1000 may discharge to a power supply.

Figure 2B:
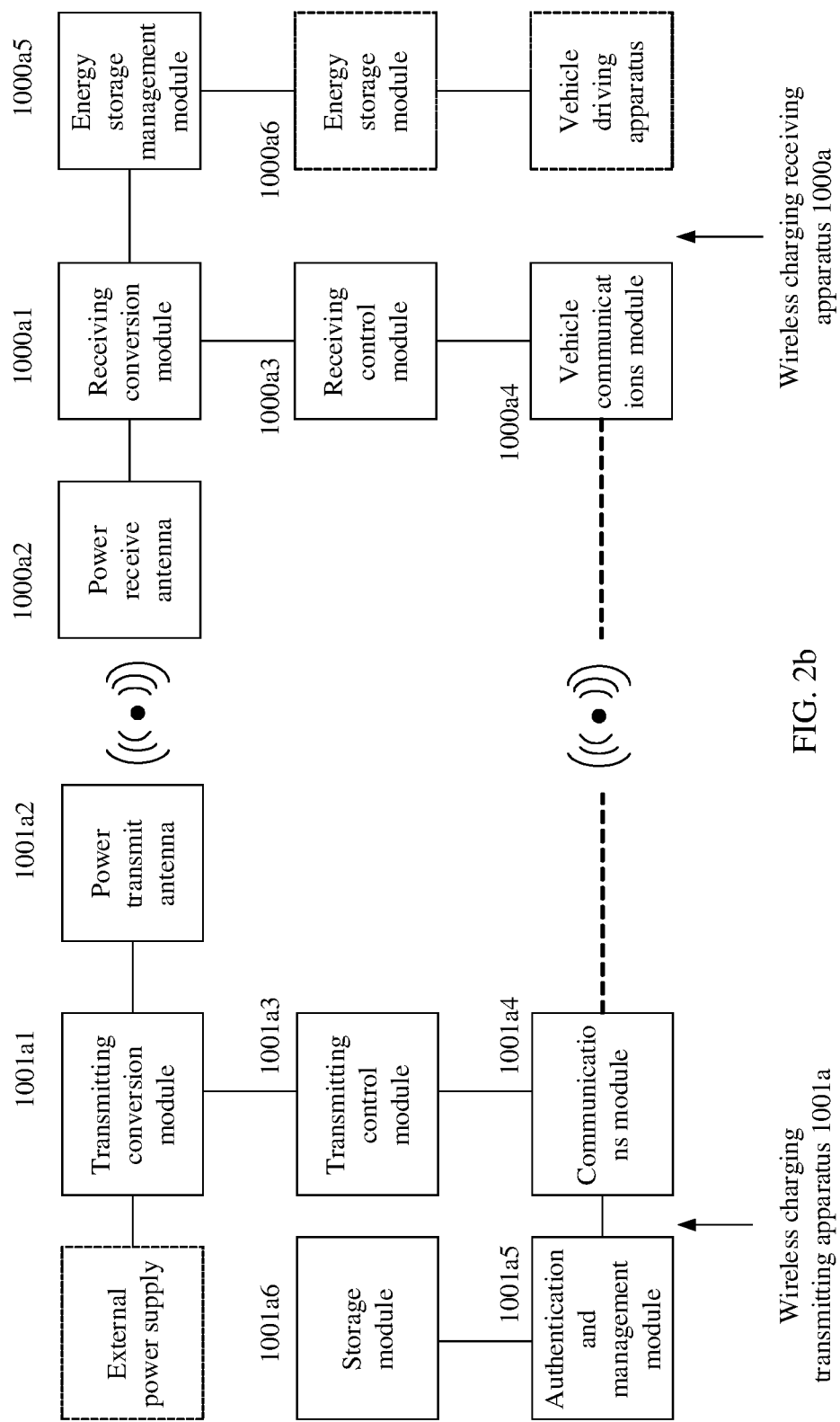

FIG. 2b is a schematic diagram of a structure of the wireless electric-vehicle charging system provided in FIG. 2a.

The wireless charging transmitting apparatus 1001a shown in FIG. 2b includes a transmitting conversion module 1001a1, a power transmit antenna 1001a2, a transmitting control module 1001a3, a communications module 1001a4, an authentication and management module 1001a5, and a storage module 1001a6.

The wireless charging receiving apparatus 1000a includes a power receive antenna 1000a2, a receiving control module 1000a3, a receiving conversion module 1000a1, a vehicle communications module 1000a4, an energy storage management module 1000a5, and an energy storage module 1000a6. In addition, the receiving conversion module 1000a1 may be connected to the energy storage module 1000a6 by using the energy storage management module 1000a5, and use received energy to charge the energy storage module 1000a6, to drive the electric vehicle. It should be noted that the energy storage management module 1000a5 and the energy storage module 1000a6 may be located inside or outside the wireless charging receiving apparatus 1000a. This is not limited in this embodiment.

The transmitting conversion module 1001a1 may be connected to an external power supply and convert an alternating current or a direct current obtained from the external power supply into a high-frequency alternating current. When an input of the external power supply is an alternating current, the transmitting conversion module 1001a1 includes at least a power factor correction unit and an inverter. When the input of the external power supply is a direct current, the transmitting conversion module 1001a1 includes at least an inverter. The power factor correction unit is configured to keep a phase of an input current of the wireless charging system consistent with a phase of a power grid voltage, to reduce harmonic content of the wireless charging system, increase a power factor value, reduce pollution of the wireless charging system to a power grid, and improve reliability. The power factor correction unit may be further configured to increase or decrease an output voltage of the power factor correction unit based on a requirement of a post-stage device. The inverter is configured to convert the voltage that is output by the power factor correction unit into a high-frequency alternating-current voltage and apply the high-frequency alternating-current voltage to the power transmit antenna 1001a2. The high-frequency alternating-current voltage can improve transmission efficiency and increase a transmission distance. As shown in FIG. 2b, the wireless charging transmitting apparatus 1001a is connected to an external power supply is used as an example. The power supply may alternatively be a power supply located inside the wireless charging transmitting apparatus 1001a.

The power transmit antenna 1001a2 is configured to transmit, in a form of an alternating magnetic field, the alternating current output by the transmitting conversion module 1001a1.

The transmitting control module 1001a3 may control voltage, current, and frequency conversion parameter adjustment of the transmitting conversion module 1001a1 based on an actual transmit power requirement for wireless charging, to control voltage and current output adjustment of a high-frequency alternating current in the power transmit antenna 1001a2.

The communications module 1001a4 and the vehicle communications module 1000a4 are configured to implement wireless communication between the wireless charging transmitting apparatus 1001a and the wireless charging receiving apparatus 1000a, where communicated content includes power control information, fault protection information, power-on/off information, interaction authentication information, and the like. The wireless charging transmitting apparatus 1001a may receive attribute information of the electric vehicle, a charging request, and interaction authentication information that are sent by the wireless charging receiving apparatus 1000a. In addition, the wireless charging transmitting apparatus 1001a may further send wireless charging transmitting control information, interaction authentication information, historical wireless charging data information, and the like to the wireless charging receiving apparatus 1000a, manners of the foregoing wireless communication may include, but are not limited to, any one or a combination of Bluetooth, wireless fidelity (Wi-Fi), a ZigBee protocol (Zigbee), a radio frequency identification (RFID) technology, a long range (Lora) wireless technology, and a near field communication (NFC) technology. Further, the communications module 1001a4 may further communicate with an intelligent terminal of a user owning the electric vehicle, and the user implements remote authentication and user information transmission by using a communication function.

The authentication and management module 1001a5 is used for interaction authentication and permission management between the wireless charging transmitting apparatus 1001a and the electric vehicle in the wireless charging system.

The storage module 1001a6 is configured to store charging process data, interaction authentication data (for example, the interaction authentication information), and permission management data (for example, permission management information) of the wireless charging transmitting apparatus 1001a. The interaction authentication data and the permission management data may be factory settings or may be set by a user. This is not limited in this embodiment.

The power receive antenna 1000a2 is configured to receive, in a form of an alternating magnetic field, electromagnetic energy emitted by the power transmit antenna 1001a2. Structure combination forms of compensation circuits of the power transmit antenna 1001a2 and the power receive antenna 1000a2 in the wireless charging system include an S-S type, a P-P type, an S-P type, a P-S type, an LCL-LCL type, an LCL-P type, and the like. This is not limited in this embodiment. In addition, to implement a bidirectional charging function of the wireless charging system, the wireless charging transmitting apparatus 1001a and the wireless charging receiving apparatus 1000a in the wireless charging system may respectively include a power receive antenna 1000a2 and a power transmit antenna 1001a2, where the power receive antenna 1000a2 and the power transmit antenna 1001a2 may be independent of each other or integrated together.

The receiving conversion module 1000a1 is configured to convert the electromagnetic energy received by the power receive antenna 1000a2 into a direct current voltage and a direct current required for charging the energy storage module 1000a6. The receiving conversion module 1000a1 includes at least a compensation circuit and a rectifier, where the rectifier converts a high-frequency resonance current and a high-frequency resonance voltage that are converted by the power receive antenna 1000a2 into a direct-current voltage and a direct-current current.

The receiving control module 1000a3 can control voltage, current, and frequency conversion parameter adjustment of the receiving conversion module 1000a1 based on an actual wireless charging receive-power requirement.

The inverter of the wireless charging transmitting apparatus 1001a includes an inverter circuit and a compensation circuit, where the inverter circuit is configured to invert a direct current output by a direct current power supply into an alternating current. Currently, to improve efficiency and interoperability of the wireless charging system, a controllable switching transistor in an inverter circuit in a wireless charging transmitting apparatus is expected to implement ZVS, to reduce power consumption caused when the controllable switching transistor works. An input voltage of the inverter may be adjusted, and a phase shift angle remains unchanged, so that the inverter implements ZVS in all working conditions. However, to adjust the input voltage of the inverter, an additional direct current conversion circuit needs to be added at an input end of the inverter. This increases a size and costs of the wireless charging transmitting apparatus. In addition, an output voltage of the inverter may be adjusted by adjusting a phase shift of the inverter. However, for a leading bridge arm and a lagging bridge arm, it cannot be ensured that the inverter can implement zero voltage switching at various output voltages (different phase shift angles). Especially when a reflected impedance reflected from a receive end to a transmit end becomes resistive and capacitive, it is more difficult to ensure that a controllable switching transistor implements ZVS. Once the controllable switching transistor cannot implement zero voltage switching, a switching loss of the inverter is relatively large, or even the controllable switching transistor is damaged.

To resolve the foregoing problems in the conventional technology, a wireless charging transmitting apparatus may include an impedance adjustment circuit and a controller. The impedance adjustment circuit includes a leading-bridge-arm impedance adjustment circuit and a lagging-bridge-arm impedance adjustment circuit, and the leading-bridge-arm impedance adjustment circuit and the lagging-bridge-arm impedance adjustment circuit each include one inductive branch. Each inductive branch includes at least one controllable inductive branch, each controllable inductive branch includes at least one inductor and at least one switch, and all the inductive branches are connected in parallel or in series to each other. First ends of the leading-bridge-arm impedance adjustment circuit and the lagging-bridge-arm impedance adjustment circuit are respectively connected to a leading bridge arm and a lagging bridge arm, and both the first ends of the leading-bridge-arm impedance adjustment circuit and the lagging-bridge-arm impedance adjustment circuit are connected to an output port of a direct current power supply. Inductive currents are injected into the leading bridge arm and the lagging bridge arm through the leading-bridge-arm impedance adjustment circuit and the lagging-bridge-arm impedance adjustment circuit, to increase inductive current components in the leading bridge arm and the lagging bridge arm. The controller is configured to control switches in the inductive branches to be turned on or off, to change currents flowing out of the leading bridge arm and the lagging bridge arm, in other words, the controller controls a quantity of connected inductive branches to control values of currents injected into the leading bridge arm and the lagging bridge arm, so that the controllable switching transistors in the leading bridge arm and the lagging bridge arm implement zero voltage switching. On the premise that the controllable switching transistors in the lagging bridge arm can implement zero voltage switching, an increase in power consumption caused by an excessive quantity of connected inductors is avoided. In addition, power transmission of the wireless charging transmitting apparatus does not need to be interrupted in a process in which the controller switches the inductive branch, and stability and reliability of the wireless charging transmitting apparatus are improved. In the following descriptions, the controllable switching transistors implement zero voltage switching, that is, the controllable switching transistors implement ZVS.

To make a person skilled in the art better understand the solutions, the following clearly and describes the solutions in the embodiments with reference to the accompanying drawings in the embodiments o. The described embodiments are merely some rather than all of the embodiments. All other embodiments obtained by a person of ordinary skill in the art based on the embodiments without creative efforts shall fall within the scope of the embodiments.

Apparatus Embodiment 1

Figure 2C:
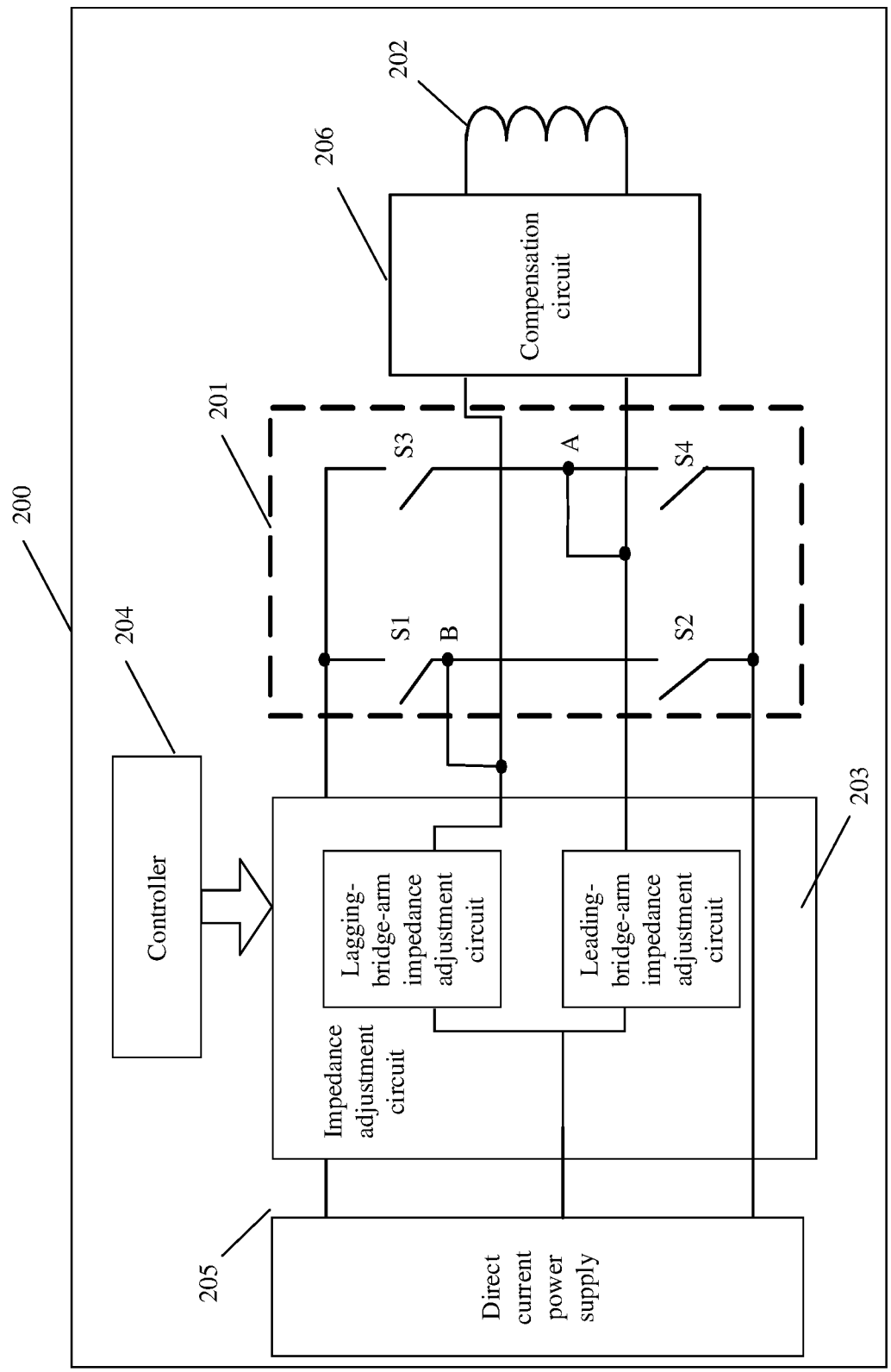
FIG. 2c is a schematic diagram of a wireless charging transmitting apparatus according to Apparatus Embodiment 1.

FIG. 2c is a schematic diagram of a wireless charging transmitting apparatus according to Apparatus Embodiment 1.

The wireless charging transmitting apparatus provided in this embodiment is located at a transmit end, and is configured to convert, into an alternating magnetic field, a direct current input by a direct current power supply and send the alternating magnetic field to a wireless charging receiving apparatus. The wireless charging transmitting apparatus may be applied to the electric vehicle field and is configured to charge an electric vehicle. The wireless charging receiving apparatus may be located on the electric vehicle.

The apparatus includes an inverter circuit 201, a transmitting coil 202, an impedance adjustment circuit 203, a controller 204, and a compensation circuit 206.

The inverter circuit 201 converts the direct current output by the direct current power supply into an alternating current, the inverter circuit 201 includes a leading bridge arm and a lagging bridge arm, and in one period, a voltage phase of the leading bridge arm is ahead of a voltage phase of the lagging bridge arm.

The compensation circuit 206 compensates the alternating current output by the inverter circuit 201 and sends a compensated alternating current to the transmitting coil 202.

In FIG. 2c, an example in which the inverter circuit 201 includes controllable switching transistors S1 to S4 is used. A bridge arm including the controllable switching transistors S3 and S4 is the leading bridge arm, and a bridge arm including the controllable switching transistors S1 and S2 is the lagging bridge arm.

The transmitting coil 202 transmits the alternating current in a form of an alternating magnetic field.

The impedance adjustment circuit 203 includes a leading-bridge-arm impedance adjustment circuit and a lagging-bridge-arm impedance adjustment circuit, and the leading-bridge-arm impedance adjustment circuit and the lagging-bridge-arm impedance adjustment circuit each include at least one inductive branch. The inductive branch includes a controllable inductive branch and a fixed inductive branch, each controllable inductive branch includes at least one inductor and at least one switch, and each fixed inductive branch includes at least one inductor that is not controlled by a switch. Inductive branches in the leading-bridge-arm impedance adjustment circuit are connected in parallel or in series to each other, and inductive branches in the lagging-bridge-arm impedance adjustment circuit are also connected in parallel or in series to each other. First ends of the leading-bridge-arm impedance adjustment circuit and the lagging-bridge-arm impedance adjustment circuit are respectively connected to middle points of a leading bridge arm and a lagging bridge arm, namely, a middle point B between controllable switching transistors S1 and S2 and a middle point A between controllable switching transistors S3 and S4 in FIG. 2c; and both second ends of the leading-bridge-arm impedance adjustment circuit and the lagging-bridge-arm impedance adjustment circuit are connected to an output port of a direct current power supply 205. The leading-bridge-arm impedance adjustment circuit and the lagging-bridge-arm impedance adjustment circuit are respectively connected to the middle point A of the leading bridge arm and the middle point B of the lagging bridge arm, so that inductive currents can be injected into the leading bridge arm and the lagging bridge arm, to increase inductive current components in the leading bridge arm and the lagging bridge arm. The middle point is a common terminal of one upper switching transistor and one lower switching transistor.

The controller 204 may control the switches in the inductive branches to be turned on or off, to change currents flowing out of the leading bridge arm and the lagging bridge arm, so that the controllable switching transistors in the leading bridge arm and the lagging bridge arm implement ZVS.

It may be understood that the controller is equivalent to the transmitting control module 1001a3 in FIG. 2b.

To enable the controllable switching transistors S1 to S4 in the leading bridge arm and the lagging bridge arm to implement ZVS, phases of currents flowing out from the middle points of the leading bridge arm and the lagging bridge arm need to lag behind phases of output voltages of the leading bridge arm and the lagging bridge arm in the inverter circuit 201 (a voltage difference between the middle point of the leading bridge arm and a negative bus of an inverter and a voltage difference between the middle point of the lagging bridge arm and the negative bus of the inverter). In other words, loads corresponding to the output voltages of the leading bridge arm and the lagging bridge arm are inductive. During adjustment of a phase shift angle of the inverter circuit 201, a phase relationship between the currents flowing out from the middle points of the leading bridge arm and the lagging bridge arm and the voltages of the leading bridge arm and the lagging bridge arm in the inverter circuit 201 is changed, and electrical resistance of the loads of the leading bridge arm and the lagging bridge arm is further changed. In addition, when a reflected impedance reflected from a receive end to the transmit end may be resistive and capacitive, electrical resistance of an equivalent output impedance of the transmit end may also be changed, and electrical resistance of the loads of the leading bridge arm and the lagging bridge arm is further changed. When the leading bridge arm and the lagging bridge arm are changed from inductive circuits to capacitive circuits, the controllable switching transistors S1 to S4 cannot implement ZVS. An appropriate inductive current may be injected into the leading bridge arm or the lagging bridge arm through the inductive branch, so that a phase of a current in the leading bridge arm or the lagging bridge arm remains lagging behind a phase of an output voltage of the leading bridge arm or the lagging bridge arm in the inverter circuit 201.

The leading-bridge-arm impedance adjustment circuit and the lagging-bridge-arm impedance adjustment circuit each may include more inductive branches, so that controllable switches in the leading bridge arm and the lagging bridge arm at different phase shift angles can implement ZVS. The controller controls a switch in each controllable inductive branch to be turned on or off, to change a quantity (including 0) of connected controllable inductive branches, to further change values of inductive currents injected into the leading bridge arm and the lagging bridge arm through the impedance adjustment circuit. Further, through appropriate selection of inductance values of inductors in each controllable inductive branch and each fixed inductive branch, an appropriate current gradient can be constructed for the inductive current injected into the leading bridge arm or the lagging bridge arm, so that the inductive current injected into the leading bridge arm or the lagging bridge arm matches a phase shift angle more accurately. This avoids a case in which a conduction loss and a switching loss of the controllable switching transistors in the leading bridge arm or the lagging bridge arm are increased due to an excessively large increase in a current in the leading bridge arm or the lagging bridge arm when the controllable switches in the leading bridge arm or the lagging bridge arm have implemented ZVS.

When there is a plurality of inductive branches, inductance values of inductors in all inductive branches may be equal or may not be equal. The inductance values may be set based on a requirement. This is not limited. In addition, types of switches in all the controllable inductive branches may be the same or different. For example, a switch type may be any one of the following: a relay, a circuit breaker, a contactor, an insulated gate bipolar transistor (IGBT), or a metal oxide semiconductor (MOS) field effect transistor. Each controllable inductive branch may include a plurality of inductors connected in parallel or in series, and a connection relationship between an inductor and a switch may alternatively be a parallel connection or a series connection.

The impedance adjustment circuit and the controller are added in the wireless charging transmitting apparatus provided in this embodiment. The impedance adjustment circuit includes the leading-bridge-arm impedance adjustment circuit and the lagging-bridge-arm impedance adjustment circuit, and the leading-bridge-arm impedance adjustment circuit and the lagging-bridge-arm impedance adjustment circuit each include at least one inductive branch.

The inductive branch includes a controllable inductive branch and a fixed inductive branch, each controllable inductive branch includes at least one inductor and at least one switch, and each fixed inductive branch includes at least one inductor that is not controlled by a switch. The fixed inductive branch and the controllable inductive branch in the leading-bridge-arm impedance adjustment circuit are connected in parallel or in series to each other, and the fixed inductive branch and the controllable inductive branch in the lagging-bridge-arm impedance adjustment circuit are also connected in parallel or in series to each other. The first ends of the leading-bridge-arm impedance adjustment circuit and the lagging-bridge-arm impedance adjustment circuit are respectively connected to the middle points of the leading bridge arm and the lagging bridge arm; and both the second ends of the leading-bridge-arm impedance adjustment circuit and the lagging-bridge-arm impedance adjustment circuit are connected to the output port of the direct current power supply 205.

The controller is configured to control the switches in the controllable inductive branches to be turned on or off, to change the currents flowing out of the leading bridge arm and the lagging bridge arm. The controller may control a quantity of connected controllable inductive branches to control values of currents injected into the leading bridge arm and the lagging bridge arm, so that the controllable switching transistors in the leading bridge arm and the lagging bridge arm implement ZVS. The controller controls the leading-bridge-arm impedance adjustment circuit or the lagging-bridge-arm impedance adjustment circuit to be connected to the leading bridge arm or the lagging bridge arm, only when an inductive current needs to be injected into the leading bridge arm or the lagging bridge arm. When the leading-bridge-arm impedance adjustment circuit and the lagging-bridge-arm impedance adjustment circuit each include a plurality of controllable inductive branches, the controller may control switches in the controllable inductive branches to be turned on or off, to present different inductance values of the leading-bridge-arm impedance adjustment circuit or the lagging-bridge-arm impedance adjustment circuit. If inductance values of the leading-bridge-arm impedance adjustment circuit or the lagging-bridge-arm impedance adjustment circuit are different, values of inductive currents injected into the leading bridge arm or the lagging bridge arm are different. A process in which the controller switches the controllable inductive branch does not affect power transmission of the wireless charging transmitting apparatus, and stability and reliability of the wireless charging transmitting apparatus are improved.

Apparatus Embodiment 2

The following describes working principles of a leading-bridge-arm impedance adjustment circuit and a lagging-bridge-arm impedance adjustment circuit by respectively using examples in which the leading-bridge-arm impedance adjustment circuit includes at least one controllable inductive branch and the lagging-bridge-arm impedance adjustment circuit includes at least one controllable inductive branch.

Regardless of whether the leading-bridge-arm impedance adjustment circuit includes one controllable inductive branch or a plurality of controllable inductive branches, that a controller controls the leading-bridge-arm impedance adjustment circuit to be closed or opened may be: The controller controls, based on a current flowing into a compensation circuit or a current flowing out of a leading bridge arm at a turn-off moment of a controllable switching transistor in the leading bridge arm, a switch in the leading-bridge-arm impedance adjustment circuit to be turned on or off. The turn-off moment is a corresponding moment at which the controllable switching transistor is switched from on to off; and a turn-on moment is a corresponding moment at which the controllable switching transistor is switched from off to on. In an actual operation, an actual turn-off moment and an actual turn-on moment of the switching transistor are respectively a delay time later than the turn-off moment and the turn-on moment indicated by signals sent by the controller. Therefore, in this embodiment, a period from the turn-off moment to the turn-on moment is a longest period that is from the turn-off moment to the turn-on moment and that includes a signal delay time.

When none of the controllable inductive branches are connected, the current flowing into the compensation circuit is equal to the current flowing out of the leading bridge arm. However, when an inductive branch is connected, the current flowing into the compensation circuit is not equal to the current flowing out of the leading bridge arm.

The controller controls, based on the current flowing into the compensation circuit or the current flowing out of the leading bridge arm at the turn-off moment of the controllable switching transistor in the leading bridge arm, the switch in the leading-bridge-arm impedance adjustment circuit to be turned on or off.

The working principle of the lagging-bridge-arm impedance adjustment circuit when the lagging-bridge-arm impedance adjustment circuit includes at least one controllable inductive branch is similar to the working principle of the leading-bridge-arm impedance adjustment circuit. The controller controls, based on a current flowing into the compensation circuit or a current flowing out of a lagging bridge arm at a turn-off moment of a controllable switching transistor in the lagging bridge arm, a switch in the lagging-bridge-arm impedance adjustment circuit to be turned on or off.

Figure 3A:
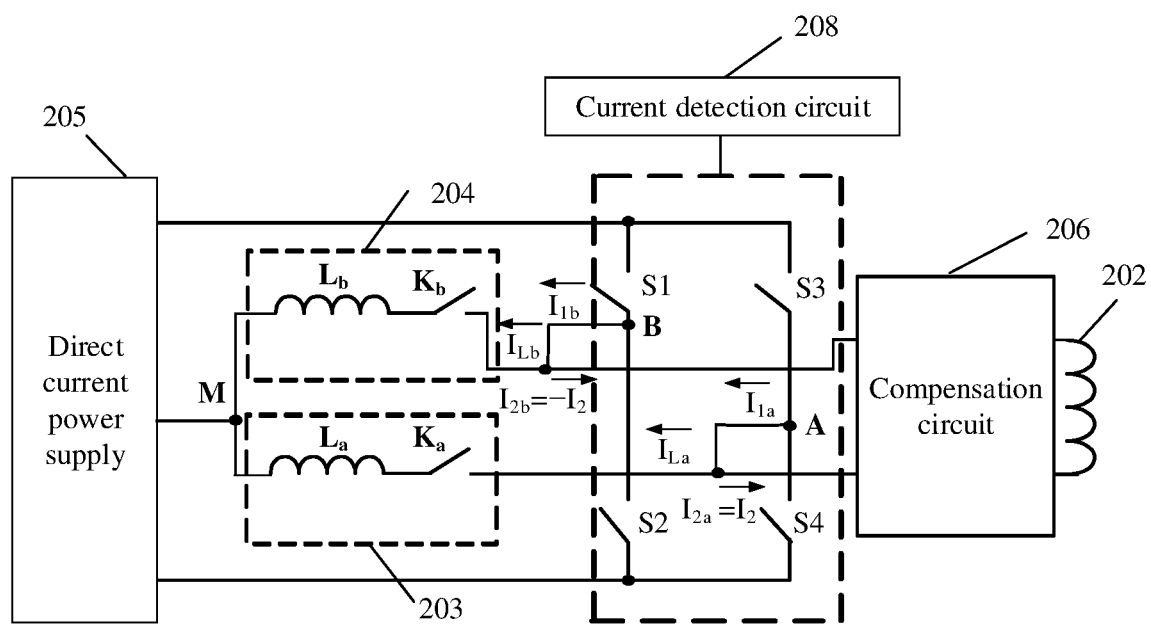
FIG. 3a is a circuit diagram in which a leading-bridge-arm impedance adjustment circuit and a lagging-bridge-arm impedance adjustment circuit in a wireless charging transmitting apparatus each include one inductive branch according to Apparatus Embodiment 2.

FIG. 3*a* is a circuit diagram in which an impedance adjustment circuit includes a leading-bridge-arm impedance adjustment circuit and a lagging-bridge-arm impedance adjustment circuit and the leading-bridge-arm impedance adjustment circuit and the lagging-bridge-arm impedance adjustment circuit each include one controllable inductive branch according to Embodiment 2.

The circuit provided in this embodiment further includes a current detection circuit 208.

The current detection circuit 208 is configured to: detect a current flowing into a compensation circuit or a current flowing out of a leading bridge arm at a turn-off moment of a controllable switching transistor in the leading bridge arm and a current flowing into the compensation circuit or a current flowing out of a lagging bridge arm at a turn-off moment of a controllable switching transistor in the lagging bridge arm; and send, to a controller, the detected current flowing into the compensation circuit or current flowing out of the leading bridge arm at the turn-off moment of the controllable switching transistor in the leading bridge arm and the detected current flowing into the compensation circuit or current flowing out of the lagging bridge arm at the turn-off moment of the controllable switching transistor in the lagging bridge arm.

For descriptions about an inverter circuit 201, a transmitting coil 202, a direct current power supply 205, and the compensation circuit 206, refer to the foregoing description. A direction in which a current flows out of the leading bridge arm or the lagging bridge arm is a positive direction, and a positive direction of a voltage is shown in the figure. Details are not described herein again.

When the leading-bridge-arm impedance adjustment circuit and the lagging-bridge-arm impedance adjustment circuit each include only one inductive branch, and the inductive branch in the leading-bridge-arm impedance adjustment circuit or the lagging-bridge-arm impedance adjustment circuit is disconnected, a current flowing into the compensation circuit is equal to a current flowing out of the leading bridge arm or the lagging bridge arm. Therefore, the following provides a description by using an example in which the current detection circuit 208 detects the current flowing into the compensation circuit.

In this embodiment, the inductive branch in the leading-bridge-arm impedance adjustment circuit 203 includes an inductor La and a switch Ka that are connected in series, a first end of the inductor La is connected to an output port M of the direct current power supply 205, and a second end of the inductor La is connected to a middle point A of the leading bridge arm through the switch Ka, that is, connected between the controllable switching transistors S3 and S4. In this case, because the leading-bridge-arm impedance adjustment branch includes only one inductive branch, a controller controls the switch Ka in the inductive branch to be turned on or off. The controller is not shown in FIG. 3a.

In FIG. 3a, a turn-off current in the leading bridge arm is $I_{1a}$, a current in the inductive branch is $I_{La}$, and a current flowing into the compensation circuit 206 is $I_{2a}$, in other words, $I_{2a}$ is an output current of the inverter circuit 201. The following relationship exists between $I_{1a}$, $I_{La}$, and $I_{2a}$:

$$I_{1a} = I_{La} + I_{2a} \quad (1)$$

As shown in Formula (1), when the inductive branch is disconnected, $I_{La}=0$. In this case, the turn-off current $I_{1a}$ in the leading bridge arm is equal to the current $I_{2a}$ flowing into the compensation circuit. When the inductive branch is connected, the inductive current $I_{La}$ is injected into the leading bridge arm through the inductive branch. This may affect a part of the current $I_{1a}$ in the leading bridge arm. For details thereof, refer to schematic diagrams of waveform relationships shown in FIG. 3b and FIG. 3c. $\theta_a$ in the figures represents a phase shift angle. The phase shift angle refers to a phase difference between a middle point voltage of the leading bridge arm and a middle point voltage of the lagging bridge arm.

In this case, the controller controls the switch in the inductive branch to be turned on or off, to control whether to inject the inductive current $I_{Lb}$ into the leading bridge arm through the inductive branch.

Similarity, in FIG. 3a, a turn-off current in the lagging bridge arm is $I_{1b}$, a current in the inductive branch is $I_{Lb}$, and a current flowing into the compensation circuit 206 is $I_{2b}$, in other words, $I_{2b}$ is also an output current of the inverter circuit 201. The following relationship exists between $I_{1b}$, $I_{Lb}$, and $I_{2b}$:

$$I_{1b} = I_{Lb} + I_{2b} \quad (2)$$

As shown in Formula (2), when the inductive branch is disconnected, $I_{Lb}=0$. In this case, the turn-off current $I_{1b}$ in the lagging bridge arm is equal to the current $I_{2b}$ flowing into the compensation circuit. When the inductive branch is connected, the inductive branch injects the inductive current $I_{Lb}$ into the lagging bridge arm. This may affect part of the current $I_{1b}$ in the lagging bridge arm. For details thereof, further refer to schematic diagrams of waveform relationships shown in FIG. 3b, FIG. 3c, and FIG. 3d. $\theta_b$ in the figures represents a phase shift angle.

In this case, the controller controls on/off of the switch in the inductive branch, to control whether the inductive branch injects the inductive current $I_{Lb}$ into the lagging bridge arm.

An output current of the inverter circuit 201 is $I_2$. $I_{2a}=-I_{2b}=I_2$ (3)

A direction in which a current flows out of the leading bridge arm or the lagging bridge arm is a positive direction. It is determined in advance that maximum values of the turn-off current in the leading bridge arm or the lagging bridge arm when the controllable switching transistors in the leading bridge arm or the lagging bridge arm can implement ZVS in cases in which the inverter circuit is at different output powers are set to preset currents $I_0$ ($I_0<0$). A preset current may alternatively be appropriately adjusted according to an actual requirement. For example, a current value that is less than $I_0$ but is relatively close to $I_0$ may be selected as the preset current, or the preset current may be adjusted based on a voltage of a capacitor in the compensation circuit.

When the current detection circuit 208 detects that the current flowing into the compensation circuit at the turn-off moment of the controllable switching transistor in the leading bridge arm is $I_3$, it can be understood that, when none of the inductive branches are connected, the current $I_3$ is equal to the current flowing out of the leading bridge arm. The controller compares $I_3$ with a preset current $I_0$. When $I_3>I_0$, the controllable switching transistors in the leading bridge arm cannot implement ZVS. The controller controls the inductive branch to be connected, and an inductive current is injected into the middle point of the leading bridge arm through the inductive branch, so that the controllable switching transistors in the lagging bridge arm implement ZVS. When $I_3<I_0$, the controllable switching transistors in the lagging bridge arm can already implement ZVS. The controller disconnects the inductive branch to reduce power consumption. Similarly, the current detection circuit 208 detects the current flowing into the compensation circuit at the turn-off moment of the controllable switching transistor in the lagging bridge arm, and compares the current with the preset current $I_0$, and the controller controls whether the inductive branch needs to be connected, to implement ZVS.

In addition, when an output power of the inverter circuit is determined, connectivity of the inductive branch may alternatively be controlled based on a phase shift angle.

The controller searches, based on the output power, for a correspondence between the phase shift angle and a current flowing out of the lagging bridge arm at a turn-off moment of a controllable switching transistor in the lagging bridge arm, where different output powers correspond to different correspondences; and obtains, based on the found correspondence, a phase shift angle interval to which the current phase shift angle of the inverter circuit belongs, and controls, based on the phase shift angle interval, on or off of the switch in the inductive branch, where different phase shift angle intervals correspond to different quantities of connected inductive branches.

When the inductive branch is not connected, a current flowing out of the leading bridge arm or the lagging bridge arm is equal to an absolute value of a current $I_2$ flowing into the compensation circuit. A direction in which the current flows out of the leading bridge arm or the lagging bridge arm is a positive direction, a correspondence between phase shift angles of the inverter circuit at different output powers and a current flowing out of the leading bridge arm at the turn-off moment of the controllable switching transistor in the leading bridge arm or a current flowing out of the lagging bridge arm at the turn-off moment of the controllable switching transistor in the lagging bridge arm is pre-established. In other words, the correspondence is also a correspondence between phase shift angles of the inverter circuit at different output powers and the current $I_2$ flowing into the compensation circuit. Different output powers correspond to different correspondences. For ease of description, the following uses turn-off currents of the leading bridge arm and the lagging bridge arm to respectively represent the current flowing out of the leading bridge arm at the turn-off moment of the controllable switching transistor in the leading bridge arm and the current flowing out of the lagging bridge arm at the turn-off moment of the controllable switching transistor in the lagging bridge arm. During implementation, the correspondence may be implemented by using a curve or a table. For example, different output powers correspond to different curves. The curve is a two-dimensional curve of the phase shift angle and the turn-off current of the leading or lagging bridge arm. In other words, the two-dimensional curve represents a correspondence between the phase shift angle and the turn-off current of the lagging bridge arm.

It should be noted that, when efficiency of transmission between the wireless charging transmitting apparatus and a wireless charging receiving apparatus is not considered, an output power of the inverter circuit 201 is equivalent to an output power of the wireless charging receiving apparatus, and the transmission efficiency is usually less than 100%. There may be a conversion relationship between the output power of the inverter circuit and the output power of the wireless charging receiving apparatus. Therefore, as the controller controls on or off of the switch in the inductive branch based on a current phase shift angle of the inverter circuit 201 and the output power of the wireless charging receiving apparatus. The output power of the wireless charging receiving apparatus is an output power of a wireless charging system.

When the output power of the inverter circuit is determined, connectivity of the inductive branch may be controlled based on the phase shift angle.

Figure 3B:
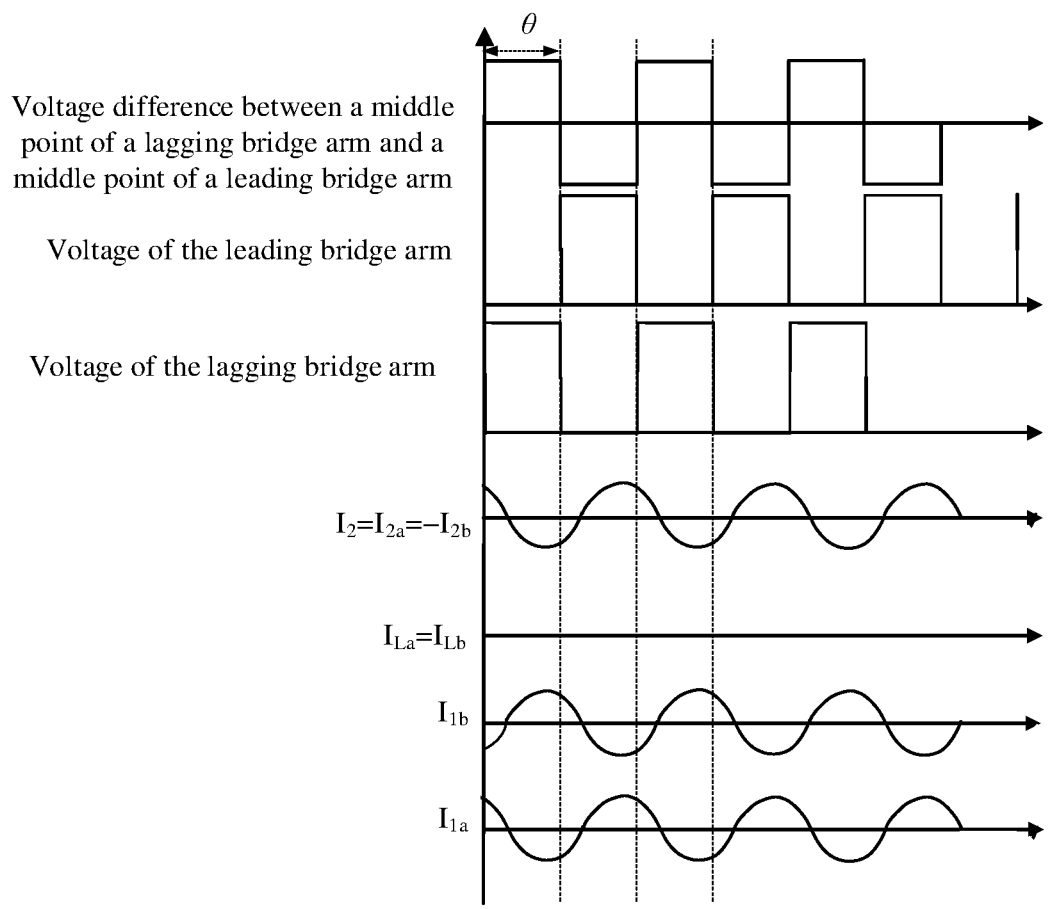
FIG. 3b is a schematic diagram of a waveform relationship existing when a phase shift angle corresponding to FIG. 3a is relatively large.

As shown in FIG. 3b, when the phase shift angle is relatively large, a phase of the current $I_2$ flowing into the compensation circuit 206 (namely, the output current of the inverter circuit 201) has lagged behind a phase of an output voltage $U_1$ of the leading bridge arm in the inverter circuit 201 (a voltage between the middle point of the leading bridge arm and a negative bus). When the current $I_{1a}$ in the leading bridge arm is the current $I_2$ flowing into the compensation circuit 206, the controllable switching transistors S3 and S4 can already implement ZVS. Similarly, the phase of the current $I_2$ flowing into the compensation circuit 206 (namely, the output current of the inverter circuit 201) has lagged behind a phase of an output voltage $U_2$ of the lagging bridge arm in the inverter circuit 201 (a voltage between a middle point of the lagging bridge arm and the negative bus). When the current $I_{1b}$ in the lagging bridge arm is the current $I_2$ flowing into the compensation circuit 206, controllable switching transistors S1 and S2 can already implement ZVS. In this case, the controller controls a switch $K_a$ in the leading-bridge-arm impedance adjustment circuit and a switch $K_b$ in the lagging-bridge-arm impedance adjustment circuit to be turned off, and the inductive currents $I_{La}$ and $I_{Lb}$ are not injected into the lagging bridge arm through the inductive branches, to avoid power consumption caused by connection of inductors.

Figure 3C:
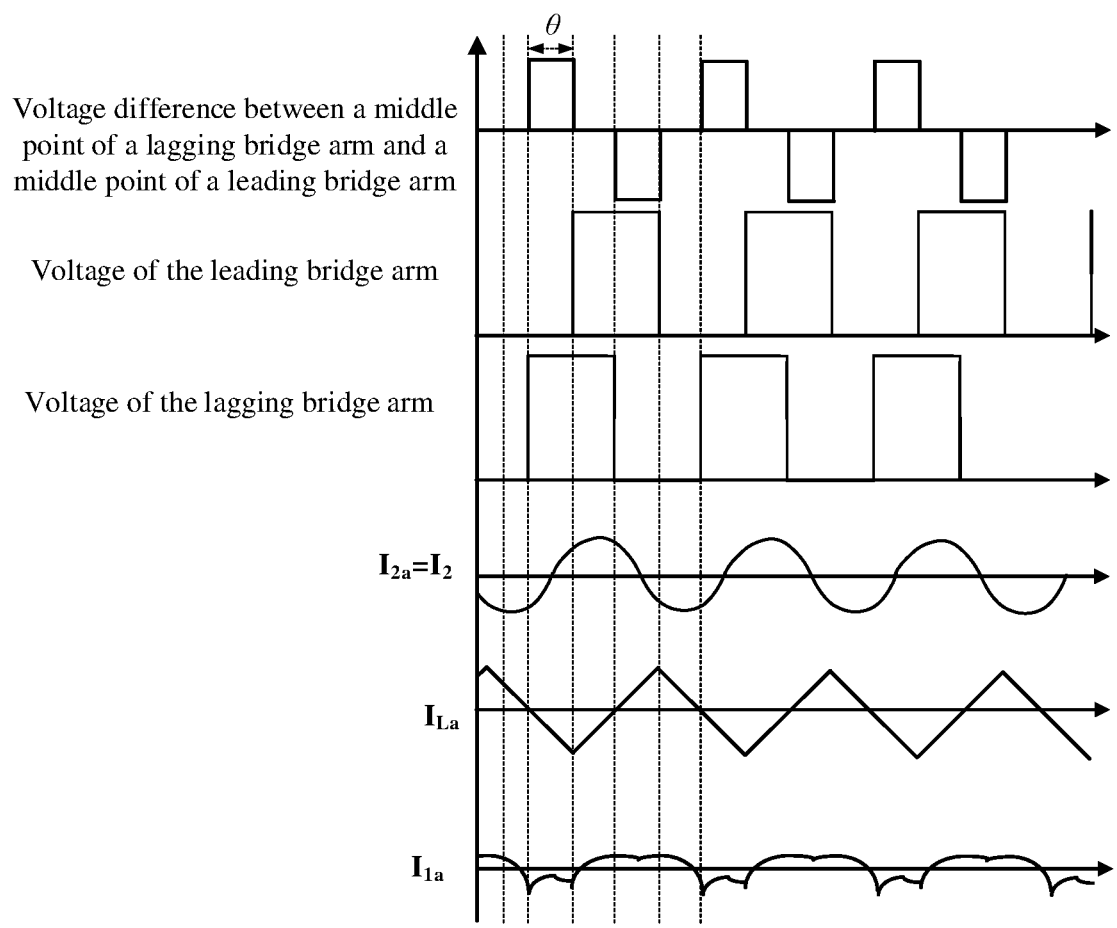
FIG. 3c is a schematic diagram of a waveform relationship of a leading bridge arm when a phase shift angle corresponding to FIG. 3a is relatively small.

As shown in FIG. 3c, when the phase shift angle is relatively small, the phase of the current $I_2$ flowing into the compensation circuit 206 is ahead of the phase of the output voltage $U_1$ of the leading bridge arm in the inverter circuit 201, and the controllable switching transistors S3 and S4 in the leading bridge arm cannot implement ZVS. In this case, the controller controls the switch $K_a$ in the inductive branch to be closed, so that an inductive current $I_{La}$ is injected into the leading bridge arm through the inductive branch. The inductive current $I_{La}$ and the current $I_{2a}$ flowing into the compensation circuit 206 are superposed, so that a phase of a current in the leading bridge arm lags behind the phase of the output voltage $U_1$ of the leading bridge arm in the inverter circuit 201. In this way, the controllable switching transistors S3 and S4 in the leading bridge arm implement ZVS.

Figure 3D:
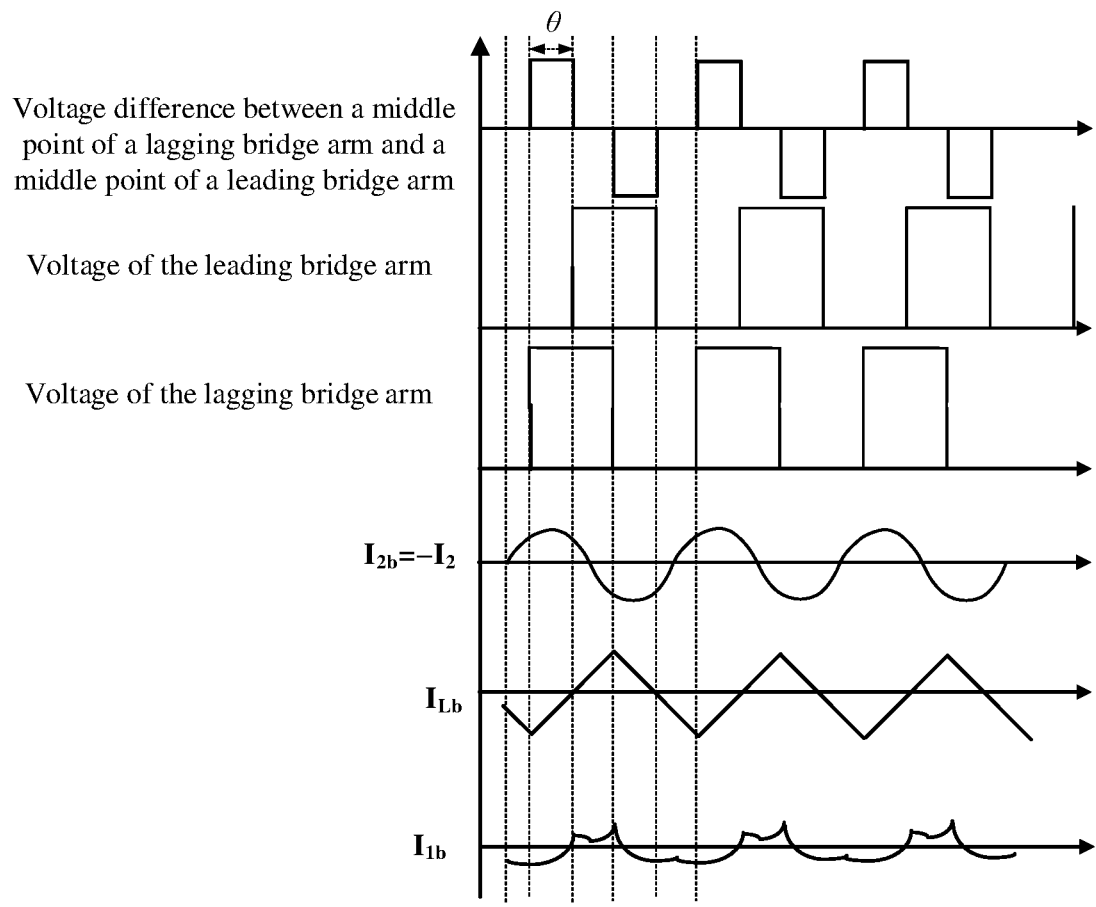
FIG. 3d is a schematic diagram of a waveform relationship of a lagging bridge arm when a phase shift angle corresponding to FIG. 3a is relatively small.

As shown in FIG. 3d, when the phase shift angle is relatively small, the phase of the current $I_2$ flowing into the compensation circuit 206 is ahead of the phase of the output voltage $U_2$ of the lagging bridge arm in the inverter circuit 201, and the controllable switching transistors S1 and S2 in the lagging bridge arm cannot implement ZVS. In this case, the controller controls the switch $K_b$ in the inductive branch to be closed, so that an inductive current $I_{Lb}$ is injected into the lagging bridge arm through the inductive branch. The inductive current $I_{Lb}$ and the current $I_{2b}$ flowing into the compensation circuit 206 are superposed, so that a phase of a current in the lagging bridge arm lags behind the phase of the output voltage $U_2$ of the lagging bridge arm in the inverter circuit 201. In this way, the controllable switching transistors S1 and S2 in the lagging bridge arm implement ZVS.

A maximum value that the turn-off current in the leading bridge arm can reach when the controllable switching transistors in the leading bridge arm implement ZVS may be preset to a preset current $I_0$, and different output powers of the inverter circuit 201 correspond to different preset currents $I_0$. A phase shift angle $\theta_0$ corresponding to a preset current $I_0$ is obtained in advance from each two-dimensional curve. By using the phase shift angle $\theta_0$ as a preset angle, two phase shift angle intervals, namely, an interval to which a phase shift angle greater than the preset angle $\theta_0$ belongs and an interval to which a phase shift angle less than or equal to the preset angle $\theta_0$ belongs, are obtained through division.

Figure 3E:
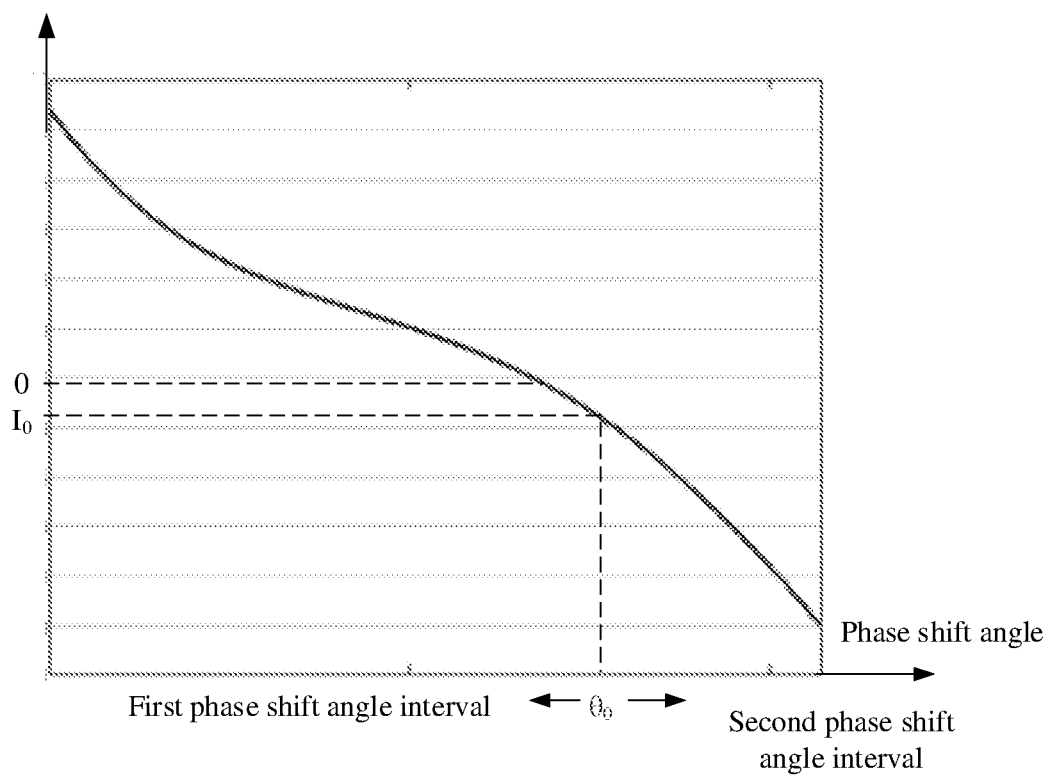
FIG. 3e is a curve graph of a relationship between a current $I_{1a}$ in a leading bridge arm and a phase shift angle when a leading-bridge-arm impedance adjustment circuit and a lagging-bridge-arm impedance adjustment circuit each include one inductive branch according to Embodiment 2.

FIG. 3e is a graph showing a relationship curve that is of $I_{1a}$ and a phase shift angle and that exists when an impedance adjustment branch includes one inductive branch according to Embodiment 2.

When the inductive branch is not connected, $I_{2a}$ is equal to $I_{1a}$, and $I_{2a}$ and $I_{1a}$ are equal to $I_2$.

A direction in which a current flows out of the leading bridge arm is a positive direction. It is determined in advance that maximum values of the turn-off current in the leading bridge arm when the controllable switching transistors in the leading bridge arm can implement ZVS in cases in which the inverter circuit is at different output powers are set to preset currents $I_0$ ($I_0<0$). It can be understood that, a preset current may alternatively be appropriately adjusted according to an actual requirement. For example, a current value that is less than $I_0$ but is relatively close to $I_0$ may be selected as the preset current, or the preset current may be adjusted based on a voltage of a capacitor in the compensation circuit.

A phase shift angle corresponding to the preset current $I_0$ is a preset angle $\theta_0$, an interval to which a phase shift angle less than $\theta_0$ belongs is a first phase shift angle interval, and an interval to which a phase shift angle greater than $\theta_0$ belongs is a second phase shift angle interval.

When the current phase shift angle of the inverter circuit is within the first phase shift angle interval, that is, the current phase shift angle is less than the preset angle, the controllable switching transistors in the lagging bridge arm cannot implement ZVS, and the controller needs to control the inductive branch to be connected, to inject the inductive current into the middle point of the lagging bridge arm. When the current phase shift angle of the inverter circuit is within the second phase shift angle interval, that is, the current phase shift angle is greater than the preset angle, the controllable switching transistors in the leading bridge arm can already implement ZVS in this case, and the inductive branch may be disconnected to reduce power consumption.

Similarly, a connected/disconnected status of the inductive branch in the lagging bridge arm may be controlled based on a curve graph of a relationship between a current $I_{1b}$ in the lagging bridge arm and a phase shift angle, to ensure that the controllable switching transistors in the lagging bridge arm implement ZVS.

In addition, as described above, a quantity of inductive branches in the leading-bridge-arm impedance adjustment circuit 203 or the lagging-bridge-arm impedance adjustment circuit 203 is not limited, and may be selected and set according to an actual requirement and a size and costs of hardware. If there are a larger quantity of inductive branches, more inductance values are correspondingly presented, and corresponding matching with a phase shift angle is more accurate. The controller controls an on-off status of a switch in each inductive branch, and can adjust a value of an inductive current injected into the leading bridge arm or the lagging bridge arm through the impedance adjustment circuit, so that the controllable switching transistors in the lagging bridge arm can implement ZVS at different phase shift angles.

An inductor L and a switch K in each inductive branch in the leading-bridge-arm impedance adjustment circuit 203 or the lagging-bridge-arm impedance adjustment circuit 203 may be connected in parallel. Each inductive branch includes but is not limited to only one inductor L, and may include a plurality of inductors connected in parallel or connected in series. Values of inductors in all branches may be the same or different, many inductance values are presented, and corresponding matching with a phase shift angle is more accurate.

Apparatus Embodiment 3

Figure 4:
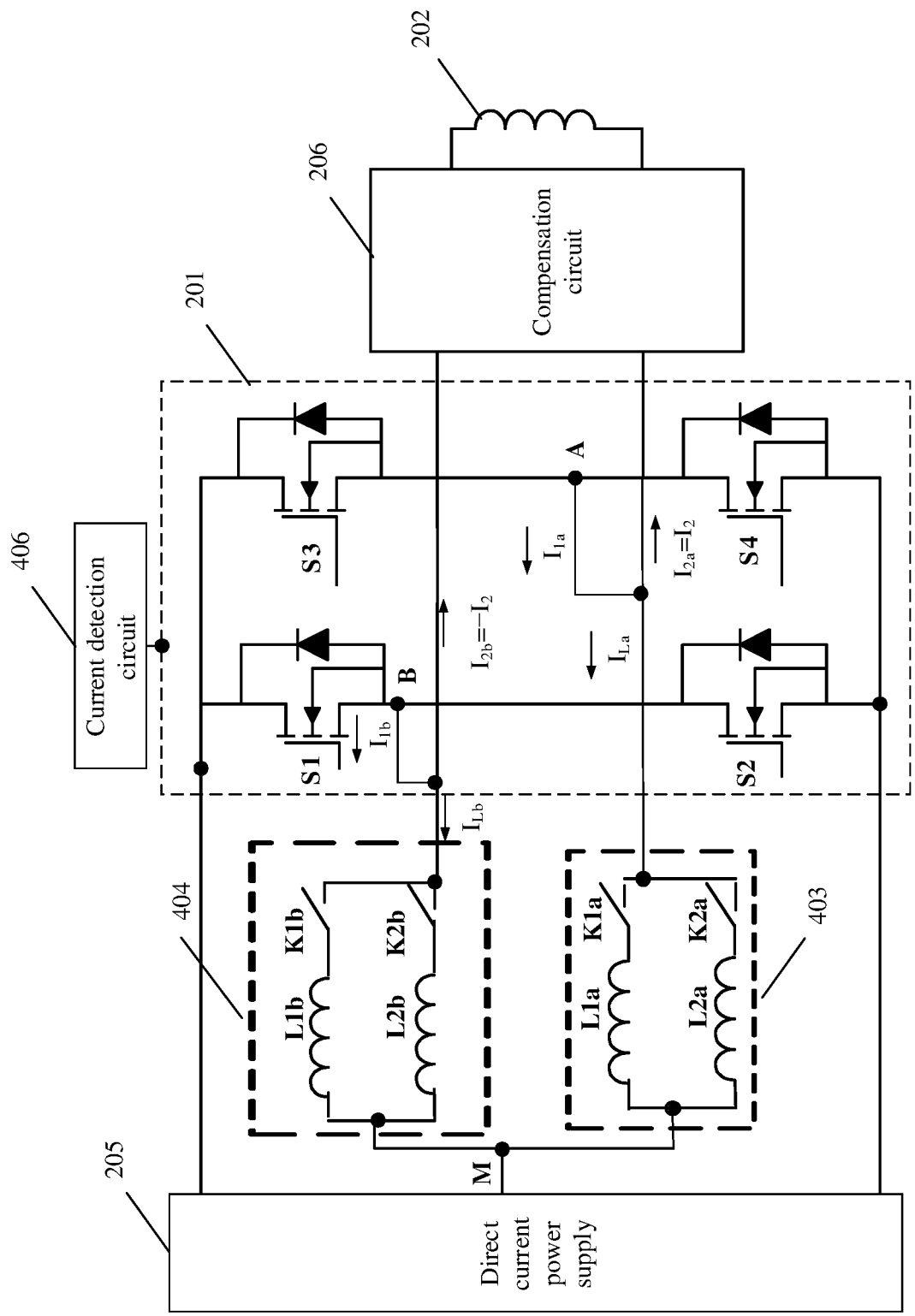
FIG. 4 is a circuit diagram in which a leading-bridge-arm impedance adjustment circuit and a lagging-bridge-arm impedance adjustment circuit each include two inductive branches according to Embodiment 3.

FIG. 4 is a circuit diagram in which a leading-bridge-arm impedance adjustment circuit and a lagging-bridge-arm impedance adjustment circuit in a wireless charging transmitting apparatus each include two inductive branches.

For descriptions of an inverter circuit 201, a transmitting coil 202, a direct current power supply 205, and a compensation circuit 206 in the circuit, refer to the foregoing descriptions, and details are not described herein again.

The leading-bridge-arm impedance adjustment circuit 403 includes a first inductive branch and a second inductive branch. The first inductive branch includes a first inductor L1a and a first switch K1a that are connected in series, a first end of L1a is connected to an output port M of the direct current power supply, and a second end of L1a is connected to a middle point A of a leading bridge arm through K1a. The second inductive branch includes a second inductor L2a and a second switch K2a that are connected in series, a first end of L2a is connected to the output port M of the direct current power supply, and a second end of L2a is connected to the middle point of the leading bridge arm through K2a. Inductance values of the first inductor L1a and the second inductor L2a may be the same or different. This is not limited.

A controller (not shown) controls, based on a current in the leading bridge arm at a turn-off moment of a controllable switching transistor (namely, a controllable switching transistor S3 or S4) in the leading bridge arm, the first switch K1a and the second switch K2a to be turned on or off. The turn-off moment is a corresponding moment at which the controllable switching transistor is switched from on to off; and a turn-on moment is a corresponding moment at which the controllable switching transistor is switched from off to on. In an actual operation, an actual turn-off moment and an actual turn-on moment of the switching transistor are respectively a delay time later than the turn-off moment and the turn-on moment indicated by signals sent by the controller. Therefore, in this embodiment, a period from the turn-off moment to the turn-on moment is a longest period that is from the turn-off moment to the turn-on moment and that includes a signal delay time.

The first inductive branch and the second inductive branch are connected in parallel to form the adjustment branch, a first end of the leading-bridge-arm impedance adjustment circuit is connected to the middle point A of the leading bridge arm, that is, connected between the controllable switching transistors S3 and S4; and a second end of the leading-bridge-arm impedance adjustment circuit is connected to the output port M of the direct current power supply 205.

In FIG. 4, a turn-off current in the leading bridge arm is $I_{1a}$, a current in the leading-bridge-arm impedance adjustment circuit is $I_{La}$, an output current of the inverter circuit 201 is $I_2=I_{2a}$, and $I_{1a}$, $I_{La}$, and $I_{2a}$ still satisfy Formula (1), namely, $I_{1a}=I_{La}+I_{2a}$. The current $I_{La}$ in the leading-bridge-arm impedance adjustment circuit is a sum of currents passing through the two inductive branches.

The inductive current $I_{La}$ is injected into the leading bridge arm through the leading-bridge-arm impedance adjustment circuit, so that electrical resistance of the turn-off current $I_{1a}$ in the leading bridge arm is affected. In this case, the controller controls a switch in each inductive branch to be turned on or off, to control a value of the inductive current $I_{La}$ injected into the leading bridge arm through the inductive branch.

When none of the inductive branches are connected, the turn-off current $I_{1a}$ in the leading bridge arm is equal to the current $I_{2a}$ flowing into the compensation circuit. Similarly, a direction in which a current flows out of the leading bridge arm is a positive direction.

It is determined in advance that maximum values of the turn-off current in the leading bridge arm when the controllable switching transistors in the leading bridge arm can implement ZVS in cases in which the inverter circuit is at different output powers, output voltages, receive-end matching networks, and offset locations are set to preset currents $I_0$. When one of the inductive branches has been connected, $I_{2a}$ is not equal to $I_{1a}$, and the connected inductive branch affects a value of $I_{1a}$.

When one inductive branch of the two controllable inductive branches has been connected, a maximum value that the turn-off current in the leading bridge arm can reach when the controllable switching transistors in the leading bridge arm implement ZVS is set to a threshold current $I_4$, and the threshold current $I_4$ is greater than a preset current $I_0$, because an inductive current is injected into the leading bridge arm when the inductive branch is connected. Different output powers, output voltages, receive-end matching networks, and offset locations of the inverter circuit 201 correspond to different preset currents $I_0$ and threshold currents $I_4$.

As shown in FIG. 4, the circuit provided in this embodiment further includes a current detection circuit 406. The current detection circuit 406 is configured to detect a current flowing into the compensation circuit or a current flowing out of the leading bridge arm at the turn-off moment of the controllable switching transistor in the leading bridge arm, and send, to the controller, the detected current flowing into the compensation circuit or current flowing out of the leading bridge arm at the turn-off moment of the controllable switching transistor in the leading bridge arm. When none of the inductive branches are connected, the current detection circuit 406 detects that a current flowing into the compensation circuit at a turn-off moment of a controllable switching transistor in a lagging bridge arm is $I_3$, and the current $I_3$ is equal to the current $I_{1a}$ flowing out of the leading bridge arm. The controller compares $I_3$ with current interval values ($I_0$ and $I_4$). When $I_3$ falls within different intervals, the controller correspondingly controls different quantities of inductive branches to be closed.

When $I_{3>I_4}$, the controllable switching transistors in the leading bridge arm cannot implement ZVS and requires a relatively large inductive current, and the controller controls both the first inductive branch and the second inductive branch to be connected to inject a sufficient inductive current into the middle point A of the leading bridge arm. When $I_4 > I_3 > I_0$, the controllable switching transistor in the leading bridge arm cannot implement soft switching, and in this case, the controller only needs to control either of the first inductive branch or the second inductive branch to be connected to inject a sufficient inductive current into the middle point A of the leading bridge arm. When $I_3 < I_0$, the controllable switching transistors in the leading bridge arm can already implement ZVS, and the controller disconnects the inductive branches to reduce power consumption.

When an inductive branch has been connected, the current detection circuit 406 may detect a current flowing out of the leading bridge arm at the turn-off moment of the controllable switching transistor in the leading bridge arm and send a detection result to the controller. The controller first obtains present currents in the inductive branches in the leading-bridge-arm impedance adjustment circuit and the lagging-bridge-arm impedance adjustment circuit based on the current flowing out of the leading bridge arm at the turn-off moment of the controllable switching transistor in the leading bridge arm and a present quantity of closed inductive branches, to obtain a current flowing into the compensation circuit; then obtains a difference between the current flowing into the compensation circuit and the preset current; and controls, based on the difference, switches in the inductive branches to be turned on or off. Different differences correspond to different quantities of connected inductive branches. Similarly, the current detection circuit 406 detects a current $I_{2b}$ flowing into the compensation circuit at the turn-off moment of the controllable switching transistor in the lagging bridge arm, compares the current $I_{2b}$ with the preset current $I_0$ and the threshold current $I_4$, and the controller controls whether the inductive branch needs to be connected, to implement ZVS.

Apparatus Embodiment 4

In addition to at least one controllable inductive branch, an inductive branch in a leading-bridge-arm impedance adjustment circuit or a lagging-bridge-arm impedance adjustment circuit in a wireless charging transmitting apparatus provided in this embodiment further includes a fixed inductive branch, and the fixed inductive branch includes at least one fixed inductor and is not controlled by a controllable switch. A first end of the fixed inductive branch is connected to a port M of a direct current power supply 205, and a second end of the fixed inductive branch is connected to a middle point A of a leading bridge arm or a middle point B of a lagging bridge arm.

Figure 5A:
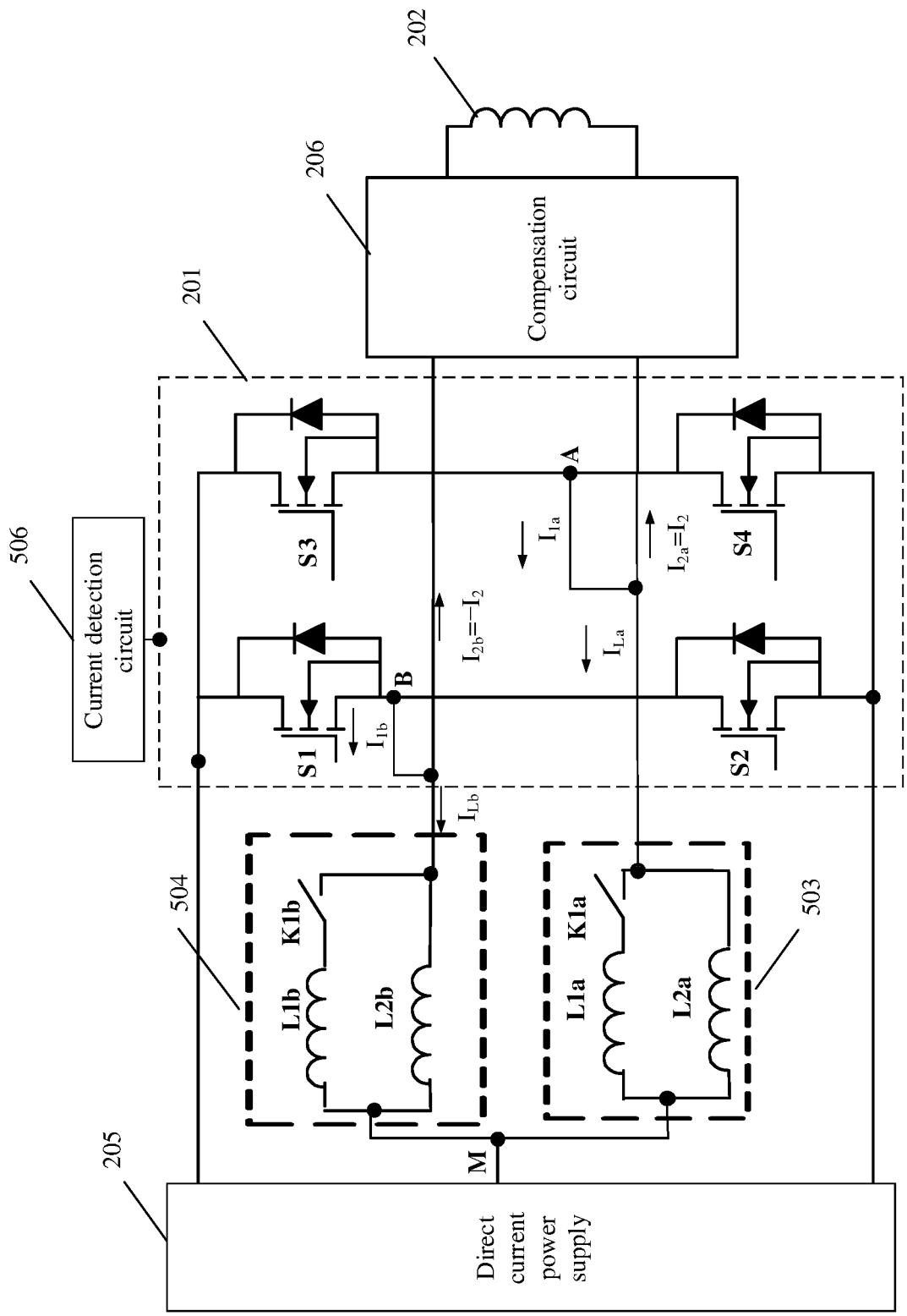
FIG. 5a is a circuit diagram in which a leading-bridge-arm impedance adjustment circuit and a lagging-bridge-arm impedance adjustment circuit each include one controllable inductive branch and one fixed inductive branch according to Embodiment 4.

FIG. 5a is a circuit diagram in which the leading-bridge-arm impedance adjustment branch in the wireless charging transmitting apparatus includes one controllable inductive branch and one fixed inductive branch.

For descriptions of an inverter circuit 201, a transmitting coil 202, a direct current power supply 205, and a compensation circuit 206 in the circuit, refer to the foregoing descriptions, and details are not described herein again.

The leading-bridge-arm impedance adjustment circuit 503 includes a first controllable inductive branch and a first fixed inductive branch. The first controllable inductive branch includes a first inductor L1a and a first switch K1a that are connected in series, a first end of L1a is connected to the output port M of the direct current power supply, and a second end of L1a is connected to the middle point A of the leading bridge arm through K1a. The first fixed inductive branch includes a second inductor L2a, a first end of L2a is connected to the output port M of the direct current power supply, and a second end of L2 is connected to the middle point A of the leading bridge arm. Inductance values of the first inductor L1a and the second inductor L2a may be the same or different. This is not limited. A value of the fixed inductor may be determined based on a characteristic of a load at a receive end. Even if an equivalent impedance at the receive end is resistive and capacitive, an inductive current is injected into the leading bridge arm through the fixed inductive branch, so that switching transistors in the leading bridge arm implement ZVS. A value of the fixed inductor may be related to a power of the load and is not limited in this embodiment.

A controller (not shown) controls, based on a current in the leading bridge arm at a turn-off moment of a controllable switching transistor (namely, a controllable switching transistor S3 or S4) in the leading bridge arm, the first switch K1a to be turned on or off. The turn-off moment is a corresponding moment at which the controllable switching transistor is switched from on to off.

The first controllable inductive branch and the first fixed inductive branch are connected in parallel to form the leading-bridge-arm impedance adjustment circuit, a first end of the leading-bridge-arm impedance adjustment circuit is connected to the middle point of the leading bridge arm, that is, connected between the controllable switching transistors S3 and S4; and a second end of the leading-bridge-arm impedance adjustment circuit is connected to the output port of the direct current power supply 205.

In FIG. 5a, a turn-off current in the leading bridge arm is $I_{1a}$, a current in the leading-bridge-arm impedance adjustment branch is $I_{La}$, an output current of the inverter circuit 201 is $I_2=I_{2a}$, and $I_{1a}$, $I_{La}$, and $I_{2a}$ still satisfy Formula (1), namely, $I_{1a}=I_{La}+I_{2a}$. The current $I_{La}$ in the leading-bridge-arm impedance adjustment circuit is a sum of currents passing through the first controllable inductive branch and the first fixed inductive branch.

The inductive current $I_{La}$ is injected into the leading bridge arm through the leading-bridge-arm impedance adjustment circuit, so that electrical resistance of the turn-off current $I_{1a}$ in the leading bridge arm is affected. Because no switch is disposed in the fixed inductive branch, the inductor in the fixed inductive branch continuously provides an inductive current for the leading bridge arm. In this case, the controller controls the switch in the first controllable inductive branch to be turned on or off, to control a value of the inductive current $I_{La}$ injected into the leading bridge arm through the controllable inductive branch. When the controllable inductive branch is not connected, the fixed inductive branch has been connected. In this case, $I_{2a}$ is not equal to $I_1$, and the fixed inductive branch affects a value of $I_1$.

FIG. 5a is the circuit diagram in which the leading-bridge-arm impedance adjustment circuit includes one controllable inductive branch and one fixed inductive branch according to Embodiment 4.

The circuit provided in this embodiment further includes a current detection circuit 506. The current detection circuit 506 is configured to detect a current flowing into the compensation circuit or a current flowing out of the leading bridge arm at the turn-off moment of the controllable switching transistor in the leading bridge arm, and send, to the controller, the detected current flowing into the compensation circuit or current flowing out of the leading bridge arm at the turn-off moment of the controllable switching transistor in the leading bridge arm. When only the fixed inductive branch is connected but the controllable inductive branch is not connected, the current detection circuit 506 detects that the current flowing into the compensation circuit at the turn-off moment of the controllable switching transistor in the leading bridge arm is $I_5$. Because there is a current $I_{fixed}$ in the fixed inductive branch, the current $I_5$ is smaller than the current $I_{1a}$ flowing out of the leading bridge arm. The controller compares $I_5+I_{fixed}$ with a preset current $I_0$. When Is falls within different intervals, the controller correspondingly controls different quantities of inductive branches to be closed.

When $I_5+I_{fixed}>I_0$, the controllable switching transistors in the leading bridge arm cannot implement soft switching and requires a larger inductive current, and the controller controls the controllable inductive branch to be connected. In this case, the controller only needs to control the first inductive branch to be connected to inject a sufficient inductive current into the middle point of the leading bridge arm. When $I_5+I_{fixed}<I_0$, the controllable switching transistors in the leading bridge arm can already implement ZVS, and the controller disconnects the inductive branch to reduce power consumption.

Similarly, the lagging-bridge-arm impedance adjustment branch may include one controllable inductive branch and one fixed inductive branch. The current detection circuit 306 detects a current flowing into the compensation circuit at a turn-off moment of a controllable switching transistor in a lagging bridge arm, and compares the current with the preset current $I_0$, and the controller controls whether the controllable inductive branch needs to be connected, to implement ZVS.

The leading-bridge-arm impedance adjustment branch and the lagging-bridge-arm impedance adjustment branch each may alternatively include at least one controllable inductive branch and at least one fixed inductive branch. The fixed inductive branch does not need to exist in both the leading-bridge-arm impedance adjustment circuit and the lagging-bridge-arm impedance adjustment circuit.

This embodiment is different from Embodiment 2 in that, the leading-bridge-arm impedance adjustment circuit or the lagging-bridge-arm impedance adjustment circuit in this embodiment includes at least one fixed inductor and is not controlled by a controllable switch. In this embodiment, when an equivalent impedance at the receive end is highly likely to be resistive and capacitive, an included fixed capacitor branch can automatically increase an inductive current flowing out of the leading bridge arm or the lagging bridge arm, without being controlled by the controller, to improve interoperability of a wireless charging apparatus. This ensures that the controllable switching transistors in the leading bridge arm and the lagging bridge arm can still implement ZVS when the equivalent impedance at the receive end is resistive and capacitive.

Figure 5B:
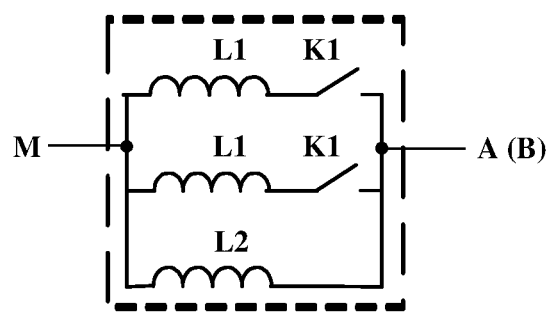
FIG. 5b is a circuit diagram in which a leading-bridge-arm impedance adjustment circuit and a lagging-bridge-arm impedance adjustment circuit each include two controllable inductive branches and one fixed inductive branch according to Embodiment 4.

In addition, as described above, a quantity of inductive branches in the leading-bridge-arm impedance adjustment circuit 203 or the lagging-bridge-arm impedance adjustment circuit 203 is not limited and may be selected and set according to an actual requirement and a size and costs of hardware. If there are a larger quantity of inductive branches, more inductance values are correspondingly presented, and corresponding matching with a phase shift angle is more accurate. The controller controls an on-off status of a switch in each inductive branch and can adjust a value of an inductive current injected into the leading bridge arm or the lagging bridge arm through the impedance adjustment circuit, so that the controllable switching transistors in the lagging bridge arm can implement ZVS at different phase shift angles. FIG. 5b shows a connection structure of controllable inductive branches and a fixed inductive branch in the leading-bridge-arm impedance adjustment circuit or the lagging-bridge-arm impedance adjustment circuit located between the port M of the direct current power supply 205 and the middle point A of the leading bridge arm or the middle point B of the lagging bridge arm. The leading-bridge-arm impedance adjustment circuit or the lagging-bridge-arm impedance adjustment circuit includes two controllable inductive branches and one fixed inductive branch, and the fixed inductive branch does not need to exist in both the leading-bridge-arm impedance adjustment circuit and the lagging-bridge-arm impedance adjustment circuit.

An inductor L and a switch K in each inductive branch in the leading-bridge-arm impedance adjustment circuit 503 or the lagging-bridge-arm impedance adjustment circuit 504 may be connected in parallel. Each inductive branch includes but is not limited to only one inductor L and may include a plurality of inductors connected in parallel or connected in series. Values of inductors in all branches may be the same or different, many inductance values are presented, and corresponding matching with a phase shift angle is more accurate.

Apparatus Embodiment 5

At least one inductive branch of a wireless charging transmitting apparatus provided in this embodiment further includes a first diode and a second diode. An anode of the first diode is connected to a common terminal of an inductor and a switch in the inductive branch, and a cathode of the first diode is connected to a positive direct current bus at an output end of a direct current power supply. A cathode of the second diode is connected to the common terminal of the inductor and the switch in the inductive branch, and an anode of the second diode is connected to a negative direct current bus at the output end of the direct current power supply. The first diode and the second diode form a diode clamp circuit. The following provides descriptions with reference to the accompanying drawings.

First, an example in which a leading-bridge-arm impedance adjustment circuit or a lagging-bridge-arm impedance adjustment circuit includes one inductive branch circuit is used for description.

Figure 6A:
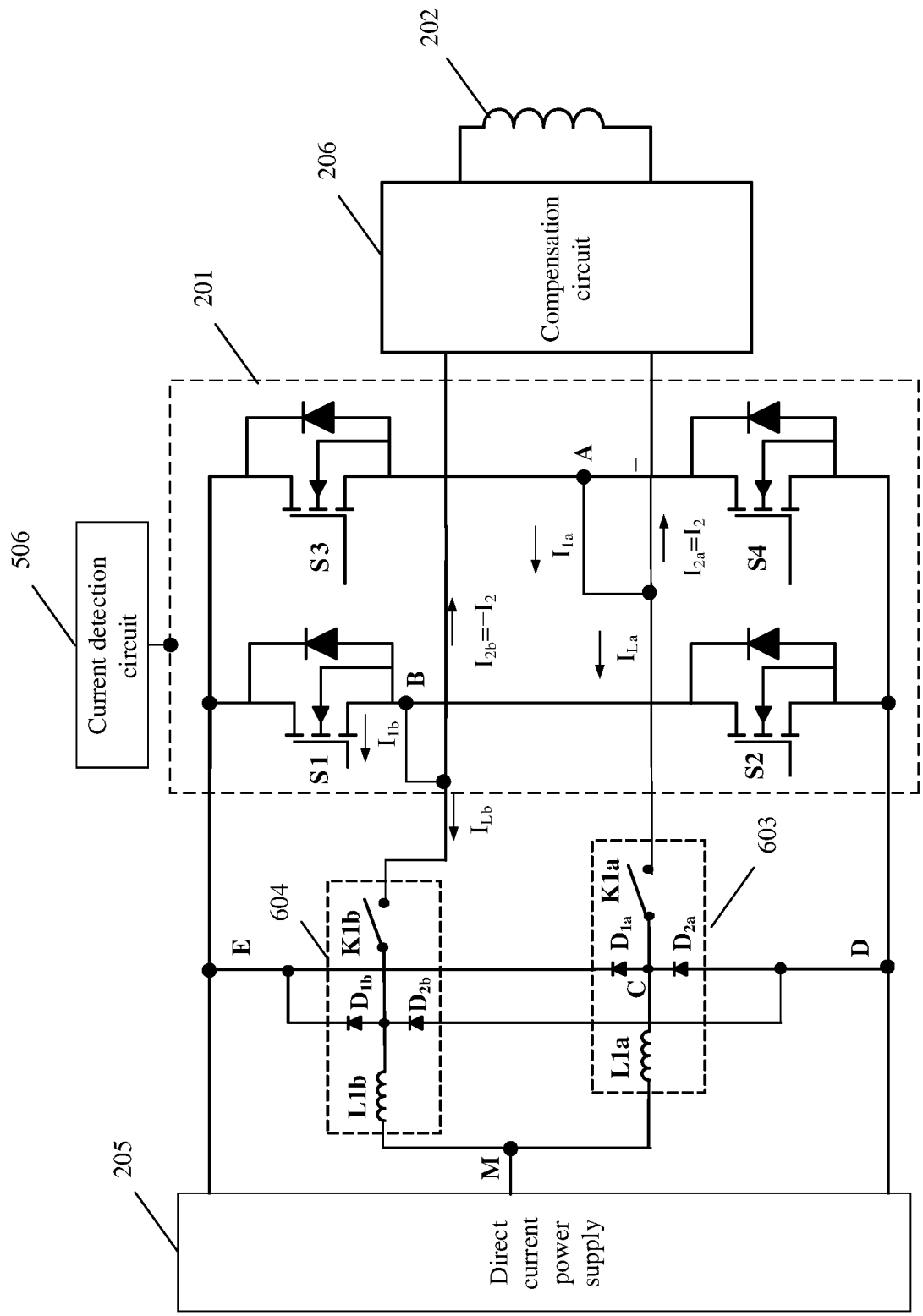
FIG. 6a is a circuit diagram in which a leading-bridge-arm impedance adjustment circuit and a lagging-bridge-arm impedance adjustment circuit each include one controllable inductive branch and there is a diode clamp circuit in the controllable inductive branch according to Embodiment 5.

FIG. 6a is a circuit diagram in which inductive branches in the leading-bridge-arm impedance adjustment circuit and lagging-bridge-arm impedance adjustment circuit each include one controllable inductive branch and there is a diode clamp circuit in the controllable inductive branch.

For descriptions of an inverter circuit 201, a transmitting coil 202, a direct current power supply 205, a compensation circuit 206, and a controller (not shown in FIG. 6a), refer to Apparatus Embodiment 1, and details are not described herein again.

The leading-bridge-arm impedance adjustment circuit 603 includes one controllable inductive branch, the controllable inductive branch includes an inductor L1a and a switch K1a that are connected in series, and the controllable inductive branch further includes a first diode D1a and a second diode D2a. An anode of the first diode D1a is connected to a common terminal of the inductor L1a and the switch K1a, a cathode of the first diode D1a is connected to a positive direct current bus of the direct current power supply 205, a cathode of the second diode D2a is connected to the common terminal of the inductor L1a and the switch K1a, and an anode of the second diode D2a is connected to a negative direct current bus of the direct current power supply 205.

A direction in which a current $I_{La}$ in the leading-bridge-arm impedance adjustment circuit flows out of a middle point of a leading bridge arm is a positive direction. When the controller controls the switch K1a to be switched from closed to opened and a present current of the inductor is negative, the first diode D1a is turned on, the second diode D2a is cut off, and the first diode D1a that is turned on provides a freewheeling path for the inductor L1a.

When the controller controls the switch K1a to be switched from closed to opened and a present current of the inductor is positive, and when the switch K1a is located on a right side of the inductor L1a, the first diode D1a is cut off, the second diode D2a is turned on, and the second diode D2a that is turned on provides a freewheeling path for the inductor L1a; and when the switch K1a is located on a left side of the inductor L1a, the first diode D1a is turned on, the second diode D2a is cut off, and the second diode D2a that is turned on provides a freewheeling path for the inductor L1a.

In addition, the diode clamp circuit can also enable a voltage $U_C$ at the common terminal C of the inductor L1a and the switch K1a to be stable within a safe range. An example in which both the first diode D1a and the second diode D2a each are a silicon transistor is used. A turn-on voltage drop of the silicon transistor is 0.7 V, a voltage in the positive direct current bus of the direct current power supply 205 is $U_E$, and a voltage in the negative direct current bus of the direct current power supply 205 is $U_D$. When $U_C-U_E>0.7$ V, the first diode D1a is turned on. When $U_D-U_C>0.7$ V, the second diode D2a is turned on. Therefore, the diode clamp circuit may enable the voltage $U_C$ to satisfy the following: $U_D-0.7$ V$<U_C<U_E+0.7$ V. In other words, a difference between a voltage peak value of $U_C$ and a voltage between the positive direct current bus and the negative direct current bus of the direct current power supply 205 is limited to being smaller than the turn-on voltage drop of the diode. This implements circuit protection. Similarly, the lagging-bridge-arm impedance adjustment circuit may include at least one controllable inductive branch and further include a first diode and a second diode. An anode of the first diode is connected to a common terminal of an inductor and a switch in the inductive branch, and a cathode of the first diode is connected to the positive direct current bus at an output end of the direct current power supply. A cathode of the second diode is connected to the common terminal of the inductor and the switch in the inductive branch, an anode of the second diode is connected to the negative direct current bus at the output end of the direct current power supply, and the first diode and the second diode form a diode clamp circuit, as shown in FIG. 6a.

Because the inductive branch in the impedance adjustment circuit may alternatively include a plurality of controllable inductive branches connected in parallel, the diode clamp circuit may alternatively be added to at least one of the controllable inductive branches. In this case, when a switch in each inductive branch including the diode clamp circuit is turned off, a freewheeling path can be provided for an inductor in the controllable inductive branch, and a voltage peak in each controllable inductive branch can be limited to being stable within a safe range, thereby improving reliability and stability of the circuit.

The following provides a description by using an example in which the inductive branch in the impedance adjustment circuit includes at least two controllable inductive branches: a first controllable inductive branch and a second controllable inductive branch.

Figure 6B:
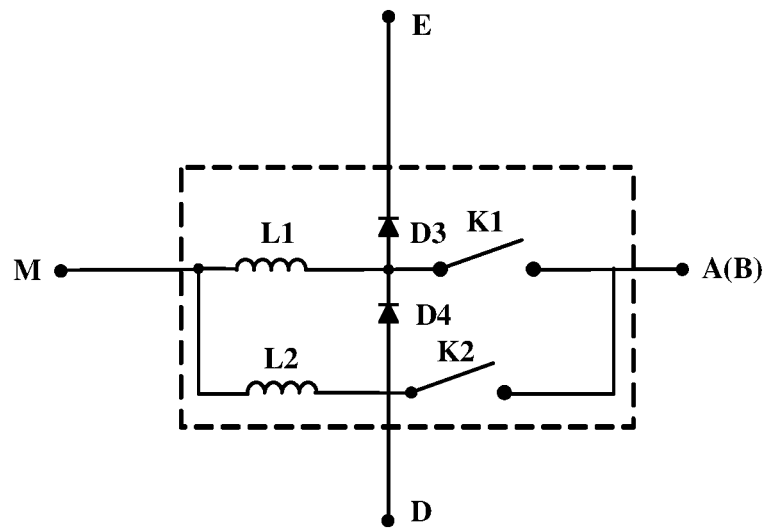
FIG. 6b is a circuit diagram in which an impedance adjustment circuit includes two controllable inductive branches and there is a diode clamp circuit in a first controllable inductive branch.

FIG. 6b is a circuit diagram in which a leading-bridge-arm impedance adjustment circuit or a lagging-bridge-arm impedance adjustment circuit includes two controllable inductive branches and there is a diode clamp circuit in a first inductive branch.

For descriptions of an inverter circuit 201, a transmitting coil 202, a direct current power supply 205, a compensation circuit 206, and a controller (not shown in FIG. 6b), refer to Apparatus Embodiment 1, and details are not described herein again.

The leading-bridge-arm impedance adjustment circuit 603 or the lagging-bridge-arm impedance adjustment circuit 604 includes two controllable inductive branches. The first controllable inductive branch includes a first inductor L1 and a first switch K1 that are connected in series, a first end of the first controllable inductive branch is connected to a middle point A of a leading bridge arm or a middle point B of a lagging bridge arm, and a second end of the first controllable inductive branch is connected to an output end M of the direct current power supply 205. The first controllable inductive branch further includes a first diode D3 and a second diode D4. An anode of the first diode D3 is connected to a common terminal of the first inductor L1 and the first switch K1 in the first inductive branch, a cathode of the first diode D3 is connected to a positive direct current bus E of the direct current power supply 205, a cathode of the second diode D4 is connected to the common terminal of the first inductor L1 and the first switch K1 in the first inductive branch, and an anode of the second diode D4 is connected to a negative direct current bus D of the direct current power supply 205. A second inductive branch includes a second inductor L2 and a second switch K2 that are connected in series.

When the diode clamp circuit includes the first diode D3 and the second diode D4, for a working principle, refer to a related description of a corresponding part of the circuit shown in FIG. 6*a*. Details are not described herein again.

Figure 6C:
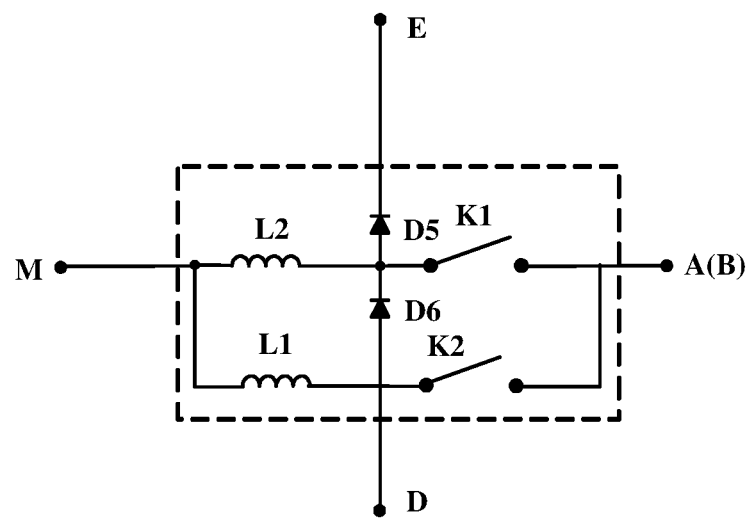
FIG. 6c is a circuit diagram in which an impedance adjustment circuit includes two controllable inductive branches and there is a diode clamp circuit in a second controllable inductive branch.

FIG. 6*c* is a circuit diagram in which a leading-bridge-arm impedance adjustment circuit or a lagging-bridge-arm impedance adjustment circuit includes two controllable inductive branches and there is a diode clamp circuit in a second controllable inductive branch.

A difference between the circuit shown in FIG. 6*c* and the circuit shown in FIG. 6*b* is that a second inductive branch of the circuit shown in FIG. 6*c* includes a first diode D5 and a second diode D6, an anode of the first diode D5 is connected to a common terminal of a second inductor L2 and a second switch K2 in the second inductive branch, a cathode of the first diode D5 is connected to a positive direct current bus E of the direct current power supply 205, a cathode of the second diode D6 is connected to the common terminal of the second inductor L2 and the second switch K2 in the second inductive branch, and an anode of the second diode D6 is connected to a negative direct current bus D of the direct current power supply 205. A first end of the second controllable inductive branch is connected to a middle point A of a leading bridge arm or a middle point B of a lagging bridge arm, a second end of the second controllable inductive branch is connected to an output end M of the direct current power supply 205, and the second controllable inductive branch is connected in parallel to a first controllable inductive branch.

When the diode clamp circuit includes the first diode D5 and the second diode D6, for a working principle, refer to a related description of a corresponding part of the circuit shown in FIG. 6*a*. Details are not described herein again.

Figure 6D:
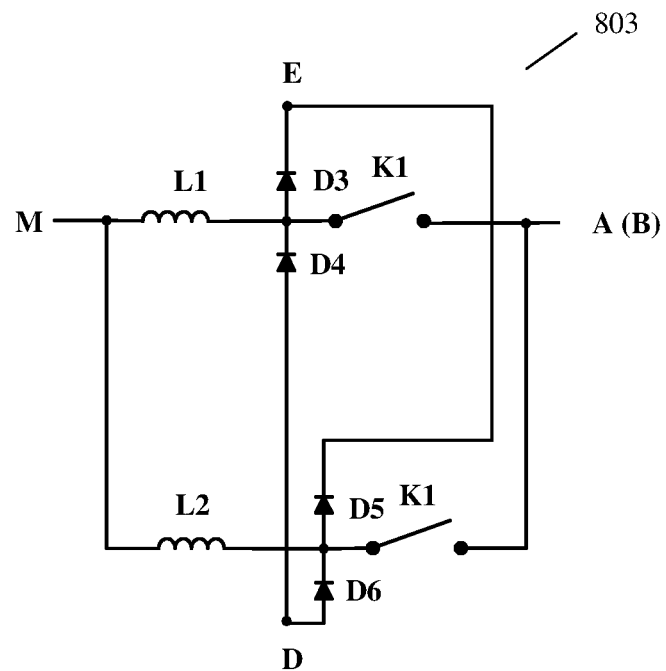
FIG. 6d is a circuit diagram in which an impedance adjustment circuit includes two controllable inductive branches and there is a diode clamp circuit in each controllable inductive branch.

FIG. 6*d* is a circuit diagram in which a leading-bridge-arm impedance adjustment circuit or a lagging-bridge-arm impedance adjustment circuit includes two controllable inductive branches and there is a diode clamp circuit in each controllable inductive branch.

A first controllable inductive branch of the circuit shown in FIG. 6*d* includes a first inductor L1 and a first switch K1 that are connected in series, and further includes a first diode D3 and a second diode D4. An anode of the first diode D3 is connected to a common terminal of the first inductor L1 and the first switch K1, a cathode of the first diode D3 is connected to a positive direct current bus E of the direct current power supply 205, a cathode of the second diode D4 is connected to the common terminal of the first inductor L1 and the first switch K1, and an anode of the second diode D4 is connected to a negative direct current bus D of the direct current power supply 205.

The second controllable inductive branch includes a second inductor L2 and a second switch K2 that are connected in series, and further includes a first diode D5 and a second diode D6. An anode of the first diode D5 is connected to a common terminal of the second inductor L2 and the second switch K2, a cathode of the first diode D5 is connected to the positive direct current bus E of the direct current power supply 205, a cathode of the second diode D6 is connected to the common terminal of the second inductor L2 and the second switch K2, and an anode of the second diode D6 is connected to the negative direct current bus D of the direct current power supply 205. A first end of the first controllable inductive branch is connected to a middle point A of a leading bridge arm or a middle point B of a lagging bridge arm, a second end of the first controllable inductive branch is connected to an output end M of the direct current power supply 205, and the second controllable inductive branch is connected in parallel to the first controllable inductive branch.

A diode clamp circuit formed by the first diode D3 and the second diode D4 acts on the first inductive branch, and a diode clamp circuit formed by the first diode D5 and the second diode D6 acts on the second inductive branch. For a working principle, refer to a related description of a corresponding part of the circuit shown in FIG. 6*a*. Details are not described herein again.

Figure 6E:
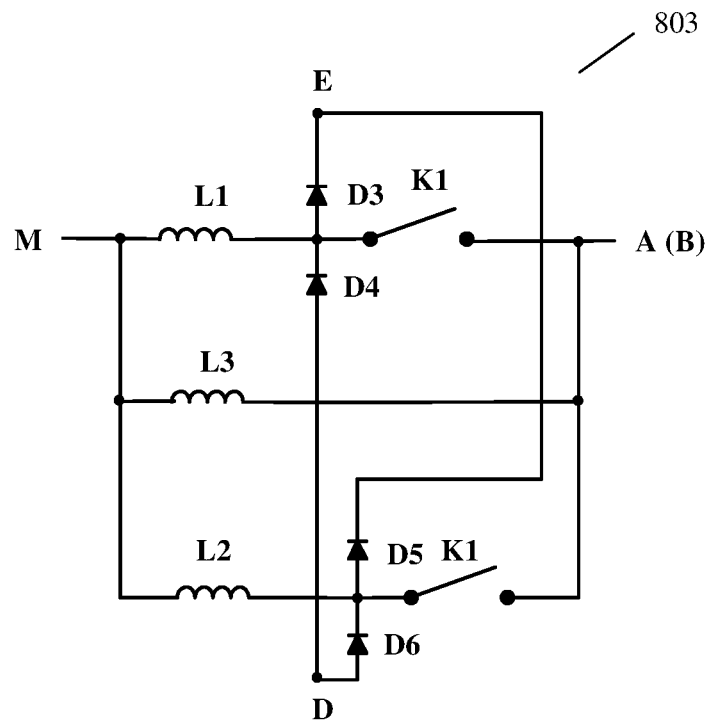
FIG. 6e is a circuit diagram in which an impedance adjustment circuit includes two controllable inductive branches and one fixed inductive branch and there is a diode clamp circuit in each controllable inductive branch.

In the wireless charging transmitting apparatus provided in this embodiment, the leading-bridge-arm impedance adjustment circuit or the lagging-bridge-arm impedance adjustment circuit includes at least one controllable inductive branch including a first diode and a second diode, and a diode clamp circuit is formed by the two diodes. When a switch in the inductive branch provided with the diode clamp circuit is turned off, a freewheeling path can be provided for an inductor in the inductive branch, and a voltage at a common terminal of the inductor and the switch in the controllable inductive branch can be kept stable within a safe range. This implements circuit protection. It can be understood that, in addition to the at least one controllable inductive branch including the first diode and the second diode, the leading-bridge-arm impedance adjustment circuit or the lagging-bridge-arm impedance adjustment circuit in this embodiment may include at least one fixed inductive branch. FIG. 6*e* is a circuit diagram in which a leading-bridge-arm impedance adjustment circuit or a lagging-bridge-arm impedance adjustment circuit includes two controllable inductive branches and one fixed inductive branch and there is a diode clamp circuit in each controllable inductive branch.

For ease of description, all the following apparatus embodiments provide descriptions by using an example in which the inductive branch in the leading-bridge-arm impedance adjustment circuit or the lagging-bridge-arm impedance adjustment circuit includes at least two controllable inductive branches connected in parallel: a first controllable inductive branch and a second controllable inductive branch. The first controllable inductive branch includes a first inductor and a first switch that are connected in series, and the second controllable inductive branch includes a second inductor and a second switch that are connected in series. It can be understood that, when the leading-bridge-arm impedance adjustment circuit or the lagging-bridge-arm impedance adjustment circuit includes more controllable inductive branches and more fixed inductive branches included and the inductive branches may be connected in series or may be connected in parallel. A working principle of the leading-bridge-arm impedance adjustment circuit or the lagging-bridge-arm impedance adjustment circuit is similar to that of a leading-bridge-arm impedance adjustment circuit or a lagging-bridge-arm impedance adjustment circuit including only two controllable inductive branches connected in parallel.

Apparatus Embodiment 6

This embodiment provides a detailed description about a connection relationship between an impedance adjustment circuit and an output end of a direct current power supply, namely, a connection relationship between second ends of a leading-bridge-arm impedance adjustment circuit and a lagging-bridge-arm impedance adjustment circuit and the output end of the direct current power supply. The following separately provides descriptions with reference to the accompanying drawings.

Figure 7A:
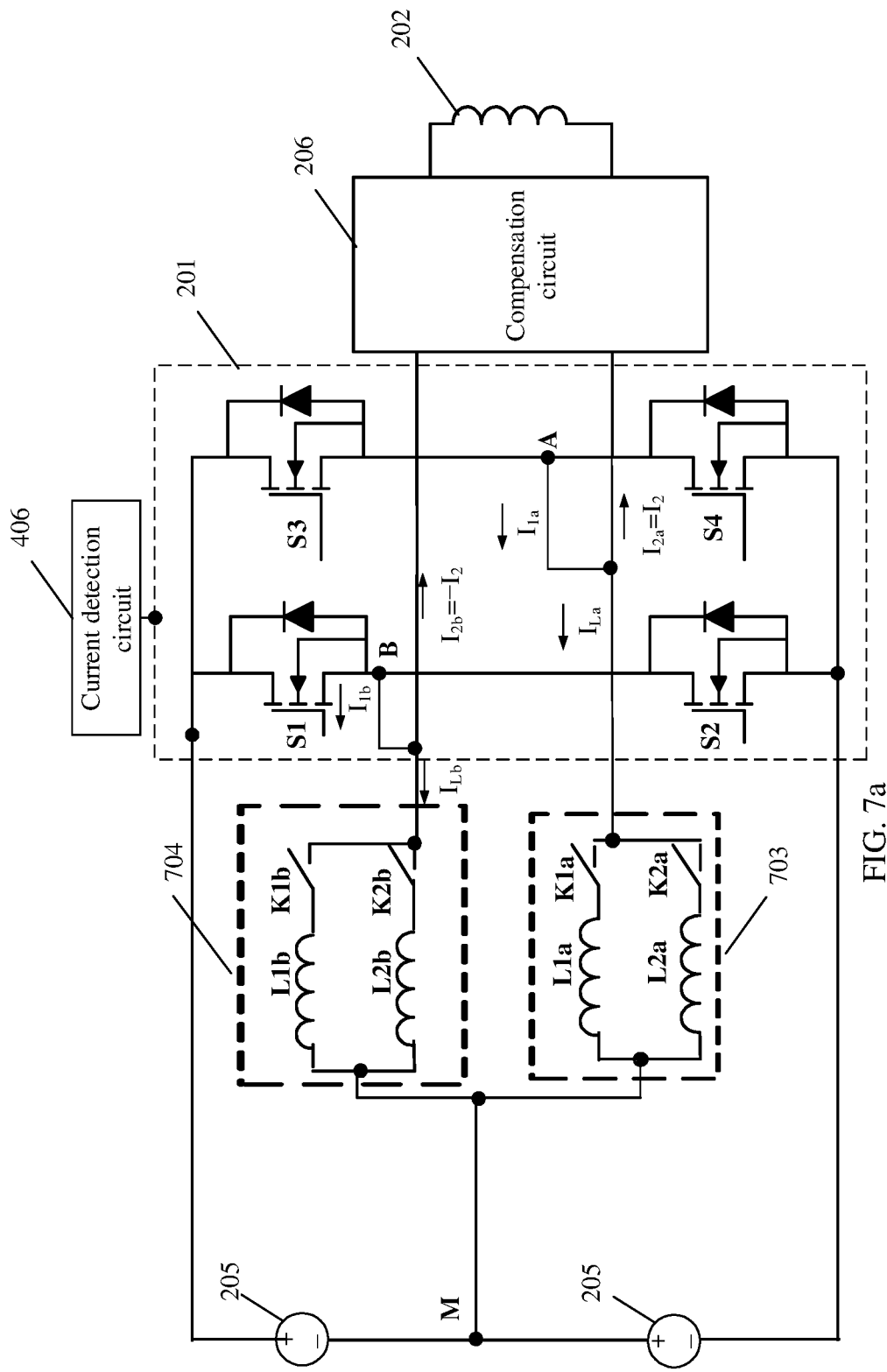
FIG. 7a is a circuit diagram in which a first end of an impedance adjustment circuit is connected to a direct current bus middle point of a direct current power supply according to Embodiment 6.

FIG. 7a is a circuit diagram in which the second ends of the leading-bridge-arm impedance adjustment circuit and the lagging-bridge-arm impedance adjustment circuit are connected to a direct current bus middle point of the direct current power supply.

For descriptions of an inverter circuit 201, a transmitting coil 202, a direct current power supply 205, a compensation circuit 206, and a controller (not shown in FIG. 7a), refer to Apparatus Embodiment 1, and details are not described herein again.

The leading-bridge-arm impedance adjustment circuit 703 and the lagging-bridge-arm impedance adjustment circuit 704 each include a first controllable inductive branch and a second controllable inductive branch, the two controllable inductive branches are connected in parallel to form the leading-bridge-arm impedance adjustment circuit and the lagging-bridge-arm impedance adjustment circuit, and the second ends of the leading-bridge-arm impedance adjustment circuit and the lagging-bridge-arm impedance adjustment circuit are directly connected to the direct current bus middle point at the output end of the direct current power supply.

Figure 7B:
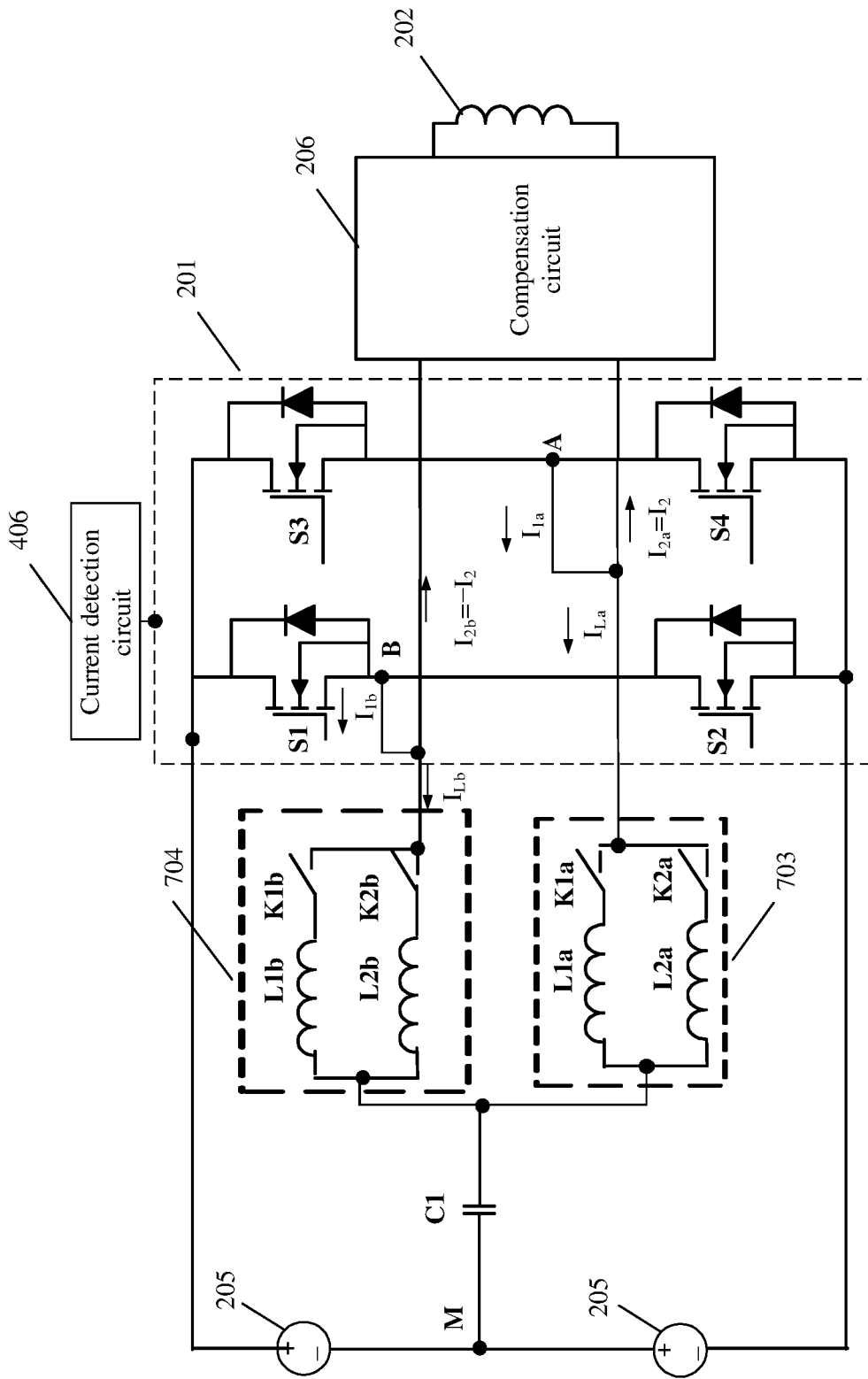
FIG. 7b is a circuit diagram of another wireless charging transmitting apparatus according to Apparatus Embodiment 6.

The impedance adjustment circuit may further include a first direct current blocking capacitor, and both the second ends of the leading-bridge-arm impedance adjustment circuit and the lagging-bridge-arm impedance adjustment circuit are connected to the direct current bus middle point at the output end of the power supply through the first direct current blocking capacitor. Refer to FIG. 7b.

As shown in the description in Apparatus Embodiment 1, to enable controllable switching transistors in a leading bridge arm and a lagging bridge arm to implement ZVS, phases of currents in the leading bridge arm and the lagging bridge arm need to be made to lag behind a phase of an output voltage of the inverter circuit 201. Appropriate inductive currents are injected into the leading bridge arm and the lagging bridge arm through inductive branches, so that the phases of the currents in the leading bridge arm and the lagging bridge arm are kept lagging behind phases of output voltages of the leading bridge arm and the lagging bridge arm in the inverter circuit 201. However, direct current components in the inductive branches are also injected into the leading bridge arm and the lagging bridge arm; and effective values of the currents in the leading bridge arm and the lagging bridge arm are increased due to the direct current components, and consequently a conduction loss and a switching loss of the controllable switching transistors in the leading bridge arm and the lagging bridge arm are increased. Therefore, in a wireless charging transmitting apparatus provided in this embodiment, the first direct current blocking capacitor is introduced into the leading-bridge-arm impedance adjustment circuit and the lagging-bridge-arm impedance adjustment circuit; and both the second ends of the leading-bridge-arm impedance adjustment circuit and the lagging-bridge-arm impedance adjustment circuit are made to be connected to the direct current bus middle point through the first direct current blocking capacitor. In this way, direct current components in the leading-bridge-arm impedance adjustment circuit and the lagging-bridge-arm impedance adjustment circuit are filtered out, and the increases in the effective values of the currents in the leading bridge arm and the lagging bridge arm are reduced, thereby reducing the conduction loss and the switching loss of the controllable switching transistors in the leading bridge arm and the lagging bridge arm.

Figure 7C:
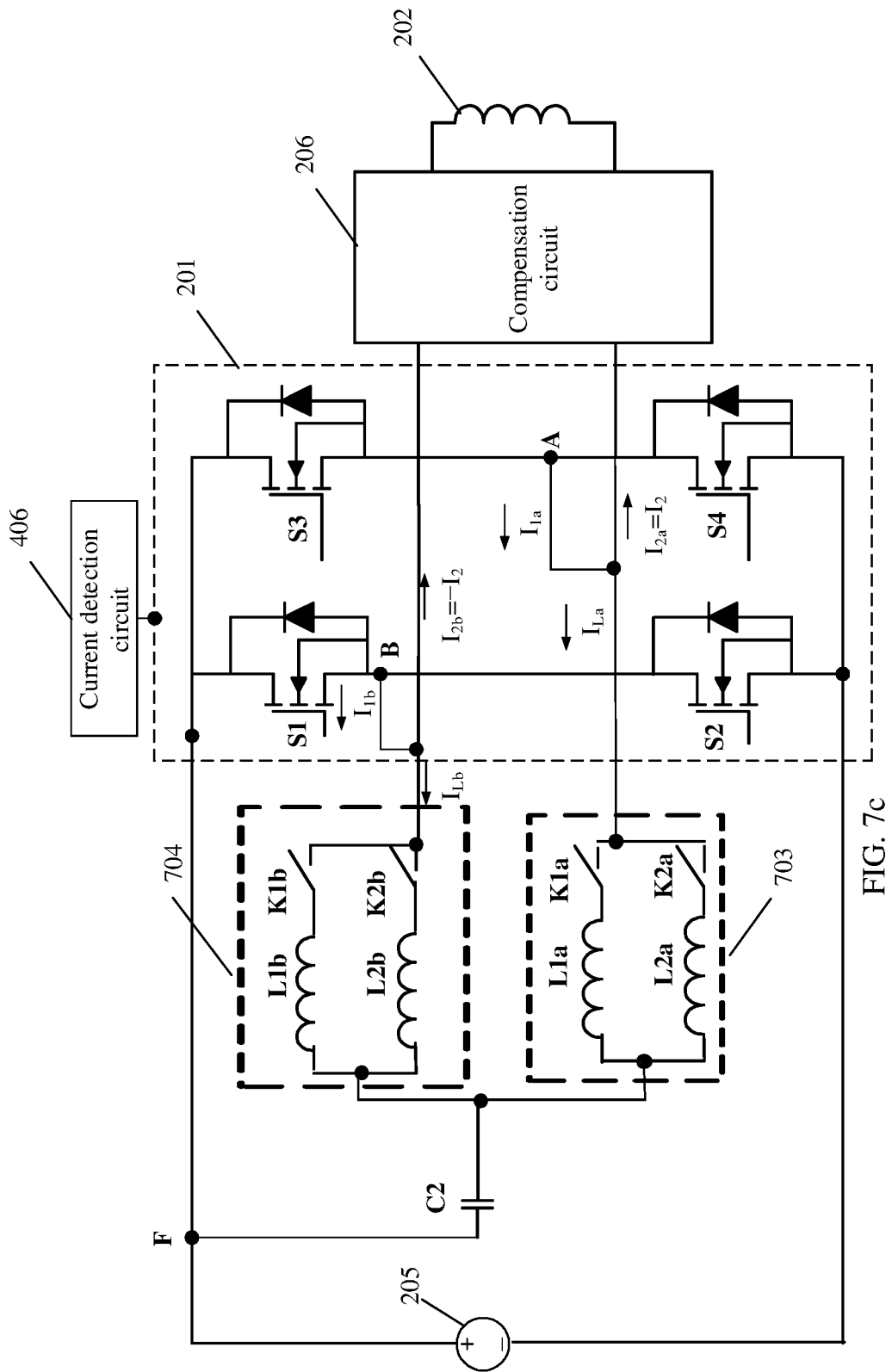
FIG. 7c is a circuit diagram of still another wireless charging transmitting apparatus according to Apparatus Embodiment 6.

In addition, the second ends of the leading-bridge-arm impedance adjustment circuit and the lagging-bridge-arm impedance adjustment circuit may alternatively be connected to a positive direct current bus at the output end of the direct current power supply. The impedance adjustment circuit further includes a second direct current blocking capacitor, and both the second ends of the impedance adjustment circuits are connected to the positive direct current bus at the output end of the power supply through the second direct current blocking capacitor. As shown in FIG. 7c, in the wireless charging transmitting apparatus provided in this embodiment, the second direct current blocking capacitor is added to the impedance adjustment circuit, and both the second ends of the impedance adjustment circuits are connected to the positive direct current bus at the output end of the direct current power supply through the second direct current blocking capacitor. In this way, direct current components in the impedance adjustment circuits can be filtered out, and increases in effective values of currents in the leading bridge arm and the lagging bridge arm can be reduced, thereby reducing a conduction loss and a switching loss of the controllable switching transistors in the leading bridge arm and the lagging bridge arm.

Figure 7D:
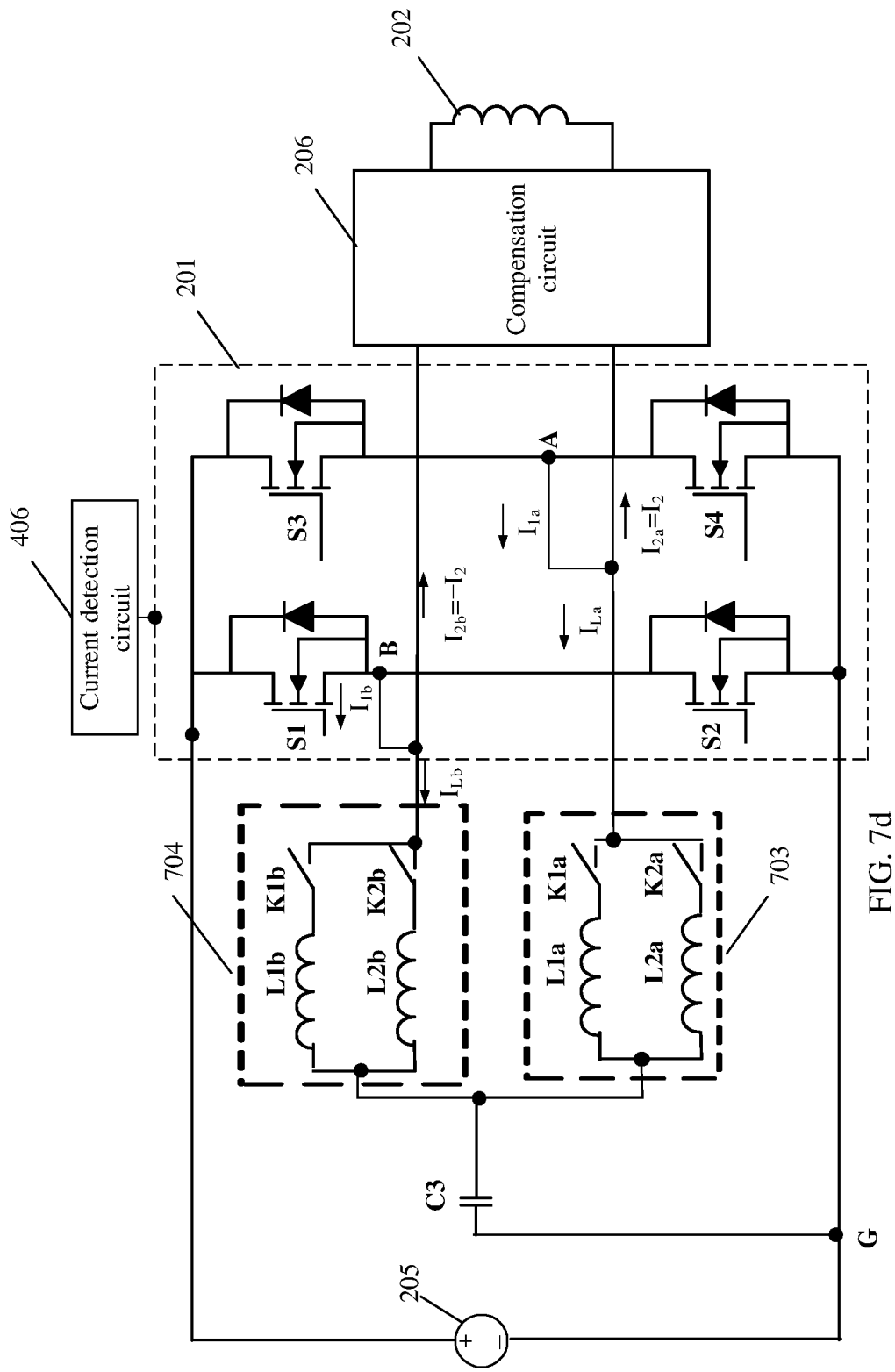
FIG. 7d is a circuit diagram of still another wireless charging transmitting apparatus according to Apparatus Embodiment 6.

As shown in FIG. 7d, the second ends of the impedance adjustment circuits may alternatively be connected to a negative direct current bus at the output end of the direct current power supply. The impedance adjustment circuit further includes a third direct current blocking capacitor, and both the second ends of the impedance adjustment circuits are connected to the negative direct current bus at the output end of the power supply through the third direct current blocking capacitor. In this way, direct current components in the adjustment branches are filtered out, and an increase in an effective value of a current in the leading bridge arm is reduced, thereby reducing a conduction loss and a switching loss of the controllable switching transistors in the leading bridge arm.

Figure 7E:
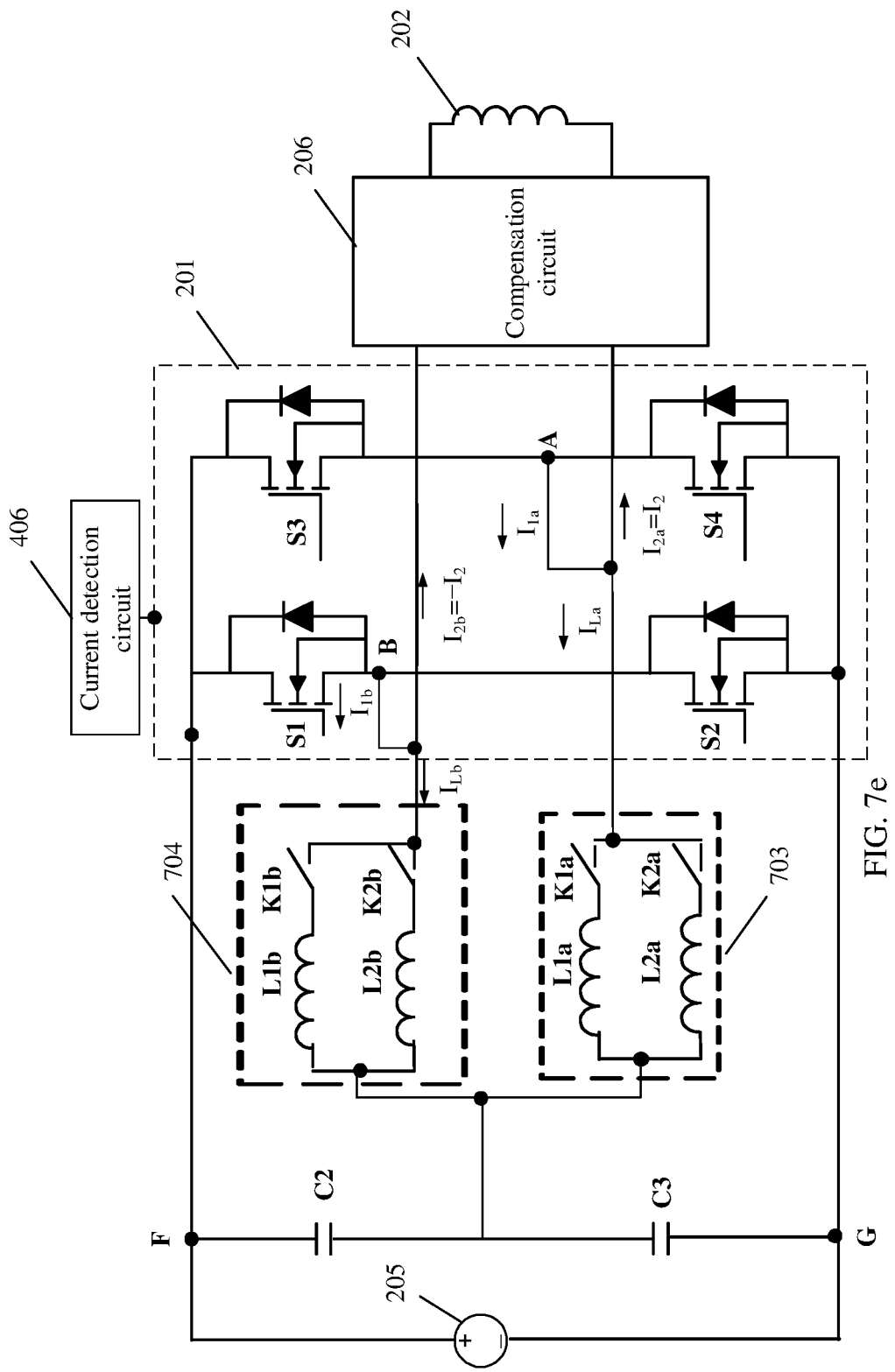
FIG. 7e is a circuit diagram of another wireless charging transmitting apparatus according to Apparatus Embodiment 6.

As shown in FIG. 7e, the impedance adjustment circuit includes both a second direct current blocking capacitor and a third direct current blocking capacitor, both the second ends of the impedance adjustment circuits are connected to a positive direct current bus at the output end of the power supply through the second direct current blocking capacitor, and both the second ends of the impedance adjustment circuits are connected to a negative direct current bus at the output end of the power supply through the third direct current blocking capacitor. In this way, the impedance adjustment circuit can be connected to the direct current power supply without a direct current bus, and can also filter out direct current components in the impedance adjustment circuits, to reduce increases in effective values of currents in the leading bridge arm and the lagging bridge arm, thereby reducing a conduction loss and a switching loss of the controllable switching transistors in the leading bridge arm and the lagging bridge arm.

Figure 7F:
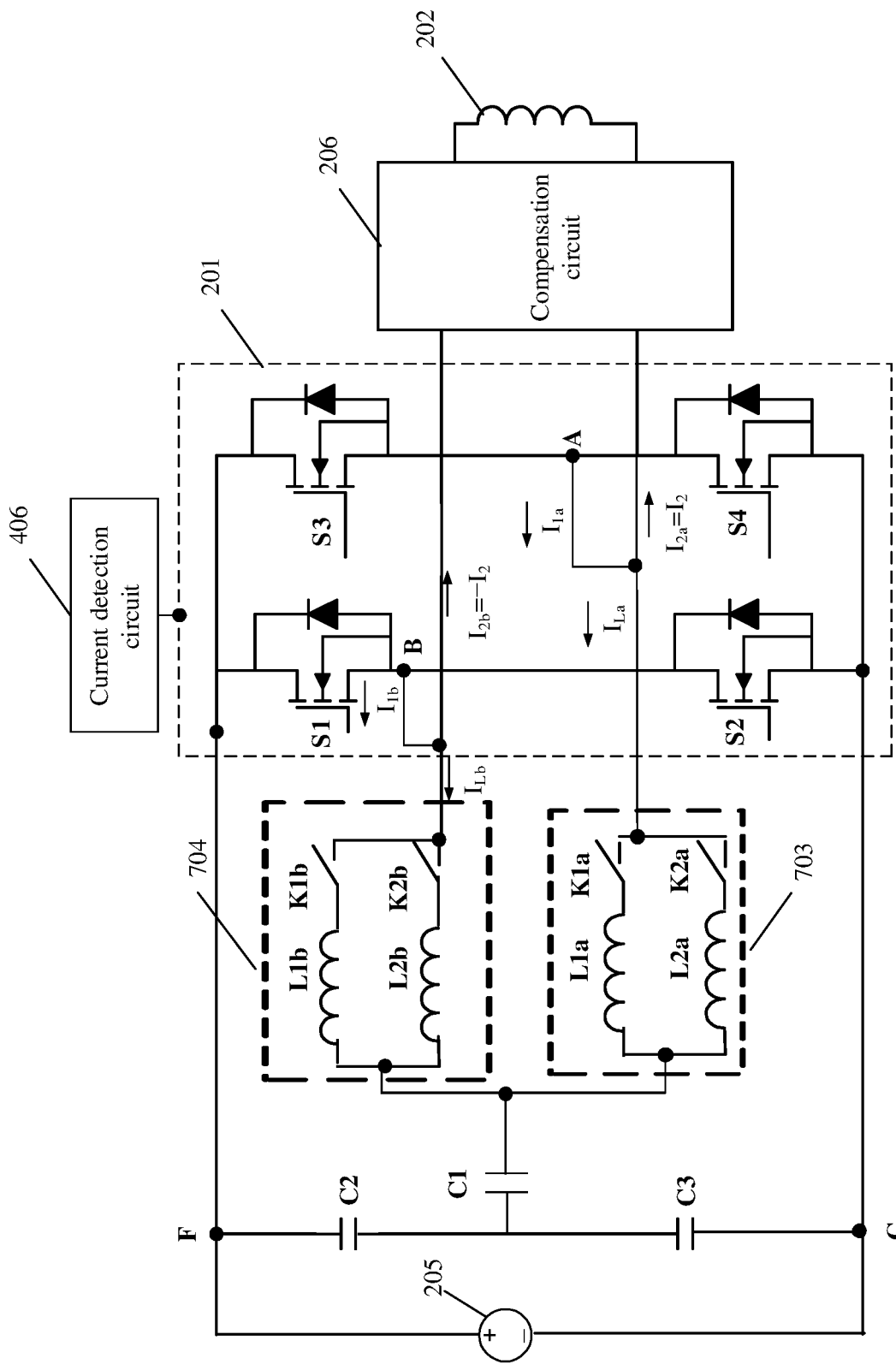
FIG. 7f is a circuit diagram of still another wireless charging transmitting apparatus according to Apparatus Embodiment 6.

As shown in FIG. 7f, the impedance adjustment circuit includes a first direct current blocking capacitor, a second direct current blocking capacitor, and a third direct current blocking capacitor, both the second ends of the impedance adjustment circuits are connected to first ends of the second direct current blocking capacitor and the third direct current blocking capacitor through the first direct current blocking capacitor, a second end of the second direct current blocking capacitor is connected to a positive direct current bus at the output end of the power supply, and a second end of the third direct current blocking capacitor is connected to a negative direct current bus at the output end of the power supply. In this way, direct current components in the adjustment branches can be filtered out, a loss of equivalent series resistance can be reduced, and increases in effective values of currents in the leading bridge arm and the lagging bridge arm can be reduced, thereby reducing a conduction loss and a switching loss of the controllable switching transistors in the leading bridge arm and the lagging bridge arm.

As shown in FIG. 7a to FIG. 7f, the impedance adjustment circuit is connected to the power supply through at least one direct current blocking capacitor, in other words, both the second ends of the leading-bridge-arm impedance adjustment circuit and the lagging-bridge-arm impedance adjustment circuit are connected to the power supply through the at least one direct current blocking capacitor.

Figure 7G:
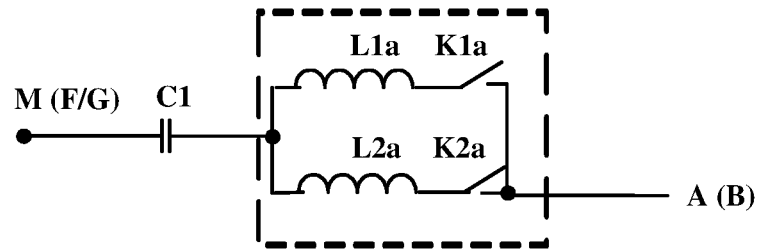
FIG. 7g is a circuit diagram in which a leading-bridge-arm impedance adjustment circuit or a lagging-bridge-arm impedance adjustment circuit includes one direct current blocking capacitor according to Apparatus Embodiment 6.
Figure 7H:
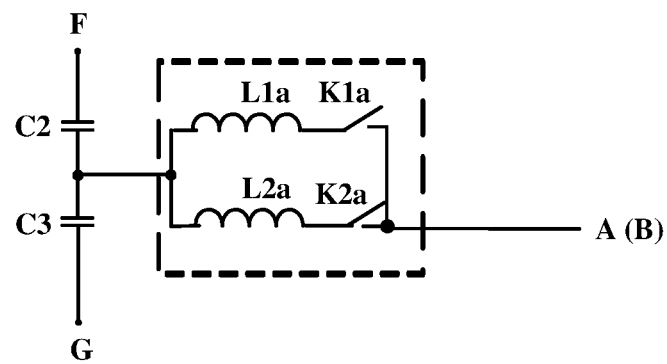
FIG. 7h is a circuit diagram in which a leading-bridge-arm impedance adjustment circuit or a lagging-bridge-arm impedance adjustment circuit includes two direct current blocking capacitors according to Apparatus Embodiment 6.
Figure 7I:
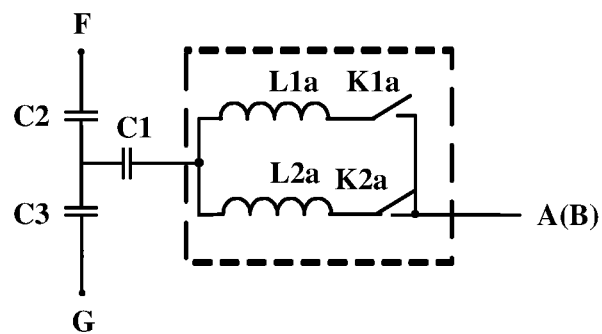
FIG. 7i is a circuit diagram in which a leading-bridge-arm impedance adjustment circuit or a lagging-bridge-arm impedance adjustment circuit includes three direct current blocking capacitors according to Apparatus Embodiment 6.

The leading-bridge-arm impedance adjustment circuit may include at least one direct current blocking capacitor, and the second end of the leading-bridge-arm impedance adjustment circuit is connected to the power supply through the at least one direct current blocking capacitor. See, for example, FIG. 7g to FIG. 7i.

The lagging-bridge-arm impedance adjustment circuit may include at least one direct current blocking capacitor, and the second end of the lagging-bridge-arm impedance adjustment circuit is connected to the power supply through the at least one direct current blocking capacitor. See, for example, FIG. 7g to FIG. 7i.

The leading-bridge-arm impedance adjustment circuit and the lagging-bridge-arm impedance adjustment circuit each may include at least one direct current blocking capacitor, and both the second ends of the leading-bridge-arm impedance adjustment circuit and the lagging-bridge-arm impedance adjustment circuit are connected to the power supply through the at least one direct current blocking capacitor. See, for example, FIG. 7g to FIG. 7i.

A first diode and a second diode may further be added to at least one inductive branch to form a diode clamp circuit. For details, refer to Apparatus Embodiment 2, and details are not described herein again.

In this embodiment, the leading-bridge-arm impedance adjustment circuit or the lagging-bridge-arm impedance adjustment circuit may include at least one controllable inductive branch. The at least one controllable inductive branch is not limited to two controllable inductive branches and may alternatively be one or more controllable inductive branches. In addition, the leading-bridge-arm impedance adjustment circuit or the lagging-bridge-arm impedance adjustment circuit includes at least one fixed inductive branch.

To make a person skilled in the art better understand the solutions, the following describes selection of a magnitude of an inductor included in the impedance adjustment circuit. In this embodiment, a method for determining an inductance value of an inductor in an inductive branch is described in detail by using an example in which the impedance adjustment circuit includes the following two inductive branches: a first inductive branch and a second inductive branch. The method can be extended to be applied to a circuit scenario in which the impedance adjustment circuits each include more inductive branches connected in parallel.

FIG. 4 is a circuit diagram of a wireless charging transmitting apparatus.

For descriptions of an inverter circuit 201, a transmitting coil 202, an impedance adjustment circuit 803, a direct current power supply 205, and a controller (not shown in FIG. 4), refer to a related description of a corresponding part of the circuit shown in FIG. 4, and details are not described herein again.

A turn-off process of S4 in a leading bridge arm is analyzed below. A method for analyzing turn-off processes of S3 in the leading bridge arm and S1 and S2 in a lagging bridge arm are similar to that for analyzing the turn-off process of S4 in the leading bridge arm. Therefore, details thereof are not described herein again. In an ideal working condition, a current of an inductor remains constant during a switching process, and a current flowing out of the leading bridge arm remains constant during the switching process. A minimum value $I_{2min}$ of a negative current $I_2$ required at a turn-off moment of an output current of S4 in the inverter circuit 201 when controllable switching transistors in the leading bridge arm implement ZVS may be obtained based on junction capacitors $C_{oss}$ of the controllable switching transistors, a bus voltage $U_{bus}$, and a dead time $\Delta t_{dead}$ of the leading bridge arm. Considering that the current $I_{2min}$ is constant within the dead time $\Delta t_{dead}$ and that the current $I_{2min}$ is used to charge one of the junction capacitors $C_{oss}$ of the two controllable switching transistors in the bridge arm to the bus voltage $U_{bus}$ and perform discharging on the other junction capacitor $C_{oss}$ to zero, a formula 4 may be obtained. Details are as follows:

$$I_{2min} = -2 * C_{oss} * \frac{U_{bus}}{\Delta t_{dead}} \tag{4}$$

When $C_{oss}$=500 pF, $U_{bus}$=640 V, and $\Delta t_{dead}$=300 ns, $I_{2min}$=−2.133 A may be determined.

A maximum value that a turn-off current in the leading bridge arm can reach when the controllable switching transistors in the leading bridge arm implement ZVS is preset to $I_{1max}$=32 A.

With reference to Formula (1), in this case, a peak current that needs to be injected into the leading bridge arm through an inductive branch is $I_{Lmax}$, and needs to satisfy the following:

$$I_{Lmax} > I_{1max} - I_{2min} \tag{5}$$

In other words, when $I_{Lmax}$>34.133 A, the leading bridge arm can also implement ZVS even if the turn-off current in the leading bridge arm reaches the maximum value. The following uses $I_{Lmax}$=35 A as an example to describe a process of determining an inductance value.

A relationship among a switching period $T_{SW}$ of a switching transistor of the inverter circuit 201, the bus voltage $U_{bus}$, a peak current $I_{Lmax}$ that needs to be injected by the inductive branch into the leading bridge arm, and a maximum inductance LMAX of the adjustment branch is as follows: A voltage applied to an inductor in a voltage of an alternating current component in the leading bridge arm is a square wave voltage with an amplitude of $U_{bus}/2$ in a switching period $T_{SW}$, and a waveform of a current of the inductor is a symmetrical triangular wave. Therefore, a formula (6) may be obtained based on a relationship between the current and the voltage of the inductor:

$$L_{MAX} = \frac{T_{sw} * U_{bus}}{8 * I_{Lmax}} \quad (6)$$

When $T_{SW}=1/85$ kHz, it may be determined, according to the formula (6), that $L_{MAX}=26.9$ µH.

If the adjustment branch includes two inductive branches connected in parallel, and each inductive branch includes one inductor, $L_{MAX}$ is an inductance value obtained after a first inductor L1a and a second inductor L2a are connected in parallel.

In a possible implementation, both inductance values of the first inductor L1a and the second inductor L2a may be made to be 53.8 pH. When one inductive branch is connected, a peak current injected into the leading bridge arm through the adjustment branch is 17.5 A. When the two inductive branches are connected, a peak current injected into the leading bridge arm through the adjustment branch is 35 A.

When the adjustment branch fixedly includes only the above two inductive branches, although the controllable switching transistors in the leading bridge arm can implement ZVS, an effective value of an inductive current injected into the leading bridge arm through the adjustment circuit is excessively large, and consequently a switching loss of the controllable switching transistors in the leading bridge arm is increased. To avoid the foregoing problem, a quantity of inductive branches connected in parallel in the adjustment branch may be controlled, and a quantity of connected inductive branches is controlled to control a value of a current injected into the leading bridge arm, so that an inductive current injected into the leading bridge arm through the leading-bridge-arm impedance adjustment branch satisfies an actual requirement.

Method Embodiment

This embodiment further provides a control method for a wireless charging transmitting apparatus. The control method is applied to the wireless charging transmitting apparatus described in the foregoing embodiments. The wireless charging transmitting apparatus includes an inverter circuit, a transmitting coil, an impedance adjustment circuit, and a controller. The inverter circuit is configured to invert a direct current output by a direct current power supply into an alternating current, the inverter circuit includes a leading bridge arm and a lagging bridge arm, and in one period, a voltage phase of the leading bridge arm is ahead of a voltage phase of the lagging bridge arm. The transmitting coil is configured to receive the alternating current and generate an alternating magnetic field. A leading-bridge-arm impedance adjustment circuit and a lagging-bridge-arm impedance adjustment circuit each include at least one controllable inductive branch or fixed inductive branch, each controllable inductive branch includes at least one inductor and at least one switch, and the fixed inductive branch includes at least one inductor. All controllable inductive branches are connected in parallel or in series to each other, and the fixed inductive branch is connected in parallel with the controllable inductive branch. Second ends of the leading-bridge-arm impedance adjustment circuit and the lagging-bridge-arm impedance adjustment circuit are connected to an output port of the direct current power supply, and the second ends of the leading-bridge-arm impedance adjustment circuit and the lagging-bridge-arm impedance adjustment circuit are connected to a middle point of a lagging bridge arm.

For a description of the wireless charging transmitting apparatus, refer to the foregoing embodiment of the wireless charging transmitting apparatus, and details are not described herein again.

Figure 8:
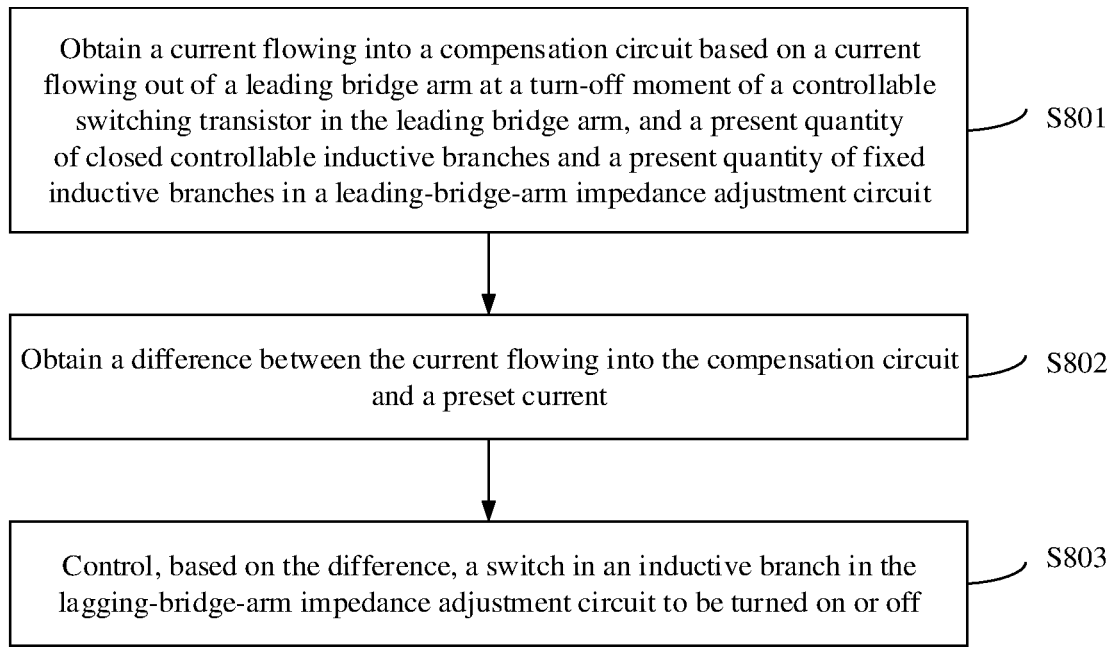
FIG. 8 is a flowchart of a wireless charging control method according to an embodiment.

As shown in FIG. 8, the control method for a wireless charging transmitting apparatus includes the following steps:

S801: Obtain a current flowing into a compensation circuit of the wireless charging transmitting apparatus.

S802: Control, based on the current flowing into the compensation circuit, a switch in the controllable inductive branch in the leading-bridge-arm impedance adjustment circuit in the wireless charging transmitting apparatus to be turned on or off, to change a current flowing out of the leading bridge arm in the wireless charging transmitting apparatus, so that controllable switching transistors in the leading bridge arm implement zero voltage switching.

The control method for a wireless charging transmitting apparatus provided in this embodiment includes: obtaining the current flowing into the compensation circuit of the wireless charging transmitting apparatus, which may be:

obtaining a current flowing into the compensation circuit from a middle point between the controllable switching transistors in the leading bridge arm in a period between a turn-off moment and a turn-on moment of the controllable switching transistor in the leading bridge arm.

Optionally, a current flowing into the compensation circuit is obtained based on a current flowing out of the leading bridge arm in a period between a turn-off moment and a turn-on moment of the controllable switching transistor in the leading bridge arm and a current in the inductive branch in the leading-bridge-arm impedance adjustment circuit.

The turn-off moment is a corresponding moment at which the controllable switching transistor is switched from on to off; and a turn-on moment is a corresponding moment at which the controllable switching transistor is switched from off to on. In an actual operation, an actual turn-off moment and an actual turn-on moment of the switching transistor are respectively a delay time later than the turn-off moment and the turn-on moment indicated by signals sent by the controller. Therefore, in this embodiment, the period from the turn-off moment to the turn-on moment is a longest period that is from the turn-off moment to the turn-on moment and that includes a signal delay time.

Based on a current flowing into the compensation circuit or a current flowing out of the leading bridge arm at the turn-off moment of the controllable switching transistor in the leading bridge arm, the switch in the inductive branch in the leading-bridge-arm impedance adjustment circuit is controlled to be turned on or off.

The controller may control, based on the current flowing into the compensation circuit at the turn-off moment of the controllable switching transistor in the leading bridge arm, the switch in the inductive branch to be turned on or off is:

obtaining a difference between the current flowing into the compensation circuit at the turn-off moment of the controllable switching transistor in the leading bridge arm and a preset current, and controlling, based on the difference, the switch in the controllable inductive branch to be turned on or off.

Similarly, the control method for a wireless charging transmitting apparatus provided in this embodiment is also applicable to the lagging bridge arm. Details are not described herein.

As shown in FIG. 4, directions of currents flowing out of the leading bridge arm and the lagging bridge arm may be defined as positive directions, and a turn-off moment of S3 may be used as an example to perform analysis. The current flowing out of the leading bridge arm is detected, and when the current flowing out of the leading bridge arm is greater than a preset current value (which is usually a small negative value), a quantity of closed inductive branches is increased, in other words, an inductance value at a middle point of the leading bridge arm is reduced. Similarly, a difference between a current flowing out of the leading bridge arm and the preset current value is detected to control a quantity of closed inductive branches of the lagging bridge arm, so that controllable switching transistors in the lagging bridge arm implement ZVS.

According to the wireless charging control method, the controller is configured to control the switches, in the inductive branches in the leading-bridge-arm impedance adjustment circuit and the lagging-bridge-arm impedance adjustment circuit to be turned on or off, to change currents flowing out of the leading bridge arm and the lagging bridge arm, in other words, the controller controls values of currents injected into the leading bridge arm and the lagging bridge arm by controlling a quantity of connected inductive branches, so that the controllable switching transistors in the leading bridge arm and the lagging bridge arm implement ZVS. The controller controls the inductive branch to be connected to the leading bridge arm or the lagging bridge arm, only when an inductive current needs to be injected into the leading bridge arm or the lagging bridge arm. When the leading-bridge-arm impedance adjustment circuit and the lagging-bridge-arm impedance adjustment circuit each include at least one controllable inductive branch or at least one fixed inductive branch, the controller may control switches in the controllable inductive branches to be turned on or off, to present different inductance values of the leading-bridge-arm impedance adjustment circuit and the lagging-bridge-arm impedance adjustment circuit. If inductance values of the inductive branches are different, values of inductive currents injected into the leading bridge arm and the lagging bridge arm are different. A process in which the controller switches the inductive branch does not affect power transmission of the wireless charging transmitting apparatus, and stability and reliability of the wireless charging transmitting apparatus are improved.

System Embodiment

Based on the wireless charging transmitting apparatus provided in the foregoing embodiment, an embodiment further provides a wireless charging system. The following provides descriptions with reference to the accompanying drawings.

Figure 9A:
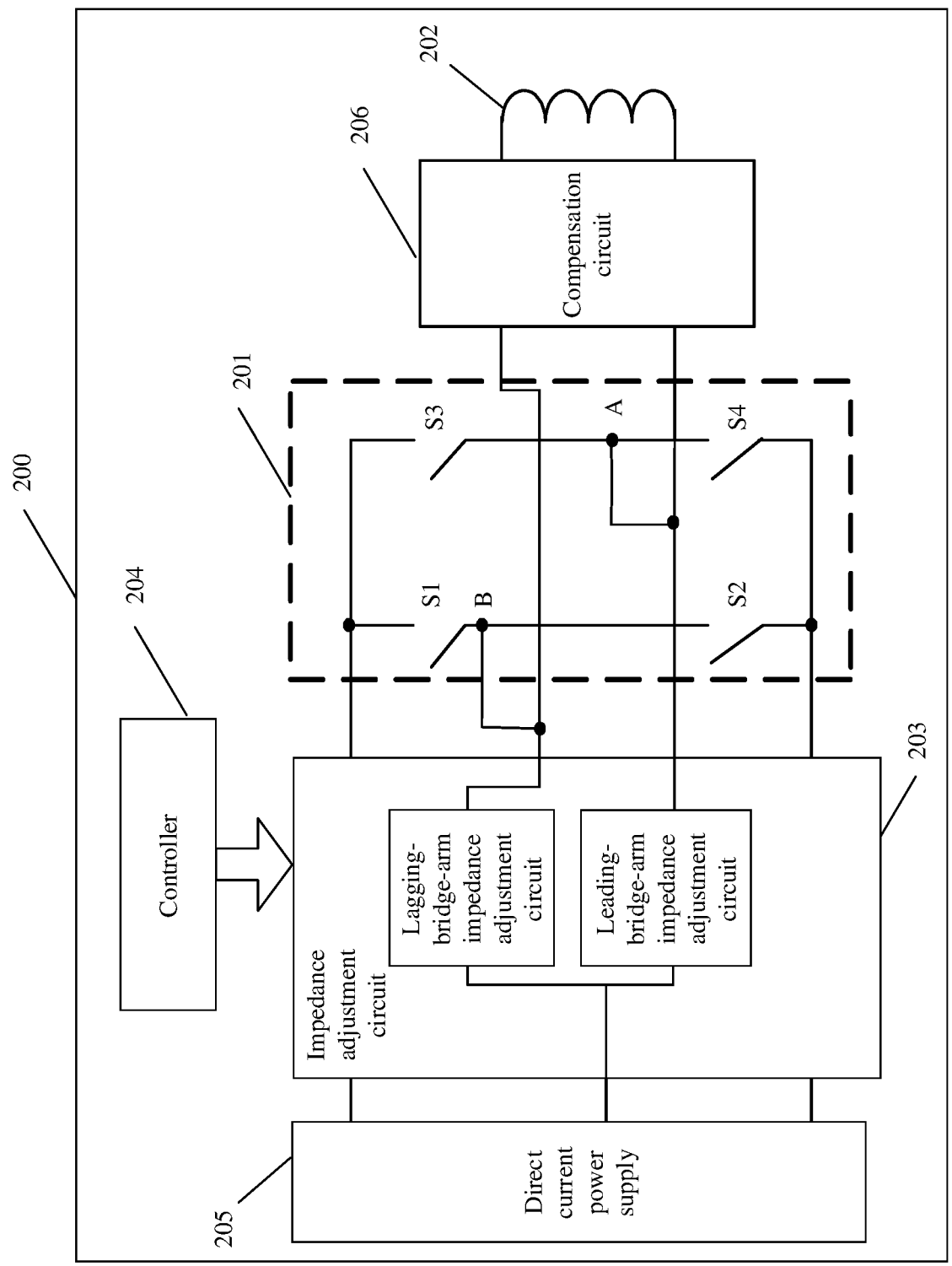
FIG. 9A and FIG. 9B are schematic diagrams of a wireless charging system according to an embodiment.
Figure 9B:
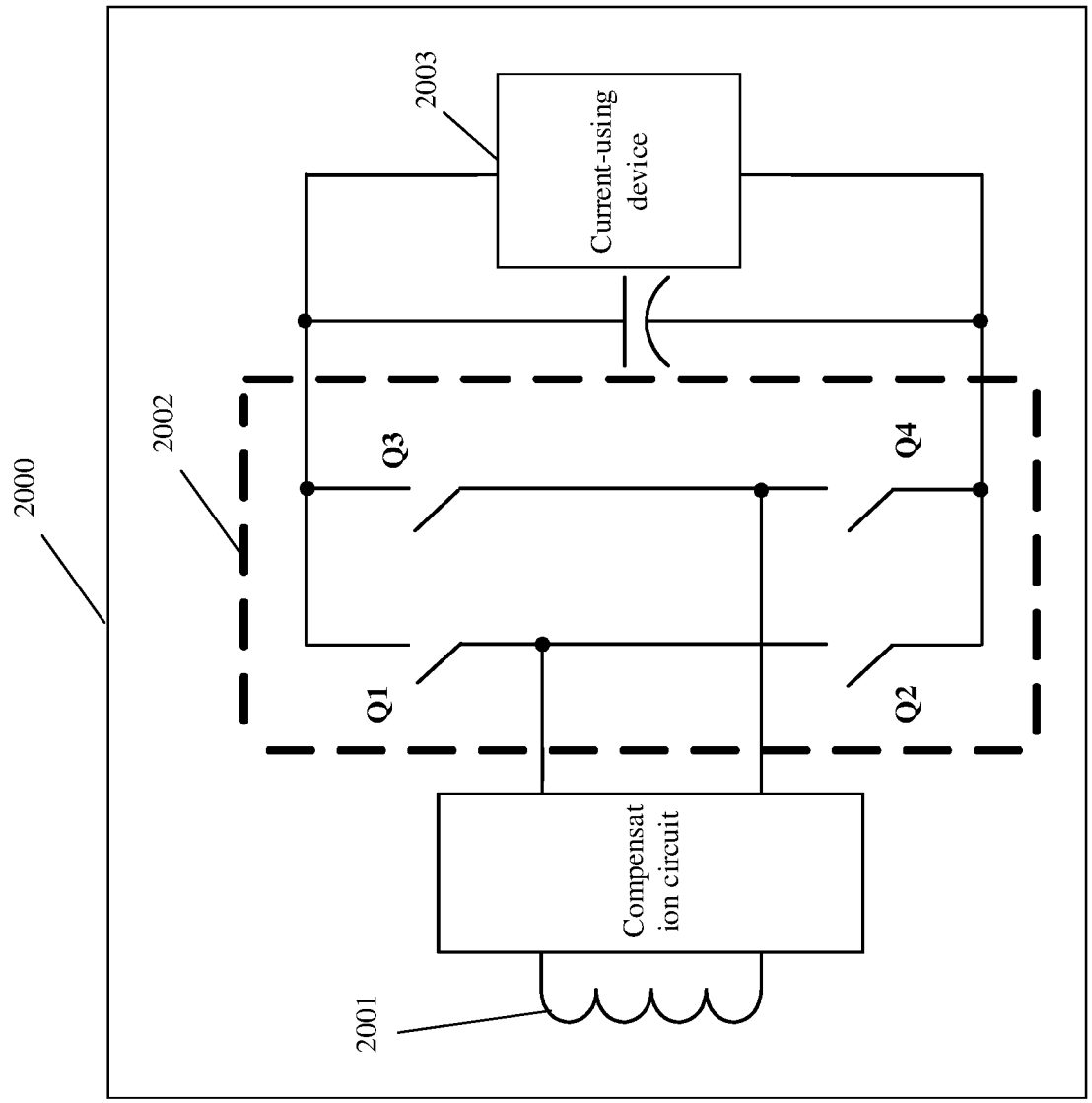

FIG. 9A and FIG. 9B are schematic diagrams of a wireless charging system according to an embodiment.

The system includes: a wireless charging transmitting apparatus 200 and a wireless charging receiving apparatus 2000.

The wireless charging transmitting apparatus 200 may be any apparatus provided in the foregoing apparatus embodiments. The wireless charging transmitting apparatus 200 includes at least an inverter circuit 201, a transmitting coil 202, an impedance adjustment circuit 203, and a controller 204.

The wireless charging receiving apparatus 2000 is configured to receive an alternating magnetic field transmitted by the wireless charging transmitting apparatus, convert the alternating magnetic field into a direct current, and provide the direct current for a current-using device. The wireless charging receiving apparatus 2000 may include a coil 2001, a rectifier 2002, and a current-using device 2003.

The inverter circuit 201 inverts the direct current output by the direct current power supply 205 into an alternating current, the inverter circuit 201 includes a leading bridge arm and a lagging bridge arm, and a voltage phase of the leading bridge arm is ahead of a voltage phase of the lagging bridge arm.

The transmitting coil 202 transmits the alternating current in a form of an alternating magnetic field.

The impedance adjustment circuit 203 includes a leading-bridge-arm impedance adjustment circuit and a lagging-bridge-arm impedance adjustment circuit, and the leading-bridge-arm impedance adjustment circuit and the lagging-bridge-arm impedance adjustment circuit each include at least one inductive branch. The inductive branch includes a controllable inductive branch and a fixed inductive branch, each inductive branch includes at least one inductor and at least one switch, and each fixed inductive branch includes at least one inductor that is not controlled by a switch. Inductive branches in the leading-bridge-arm impedance adjustment circuit are connected in parallel or in series to each other, and inductive branches in the lagging-bridge-arm impedance adjustment circuit are also connected in parallel or in series to each other. Both first ends of the leading-bridge-arm impedance adjustment circuit and the lagging-bridge-arm impedance adjustment circuit are connected to an output port of the direct current power supply 205, and second ends of the leading-bridge-arm impedance adjustment circuit and the lagging-bridge-arm impedance adjustment circuit are respectively connected to middle points of the leading bridge arm and the lagging bridge arm. The leading-bridge-arm impedance adjustment circuit and the lagging-bridge-arm impedance adjustment circuit are respectively connected to the middle points of the leading bridge arm and the lagging bridge arm, so that inductive currents can be injected into the leading bridge arm and the lagging bridge arm, to increase inductive current components in the leading bridge arm and the lagging bridge arm.

The controller 204 may control the switches in the inductive branches to be turned on or off, to change currents flowing out of the leading bridge arm and the lagging bridge arm, so that controllable switching transistors in the leading bridge arm and the lagging bridge arm implement ZVS.

The receiving coil 2001 receives, in a form of an alternating magnetic field, electromagnetic energy emitted by the transmitting coil 202.

The rectifier 2002 rectifies an alternating current output by the receiving coil 2001 into a direct current and output the direct current to the current-using device.

The wireless charging transmitting apparatus in the wireless charging system is provided with the leading-bridge-arm impedance adjustment circuit, the lagging-bridge-arm impedance adjustment circuit, and the controller. The leading-bridge-arm impedance adjustment circuit and the lagging-bridge-arm impedance adjustment circuit each include at least one controllable inductive branch and at least one fixed inductive branch, each controllable inductive branch includes at least one inductor and at least one switch, and each fixed inductive branch includes at least one inductor that is not controlled by a switch. All controllable inductive branches are connected in parallel or in series to each other, and the fixed inductive branches and the controllable inductive branches are connected in parallel to form the leading-bridge-arm impedance adjustment circuit and the lagging-bridge-arm impedance adjustment circuit. The first ends of the leading-bridge-arm impedance adjustment circuit and the lagging-bridge-arm impedance adjustment circuit are connected to the output port of the direct current power supply, and the second ends of the leading-bridge-arm impedance adjustment circuit and the lagging-bridge-arm impedance adjustment circuit are respectively connected to the middle points of the leading bridge arm and the lagging bridge arm. Inductive currents may be injected into the leading bridge arm and the lagging bridge arm when necessary, to increase inductive current components in the leading bridge arm and the lagging bridge arm. When a current flowing into a compensation circuit at a turn-off moment of a controllable switching transistor in the leading bridge arm or the lagging bridge arm is less than a preset current, the inverter circuit can implement ZVS of the controllable switching transistors. When the current flowing into the compensation circuit at the turn-off moment of the controllable switching transistor in the leading bridge arm or the lagging bridge arm is greater than the preset current, the inverter circuit cannot implement ZVS of the controllable switching transistors. Therefore, measures need to be taken to make the controllable switching transistors in the inverter circuit implement ZVS. In the wireless charging transmitting apparatus provided in this embodiment, an inductive current is injected into the leading bridge arm or the lagging bridge arm, and a quantity of inductive branches connected to the leading bridge arm or the lagging bridge arm is controlled, so that the controllable switching transistors in the leading bridge arm and the lagging bridge arm in the wireless charging transmitting apparatus implement ZVS. The turn-off moment is a corresponding moment at which the controllable switching transistor is switched from on to off; and a turn-on moment is a corresponding moment at which the controllable switching transistor is switched from off to on. In an actual operation, an actual turn-off moment and an actual turn-on moment of the switching transistor are respectively a delay time later than the turn-off moment and the turn-on moment indicated by signals sent by the controller. Therefore, in this embodiment, a period from the turn-off moment to the turn-on moment is a longest period that is from the turn-off moment to the turn-on moment and that includes a signal delay time.

When the leading-bridge-arm impedance adjustment circuit and the lagging-bridge-arm impedance adjustment circuit each include one controllable inductive branch, the controller may control, based on a difference between a current flowing into the compensation circuit and a preset current, the inductive branch to be connected to the middle point of the leading bridge arm or the lagging bridge arm when a switch in the inductive branch is closed, to control an inductive current injected into the leading bridge arm or the lagging bridge arm. When the leading-bridge-arm impedance adjustment circuit and the lagging-bridge-arm impedance adjustment circuit each include one controllable inductive branch and at least one fixed inductive branch, the controller may control, based on a difference between a sum of a current flowing into the compensation circuit and a current in the fixed inductive branch current and the preset current, the controllable inductive branch to be connected to the middle point of the leading bridge arm or the lagging bridge arm when a switch in the controllable inductive branch is closed, to control an inductive current injected into the leading bridge arm or the lagging bridge arm.

When the leading-bridge-arm impedance adjustment circuit and the lagging-bridge-arm impedance adjustment circuit each include a plurality of inductive branches, the inductive branches include a controllable inductive branch and a fixed inductive branch. The controller obtains present currents in the inductive branches in the leading-bridge-arm impedance adjustment circuit and the lagging-bridge-arm impedance adjustment circuit based on a current flowing out of the leading bridge arm at the turn-off moment of the controllable switching transistor in the leading bridge arm and a current flowing out of the lagging bridge arm at the turn-off moment of the controllable switching transistor in the lagging bridge arm, and a present quantity of closed controllable inductive branches and a present quantity of fixed inductive branches in the leading-bridge-arm impedance adjustment circuit and the lagging-bridge-arm impedance adjustment circuit, to obtain a current flowing into the compensation circuit. In this way, switches in the inductive branches can be controlled to be turned on or off, to present different inductance values of the impedance adjustment circuit. If inductance values of the impedance adjustment circuit are different, values of inductive currents injected into the leading bridge arm or the lagging bridge arm are different. When a sum of the current flowing into the compensation circuit and a current in the fixed inductive branch is greater than the preset current, for different differences, the controller may control the switches in the inductive branches to be turned on or off, to present different inductance values of the impedance adjustment circuit, to further control values of inductive currents injected into the leading bridge arm and the lagging bridge arm. In this way, the injected inductive currents can just compensate for a difference, to avoid an increase in power consumption caused due to an excessively large inductance value of a connected inductive branch. A process in which the controller switches the inductive branch does not affect power transmission of the wireless charging transmitting apparatus, and stability and reliability of the wireless charging transmitting apparatus are improved.

The impedance adjustment circuit may further include at least one direct current blocking capacitor connected to an output end of the power supply. The direct current blocking capacitor can filter out direct current components in the adjustment branches, reduce a loss of an equivalent series resistance, to reduce an increase in an effective value of a current in the lagging bridge arm, thereby reducing a conduction loss and a switching loss of the controllable switching transistors in the leading bridge arm and the lagging bridge arm.

The at least one controllable inductive branch includes a first diode and a second diode to form a diode clamp circuit.

Device Embodiment

Based on the wireless charging transmitting apparatus and the control method provided in the foregoing embodiments, an embodiment further provides a current-using device. The following provides descriptions with reference to the accompanying drawings.

Figure 10:
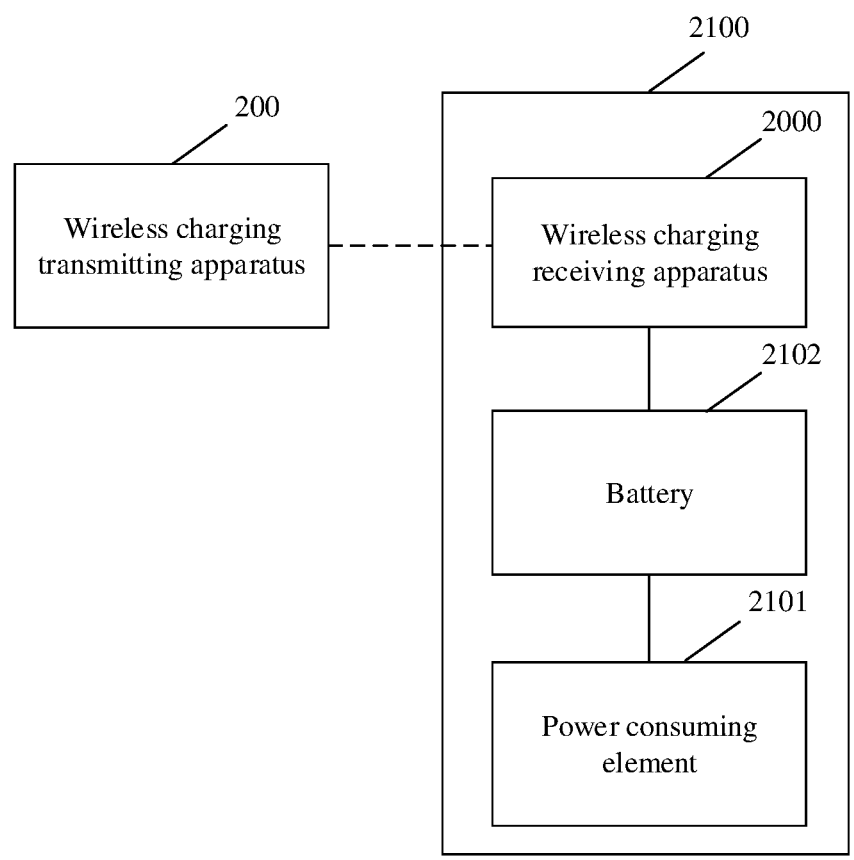
FIG. 10 is a schematic diagram of a current-using device according to an embodiment.

FIG. 10 is a schematic diagram of a current-using device according to an embodiment.

The current-using device 2100 includes a power consuming element 2101, a battery 2102, and a wireless charging receiving apparatus 2000.

The wireless charging receiving apparatus 2000 is configured to receive an alternating magnetic field transmitted by a wireless charging transmitting apparatus 200 and is further configured to convert the alternating magnetic field into a direct current, to charge the battery 2102.

The battery 2102 is configured to supply power to the power consuming element 2101.

The current-using device may be an electric vehicle shown in FIG. 2a. The current-using device performs wireless charging by using the wireless charging transmitting apparatus. The wireless charging transmitting apparatus can implement ZVS in cases of different currents flowing into a compensation circuit, and an inductive current injected into a leading bridge arm or a lagging bridge arm can be adjusted online (a wireless charging system does not need to be restarted) to adapt to conditions such as different coupling coefficients, output voltages, output currents, and target power. Therefore, interruption of power transmission of the wireless charging transmitting apparatus can be avoided during adjustment of the injected inductive current, thereby improving stability and safety of the current-using device in a wireless charging process.

Words such as "first" and "second" in the foregoing embodiments are merely used for ease of explanation and description, and do not constitute a limitation on any embodiment.

It should be understood that "at least one (item)" means one or more, and "a plurality of" means two or more. The term "and/or" is used to describe an association relationship between associated objects and represents that three relationships may exist. For example, "A and/or B" may represent the following three cases: only A exists, only B exists, and both A and B exist, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one item (piece) of a, b, or c may represent a, b, c, "a and b", "a and c", "b and c", or "a, b, and c", where a, b, and c may be singular or plural.

What is claimed is:

1. An apparatus, comprising:
    an inverter circuit configured to convert an input direct current into an alternating current, wherein the inverter circuit comprises a leading bridge arm and a lagging bridge arm, a voltage phase of the leading bridge arm is ahead of a voltage phase of the lagging bridge arm in a same period, and the leading bridge arm and the lagging bridge arm each comprise controllable switching transistors;
    a compensation circuit configured to compensate the alternating current and send a compensated alternating current;
    a transmitting coil configured to transmit, as an alternating magnetic field, the compensated alternating current sent by the compensation circuit;
    an impedance adjustment circuit comprising a leading-bridge-arm impedance adjustment circuit and a lagging-bridge-arm impedance adjustment circuit, wherein a first end of the leading-bridge-arm impedance adjustment circuit is connected to the controllable switching transistors in the leading bridge arm, a first end of the lagging-bridge-arm impedance adjustment circuit is connected to the controllable switching transistors in the lagging bridge arm, the leading-bridge-arm impedance adjustment circuit and the lagging-bridge-arm impedance adjustment circuit each comprise an inductive branch, the inductive branch comprises at least one controllable inductive branch, and each controllable inductive branch comprises at least one inductor and at least one switch; and
    a controller configured to:
        control the switch in the controllable inductive branch in the leading-bridge-arm impedance adjustment circuit to be turned on or off,
        adjust a value of an inductive current flowing into the leading bridge arm, so that the controllable switching transistors in the leading bridge arm implement zero voltage switching; and
        control the switch in the controllable inductive branch in the lagging-bridge-arm impedance adjustment circuit to be turned on or off, to adjust a value of an inductive current flowing into the lagging bridge arm, so that the controllable switching transistors in the lagging bridge arm implement zero voltage switching.

2. The apparatus according to claim 1, wherein the inductive branches in the leading-bridge-arm impedance adjustment circuit and the lagging-bridge-arm impedance adjustment circuit each further comprise at least one fixed inductive branch, and the fixed inductive branch comprises at least one inductor.

3. The apparatus according to claim 1, wherein the controllable switching transistors in the leading bridge arm and the lagging bridge arm each comprise one upper switching transistor and one lower switching transistor, the first end of the leading-bridge-arm impedance adjustment circuit is connected to a middle point between the upper switching transistor and the lower switching transistor of the leading bridge arm, the first end of the lagging-bridge-arm impedance adjustment circuit is connected to a middle point between the upper switching transistor and the lower switching transistor of the lagging bridge arm, and both second ends of the leading-bridge-arm impedance adjustment circuit and the lagging-bridge-arm impedance adjustment circuit are connected to one of a positive bus, a negative bus, or a bus middle point of a power supply.

4. The apparatus according to claim 3, wherein the impedance adjustment circuit further comprises:
    at least one direct current blocking capacitor; and both the second ends of the leading-bridge-arm impedance adjustment circuit and the lagging-bridge-arm impedance adjustment circuit are connected to one of the positive bus, the negative bus, or the bus middle point of the power supply through the direct current blocking capacitor.

5. The apparatus according to claim 3, wherein the impedance adjustment circuit further comprises:
    at least one first direct current blocking capacitor; and
    at least one second direct current blocking capacitor; and both the second ends of the leading-bridge-arm impedance adjustment circuit and the lagging-bridge-arm impedance adjustment circuit are connected to the positive bus of the power supply through the at least one first direct current blocking capacitor, and are connected to the negative bus of the power supply through the at least one second direct current blocking capacitor.

6. The apparatus according to claim 3, wherein the impedance adjustment circuit further comprises:
    at least one first direct current blocking capacitor;
    at least one second direct current blocking capacitor; and
    at least one third direct current blocking capacitor; both the second ends of the leading-bridge-arm impedance adjustment circuit and the lagging-bridge-arm impedance adjustment circuit are connected to a first end of the at least one first direct current blocking capacitor; a second end of the at least one first direct current blocking capacitor is connected to the positive bus of the power supply through the at least one second direct current blocking capacitor; and the second end of the at least one first direct current blocking capacitor is connected to the negative bus of the power supply through the at least one third direct current blocking capacitor.

7. The apparatus according to claim 3, wherein the leading-bridge-arm impedance adjustment circuit further comprises:
   at least one direct current blocking capacitor; and the inductive branch in the leading-bridge-arm impedance adjustment circuit is connected to one of the positive bus, the negative bus, or the bus middle point of the power supply through the at least one direct current blocking capacitor.

8. The apparatus according to claim 3, wherein the leading-bridge-arm impedance adjustment circuit further comprises:
   at least one first direct current blocking capacitor; and
   at least one second direct current blocking capacitor; and the inductive branch in the leading-bridge-arm impedance adjustment circuit is connected to the positive bus of the power supply through the at least one first direct current blocking capacitor, and is connected to the negative bus of the power supply through the at least one second direct current blocking capacitor.

9. The apparatus according to claim 3, wherein the leading-bridge-arm impedance adjustment circuit further comprises:
   at least one first direct current blocking capacitor;
   at least one second direct current blocking capacitor; and
   at least one third direct current blocking capacitor; the inductive branch in the leading-bridge-arm impedance adjustment circuit is connected to the positive bus of the power supply through the at least one first direct current blocking capacitor and the at least one second direct current blocking capacitor, and the inductive branch in the leading-bridge-arm impedance adjustment circuit is connected to the negative bus of the power supply through the at least one first direct current blocking capacitor and the at least one third direct current blocking capacitor.

10. The apparatus according to claim 1, wherein the leading-bridge-arm impedance adjustment circuit further comprises:
    at least one diode clamp circuit; the controllable inductive branch in the leading-bridge-arm impedance adjustment circuit is connected to the at least one diode clamp circuit in the leading-bridge-arm impedance adjustment circuit; the diode clamp circuit in the leading-bridge-arm impedance adjustment circuit comprises a first diode and a second diode; and a connection point between the inductor and the switch in the controllable inductive branch in the leading-bridge-arm impedance adjustment circuit is connected to both an anode of the first diode and a cathode of the second diode.

11. The apparatus according to claim 1, wherein the lagging-bridge-arm impedance adjustment circuit further comprises:
    at least one diode clamp circuit; the controllable inductive branch in the lagging-bridge-arm impedance adjustment circuit is connected to the at least one diode clamp circuit in the lagging-bridge-arm impedance adjustment circuit; the diode clamp circuit in the lagging-bridge-arm impedance adjustment circuit comprises a third diode and a fourth diode; and a connection point between the inductor and the switch in the controllable inductive branch in the lagging-bridge-arm impedance adjustment circuit is connected to both an anode of the third diode and a cathode of the fourth diode.

12. The apparatus according to claim 1, wherein the controller is further configured to:
    obtain a current flowing into the compensation circuit; and
    control, based on the current flowing into the compensation circuit, the switch in the controllable inductive branch in the leading-bridge-arm impedance adjustment circuit in the wireless charging transmitting apparatus to be turned on or off, to change a current flowing out of the leading bridge arm in the wireless charging transmitting apparatus, so that the controllable switching transistors in the leading bridge arm implement zero voltage switching.

13. The apparatus according to claim 12, wherein the controller is further configured to:
    obtain a difference between the current flowing into the compensation circuit and a preset current, and
    control, based on the difference, the switch in the inductive branch in the leading-bridge-arm impedance adjustment circuit to be turned on or off.

14. The apparatus according to claim 12, wherein the controller is further configured to:
    obtain a current flowing into the compensation circuit from a middle point between the controllable switching transistors in the leading bridge arm in a period between a turn-off moment and an actual turn-on moment of the controllable switching transistor in the leading bridge arm.

15. The apparatus according to claim 12, wherein the controller is further configured to:
    obtain a current flowing into the compensation circuit based on a current flowing out of the leading bridge arm in a period between a turn-off moment and an actual turn-on moment of the controllable switching transistor in the leading bridge arm and a current in the inductive branch in the leading-bridge-arm impedance adjustment circuit.

16. A control method for a wireless charging transmitting apparatus, the method comprising:
    obtaining a current flowing into a compensation circuit of the wireless charging transmitting apparatus; and
    controlling, based on the current flowing into the compensation circuit, a switch in a controllable inductive branch in a leading-bridge-arm impedance adjustment circuit in the wireless charging transmitting apparatus to be turned on or off, to change a current flowing out of a leading bridge arm in the wireless charging transmitting apparatus, so that controllable switching transistors in the leading bridge arm implement zero voltage switching.

17. The control method for a wireless charging transmitting apparatus according to claim 16, further comprising:
    obtaining a difference between the current flowing into the compensation circuit and a preset current, and controlling, based on the difference, a switch in an inductive branch in the leading-bridge-arm impedance adjustment circuit to be turned on or off.

18. The control method for a wireless charging transmitting apparatus according to claim 16, further comprising:
    obtaining a current flowing into the compensation circuit from a middle point between the controllable switching transistors in the leading bridge arm in a period between a turn-off moment and an actual turn-on moment of the controllable switching transistor in the leading bridge arm.

19. The control method for a wireless charging transmitting apparatus according to claim 16, further comprising:
obtaining a current flowing into the compensation circuit based on a current flowing out of the leading bridge arm in a period between a turn-off moment and an actual turn-on moment of the controllable switching transistor in the leading bridge arm and a current in the inductive branch in the leading-bridge-arm impedance adjustment circuit.

20. A wireless charging system, comprising:
a wireless charging receiving apparatus; and
a wireless charging transmitting apparatus comprising
an inverter circuit configured to convert an input direct current into an alternating current, wherein the inverter circuit comprises a leading bridge arm and a lagging bridge arm, a voltage phase of the leading bridge arm is ahead of a voltage phase of the lagging bridge arm in a same period, and the leading bridge arm and the lagging bridge arm each comprise controllable switching transistors,
a compensation circuit configured to compensate the alternating current and send a compensated alternating current,
a transmitting coil configured to transmit, as an alternating magnetic field, the compensated alternating current sent by the compensation circuit,
an impedance adjustment circuit comprising a leading-bridge-arm impedance adjustment circuit and a lagging-bridge-arm impedance adjustment circuit, wherein a first end of the leading-bridge-arm impedance adjustment circuit is connected to the controllable switching transistors in the leading bridge arm, a first end of the lagging-bridge-arm impedance adjustment circuit is connected to the controllable switching transistors in the lagging bridge arm, the leading-bridge-arm impedance adjustment circuit and the lagging-bridge-arm impedance adjustment circuit each comprise an inductive branch, the inductive branch comprises at least one controllable inductive branch, and each controllable inductive branch comprises at least one inductor and at least one switch, and
a controller configured to:
control the switch in the controllable inductive branch in the leading-bridge-arm impedance adjustment circuit to be turned on or off, to adjust a value of an inductive current flowing into the leading bridge arm, so that the controllable switching transistors in the leading bridge arm implement zero voltage switching; and
control the switch in the controllable inductive branch in the lagging-bridge-arm impedance adjustment circuit to be turned on or off, to adjust a value of an inductive current flowing into the lagging bridge arm, so that the controllable switching transistors in the lagging bridge arm implement zero voltage switching, wherein the wireless charging receiving apparatus is configured to:
receive an alternating magnetic field transmitted by the wireless charging transmitting apparatus,
convert the alternating magnetic field into a direct current, and
provide the direct current to a current-using device.

* * * * *